United States Patent [19]
Hait

[11] Patent Number: 5,644,123
[45] Date of Patent: Jul. 1, 1997

[54] PHOTONIC SIGNAL PROCESSING, AMPLIFICATION, AND COMPUTING USING SPECIAL INTERFERENCE

[75] Inventor: John Norman Hait, Missoula, Mont.

[73] Assignee: Rocky Mountain Research Center, Missoula, Mont.

[21] Appl. No.: 424,177

[22] Filed: Apr. 19, 1995

Related U.S. Application Data

[63] Continuation of Ser. No. 357,460, Dec. 16, 1994.

[51] Int. Cl.$^6$ .............................. G06G 7/00; G06E 1/04
[52] U.S. Cl. .................... 250/216; 250/214 LS; 359/108; 359/577; 364/713; 364/807
[58] Field of Search ............... 250/216, 214 LS, 250/214 DC, 551; 359/1, 15, 108, 107, 577; 364/713, 807, 822, 826, 837

[56] References Cited

U.S. PATENT DOCUMENTS

| | | | |
|---|---|---|---|
| 3,680,080 | 7/1972 | Maure | 250/214 LS |
| 4,084,880 | 4/1978 | Clow | 359/15 |
| 4,386,414 | 5/1983 | Case | 359/15 |
| 4,703,993 | 11/1987 | Hinton et al. | 359/15 |
| 4,764,889 | 8/1988 | Hinton et al. | 364/807 |
| 4,764,890 | 8/1988 | Hinton | 364/807 |
| 4,824,192 | 4/1989 | Roberts | 364/713 |
| 4,830,444 | 5/1989 | Cloonan et al. | 359/107 |
| 5,093,802 | 3/1992 | Hait | 364/807 |
| 5,239,173 | 8/1993 | Yang | 250/214 LS |

Primary Examiner—David R. Hudspeth
Assistant Examiner—John R. Lee
Attorney, Agent, or Firm—Leonard D. Schappert

[57] ABSTRACT

A means and method of controlling a plurality of energy beams with at least one of the plurality of beams. At least one first beam set produces special interference with at least one second beam set, at a first location(s), diverting energy from both beam sets to a second location(s), where energy does not appear from one ... or either, of the inputs in the absence of interference. By selecting the timing, levels, phases, frequencies, and interconnection of multiple controllers, a multitude of useful energy beam circuits are able to be made ... such as: gated amplifiers, cascaded amplifiers, gated oscillators, phase demodulators, active filters, inverters, inverted filters, limiters, threshold detectors ... as well as the logic functions: multi-input AND, multi-input OR, XOR, NOT, NAND, NOR, set/reset flip flops, D-type, clocked, one shot, schmitt trigger, time division multiplexer and demultiplexer, frequency division demultiplexer, binary half adder, binary digit counter, full binary counter, square wave oscillator, phase locking, and extracting information from a fluctuating phase beam. The present invention provides the entire foundation of photonic, and energy beam computing using special interference, which provides a greatly expanded base for all of photonic transistor technology.

33 Claims, 14 Drawing Sheets

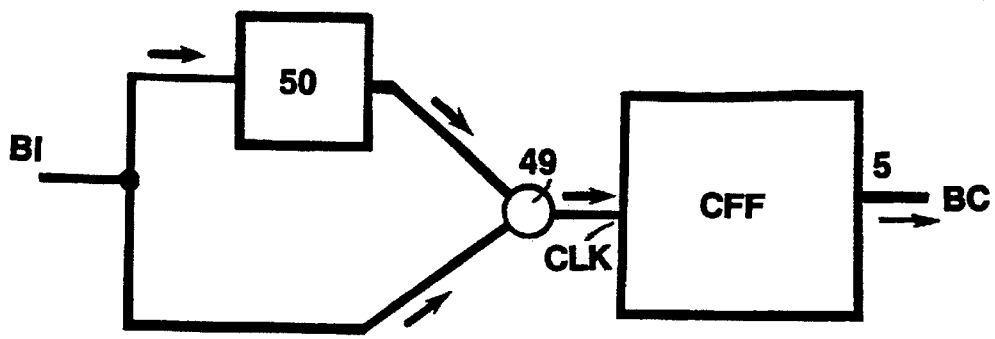
Fig. 18
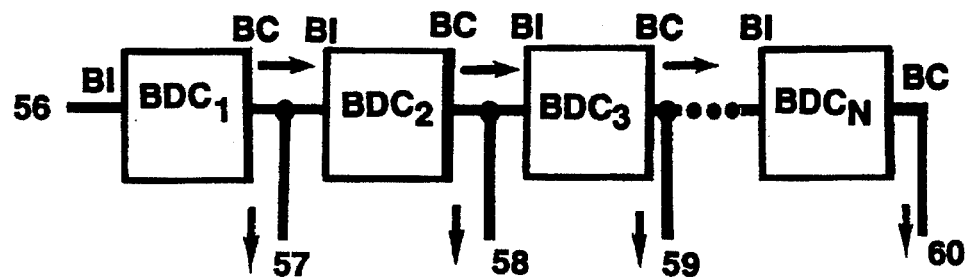
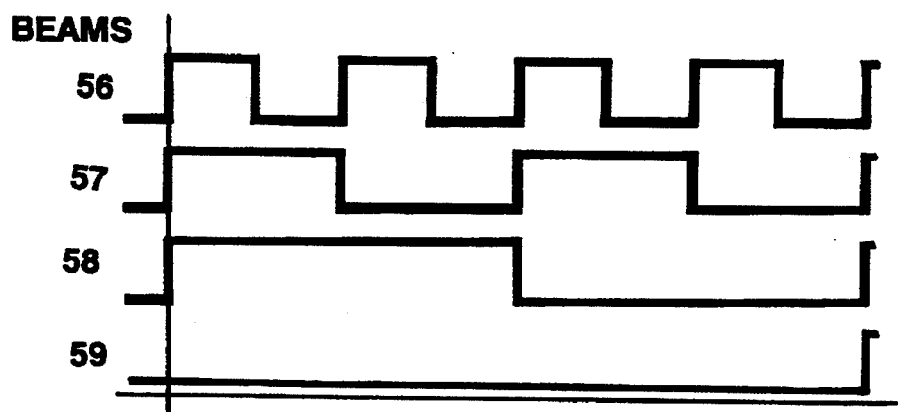
Fig. 19
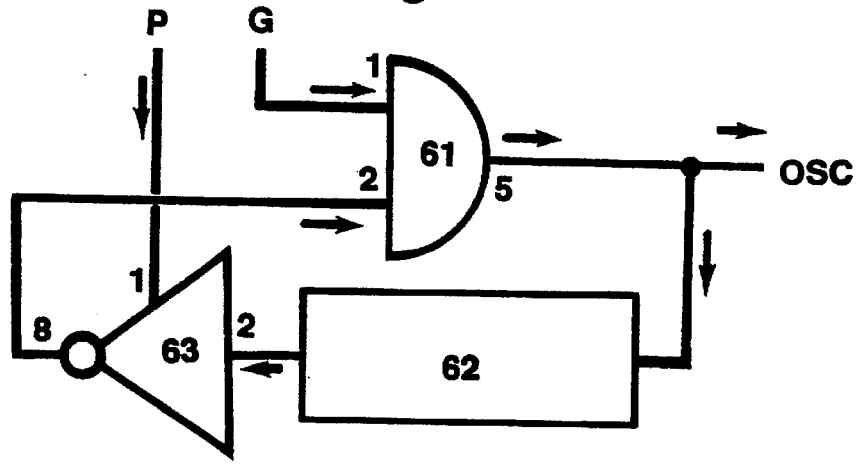
Fig. 20

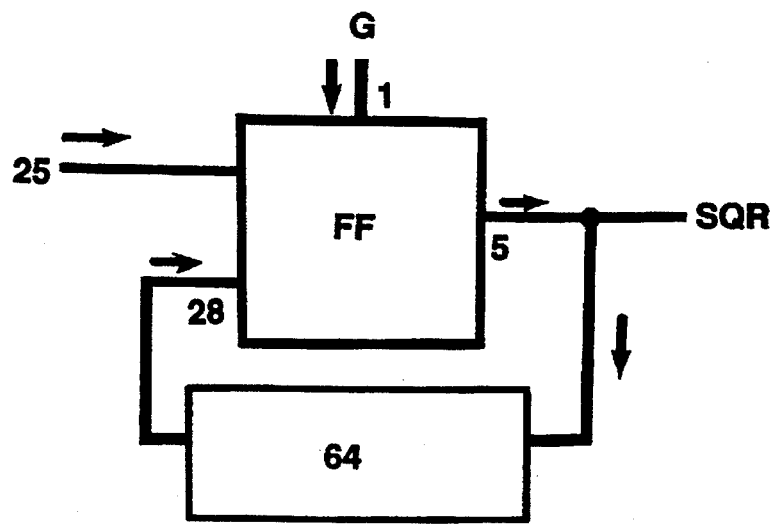
Fig. 21
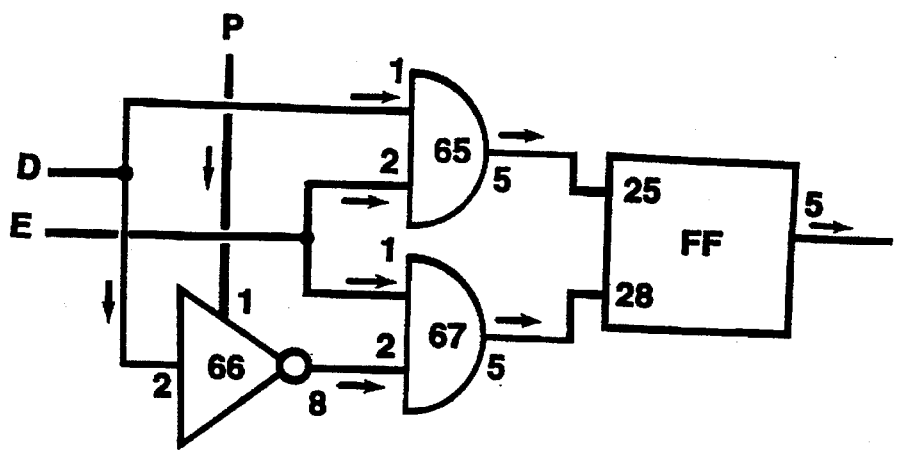
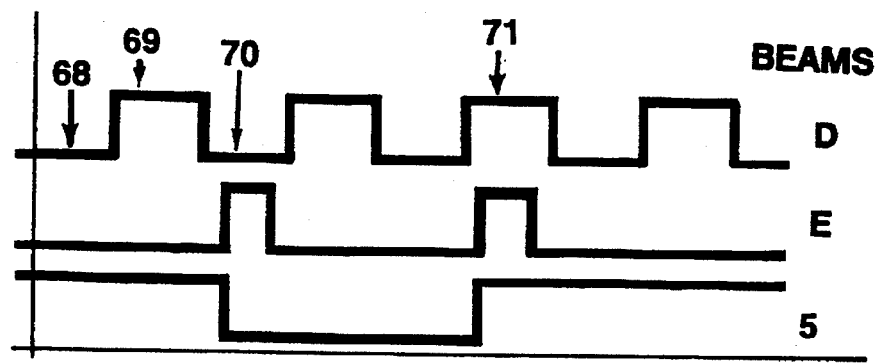
Fig. 22

PHOTONIC SIGNAL PROCESSING, AMPLIFICATION, AND COMPUTING USING SPECIAL INTERFERENCE

This application is a continuation of application Ser. No. 08/357,460, filed Dec. 16, 1994 still pending.

REFERENCE DATA

Applicant hereby incorporates by reference Disclosure Document No. 343952, filed Dec. 6, 1993, for Holographic Photonic Transistor, and Disclosure Document No. 352533, filed Apr. 19, 1994, for Photonic Amplifier, Boolean AND, Power Amplifier, Photonic Controller, Avalanche Amplifier. Filed in the U.S. Patent office.

BACKGROUND OF THE INVENTION

1. Technical Field

The present invention relates to energy beam control of wave-type energy beams including electromagnetic waves, acoustical waves, and moving particles, optical computers, optical signal processing, optical signal amplification, and basic optical logic functions.

2. Background Art

The "Optical Computing Method Using Interference Fringe Components Regions" (U.S. Pat. No. 5,093,802, Hait, 1992) provides amplification by using constructive interference to remove energy from an energy-supplying beam which remains on, diverting it into an output along with energy from a modulated input beam. As a result, the amount of energy that appears in the modulated portion of the output is greater than the amount of energy in the modulated input beam.

The disadvantage of the prior method is that a portion of the energy supplying beam appears in the output all the time. This occurs because the prior art uses the most popular and well studied interference effects, such as Young's fringes, where energy appears at the location of fringe component separation, whenever any one of the input beams is on by itself. See, U.S. Pat. No. 5,093,802, State 2 of FIGS. 1 and 2, and Col. 6, lines 7–45, especially lines 36–40. However, there exist other interference phenomena which may be used to alleviate the prior art problems.

These special interference phenomena are produced whenever the geometry of the apparatus is such that energy from a plurality of beams causes destructive interference at the first location(s) where energy from the input beams appears when any one of the input beams is on by itself. Since the law of conservation of energy requires that the energy in the beams not be destroyed by the destructive interference, when an out-of-phase beam is on, the energy must appear somewhere else. Depending on the geometry of beam superposition, the energy will be reflected, or diverted to a position adjacent to the first location(s), or at some angle in between. The important result is that energy from the plurality of beams is actually diverted away from the first location(s) where destructive interference occurs and on to a second location where constructive interference occurs, outside of the area where at least one input beam appears in the absence of interference.

In the most elementary examples, having only two input beams, two types of special interference are manifest. With the first type, neither of the input beams contribute energy to the second location when either one is on by itself. When both input beams are on, interference causes energy from both beams to appear at the second location.

With the second type of special interference, the first input beam contributes no energy to the second location when it is on by itself. When the second input beam comes on, interference causes energy from both input beams to appear at the second location. However, energy from the second beams beam does appear at the second location when it is on by itself.

Some embodiments and applications of the present invention is able to use either type of special interference. There are some things, however, that require one type or the other, but will not work for both types; e.g., the logical AND, discussed below.

The individual beams, in either type of special interference, actually produce images at the locations where interference takes place, even if these images are just simple spots. These images then interfere with each other.

In complex images, one or more input beams are able to produce image component area(s) that correspond to the simple examples above. The inputs are subsets of a plurality of input beams that form images. When only one beam set is on, and as a result its image is on, the energy pattern defines a set of "first" locations by the presence of energy. When at least two of the subsets are on, interference occurs between the two images, and energy from both images is removed from the first locations by destructive interference. That energy then appears at the second location(s) because of constructive interference. The second locations lie outside of the area where the first locations are.

Holograms, especially but not exclusively computer-generated holograms, like other pictures, are made up of individual pixels. From each pixel comes a group of rays that eventually combine to produce the wave-front reconstructed holographic image. As a result, each spot on the image is produced by a group of rays from the hologram. The rays constitute a set of beams. When a whole set or beams are modulated in concert, the image it produces, and the complex interference that occurs between it and other images is also modulated. Interference between such images, made by subsets of all input beams, are also able to be used to produce the special interference phenomena used by the present invention.

The important difference between these special interference phenomena and Young's fringes used in the prior art is that energy from at least one of the input beam sets, which appears at the second location(s), appears while interference is occurring, and does not appear at that location(s) in the absence of interference. On the other hand, the input beams used in Young's fringes do appear at that second location(s) in the absence of interference, when any of those beams are on by themselves.

These special phenomena are analog in nature, in that the amount of energy that appears at the second location(s) is proportional to the amount of energy in the two input beams or images. The energy appearing at the second location(s) has been diverted from the first location(s).

If one input is held constant, and a second input(s) is increased, the amount of energy contributed to the second location(s) from the first input(s) reaches a limit where the addition of more energy in the second input(s) is unable to cause more energy from the first input(s) to appear at the second location(s).

The phenomena may be utilized in digital energy circuits through the use of discrete levels for modulating the input beams, to establish discrete states of the interference images, having discrete amounts of energy in their component parts.

The present invention uses these heretofore-unused phenomena to produce a basic means and method of energy beam control that has direct application in optical computing, photonic signal processing, acoustic imaging, and moving particle imaging.

An additional difference between the present invention and nearly all of the prior art is that the present invention operates at the full speed of whatever energy form is being used. For example, if light is the energy form used, the present invention operates completely at the speed of light, as does the invention disclosed in U.S. Pat. No. 5,093,802. Any introduction of electronic, mechanical, or acousto-mechanical components only serves to limit processing speed to that of the slowest component.

U.S. Pat. No. 5,239,173, by Yang, is an excellent example of an attempt to amalgamate light with slow components, while also using Young's fringes. Yang states, in col. 2 lines 17 and 18, "A mechanical or electro-optical shutter is provided at each slit so as to turn the light ON and OFF," and restates this in his claim 1, col. 5 line 23. Optical sensors or detectors are also used as noted at col. 3, lines 58 & 58, and col. 5 lines 61 & 62. These also limit the speed of operation to that of the slow electronic sensors.

Electrons are simply too slow. Photons are much faster, and that is why the present invention should be practiced without utilizing any components that require changes in the energy type used, although the present invention is able to use one embodiment for acoustical waves for detecting or generating acoustical images, while another embodiment is able to use light for processing those images after they have been converted to optical signals.

Yang also uses Young's fringes. This is evident by the description of his first three figures at col. 2 line 58 to col. 3 line 58 which describes double slit diffraction, a common term of art for Young-type interference fringes. The fact that his AND device requires "two detectors working cooperatively" (col. 3 lines 54 to 57) shows this to be the case. The "null" as well as the "constructive interference" at two different positions must be sensed in order to detect a state where both input beams are on so that his AND is actually the result of ANDing two sensor outputs, and is not a direct result of using interference alone.

As a result of these inherent problems of the prior art, the whole conceptual process of the present invention is geared to the interaction of components without requiring conversion from one energy form to another, and to the use of special interference, which is able to produce effects that Young's fringes do not.

SUMMARY OF THE INVENTION

The present invention is a basic means and method for controlling one set of beams of energy with another set of beams by using the above-described special interference phenomena. Outputs are positioned at locations where the interference images interact to produce energy components in accordance with the interference states.

Because the use of special interference is completely new to the field, it necessitates the disclosure of a large number of components and component interconnections that are used in new ways, requiring new organizational and interconnectional methods for accomplishing familiar tasks. As a result, this basic means and method is able to accomplish a variety of energy control and signal processing tasks, including active filtering, gated limiting amplifying, multiple bit binary information storage, energy beam oscillation, computer logic, and signal processing, as well as a multitude of other tasks and functions, which will become more apparent from a full reading of this specification.

1. Definition of some terms

Certain terms are herein defined in order to make the disclosure more clear.

"Energy." The special interference phenomena used by the present invention are able to be produced with any type of energy that exhibits a wave nature including, but not limited to, sound, moving particles, electrons, light, X-rays, microwaves, or other electromagnetic energy. While the present invention will operate using any wave-type energy, the description is presented herein in optical terms for clarity and consistency of the description. The apparatus used to implement the invention include any energy-directing element(s) or optical element(s), including holograms, that are compatible with the type of energy in use.

"Beams and beam sets." Because images as well as individual beams are able to be used in the present invention, the term "beam set" includes beams that have been projected to produce complex images. In fact, a simple spot produced by a single beam is just a subset of the possible images that are able to be produced by a beam (or set of beams,) depending upon the optics used. As a result, a "beam" or "beam set" that is on or off, or modulated with analog information, is considered to include the production of both simple spots and complex images, wherein the entire image or spot is modulated in unison with the same information. As a result, images are the same as beams and beam sets having multiple similar acting locations. The first beam set generally refers to a power or constant beam which is normally held on, while the second beam set generally refers to a control and/or modulation beam. Other beams and/or beam sets are as defined below in this specification, claims and/or abstract.

"Interference." The present invention uses multiple beam interference of wave-type energy. As a result, the terms "interference" and "special interference", unless otherwise stated, refer to multiple beam interference, and not to the projection of the type of images defined as "beam sets" above. A complex example of that would be holographic images that are actually produced by interference as individual images, but the images, in turn, "interfere" with each other when multiple images are present. In this case, the type of "interference" referred to would be between two or more holographic images.

"Diversion, divert, and diverted" are used herein to describe the phenomenon that occurs when destructive interference is present. Normally, energy from a beam set that is on by itself contributes to the total amount of energy at a first location(s), but does not contribute to the amount of energy appearing at a second location(s) at that time. When an out-of-phase beam is superimposed upon the first one, destructive interference occurs, causing energy from both beams to appear at the second location(s). As a result, the energy is said to be "diverted" away from the first location(s) and to the second location(s) by the process of interference.

Some scientists have a different viewpoint of how interference works; however, the concept of diversion is very useful for explaining the steps and components of the present invention, even if more complex processes are physically involved. The important point is that energy from a certain beam appears at a location only when interference is occurring and does not appear there in the absence of the second interfering beam.

Input and output "levels" refer to energy levels rather than amplitudes per se, even though it may be obvious from the context that amplitude behavior is important; after all, it does form the basis for understanding interference effects.

However, beams even tiny beams—do have a cross-sectional area, which brings the concept of energy levels into the picture. Amplitudes and intensities may change depending upon the apparatus used. A given amount of energy is able to be focused onto a small area to increase the amplitude and the intensity, or be spread out onto a larger area, reducing the amplitude and intensity, while the total amount of energy remains the same. However, while adding energy to the modulated portion of an information-carrying beam produces amplification, reducing that energy is attenuation. The actual amplitude and area covered is able to be adjusted as needed by the proper selection of the optics used.

"Phase, inverted and uninverted." The energy beams and beam sets function as carrier waves for the operation of the present invention. As a result, some confusion can arise over the use of the term "phase," since it could refer to the phase of the carrier wave itself, or of any modulated waveform envelope impressed upon the carrier wave. In this disclosure, the term "phase" always refers to the carrier wave phase that is able to determine if constructive or destructive interference will occur at a location when it is superimposed upon another carrier wave. Such terms as "inverted" and "uninverted" refer to the modulated waveform envelope, and not to the carrier wave phase. When an amplitude-modulated carrier wave is said to be "inverted," it is turned off during the time the "uninverted" carrier wave is turned on, as is the case with its analog equivalent.

"ci" is constructive interference.

"di" is destructive interference.

"controller" is the basic unit of the present invention as explained in sections 2 and 3 below.

2. The basic means and method using the first type of special interference.

The present invention is a basic means and method of controlling a plurality of energy beam sets with at least one set of the plurality of energy beam sets, using this heretofore-unused special interference, comprising the steps of:

a. producing a plurality of input beam sets including a first beam set having at least one first input beam of energy, and a second beam set having at least one second input beam of energy modulated with controlling information, wherein the first and second beams sets are directed to at least one first location;

b. producing interference with that plurality of input beam sets at the at least one first location, diverting energy proportional to the second beam set from the plurality of input beam sets to at least one second location; whereby energy from the plurality of input beam sets is absent from that at least one second location when either or both of the first and second beam sets are off and when the first beam set is in phase with said second beam set, (this is the first type of special interference where none of the input beams contributes energy to the second location(s) in the absence of the others) and c. separating energy from the at least one second location to provide at least one output, thereby producing an energy beam controller of the first type.

In each case, all of the rays in a beam set operate in concert with each other to produce images at the location(s) where the various image components are separated, directing energy into the outputs. When at least two beam sets are on (and out of phase with each other), the images interfere to produce a composite image having an energy distribution which is different from the images produced by the individual beam sets. Separation is then able to take place because the spacial locations of the distributed energy either conform to output positions (producing an "on" or "high" condition having a level proportional to the relative levels and phases of the input beam sets), or they do not, producing an "off" or "low" or reduced output condition).

"Separation," in either case, is able to be accomplished by the strategic positioning of any element (optical or otherwise, depending upon the energy form used), that permits energy from one location to exit into an output while blocking energy from another location from getting into the output. This separator is able to be as simple as a mask with a hole in it (as illustrated), as complex as a hologram that directs energy from one set of locations in a different manner than it does when the energy comes from some other set of locations, or a device such as a strategically placed end of an optical fiber. The important point is that the energy is separated by the apparatus so that it appears, or does not appear, in a certain output according to the teachings of the present invention.

The present invention is also able to use more than two beam sets as inputs. The complex combination of the group will determine the output. To produce an output, any two of the inputs must be on and out of phase with each other. Beams that are in phase will produce constructive rather than destructive interference at the first location(s). The combinations of two beams of different phases are also able to produce a combined signal that is completely out of phase with a third beam set and so on. As a result, many complex means, methods, and devices are able to be produced from the present invention.

The above list of steps describes the use of the first type of special interference where neither of the inputs contributes energy to the output when only one beam set is on. The second list of steps, below, uses the second type of special interference, where at least one of the input beam sets does not contribute energy to the output when on by itself.

3. The basic means and method using of the second type of special interference.

A means and method of controlling one set of beams of energy with another set of beams of energy, comprising the following steps:

a. Producing a first beam set having at least one first input beam of energy directed toward at least one first location. Whether the "beam set" is only one little beam, or a whole group of rays that form an image, they are directed to where interference is going to be produced at certain times. The "at least one first location" is able to be a simple point, or an image made up of many locations that will function in unison. This beam set is the one that does not show up at a second location in the absence of interference;

b. Producing a second beam set having at least one second input beam of energy modulated with controlling information. This is the beam set that does contribute some of its energy to the second location when the first beam set is off, and is the primary difference between the second type of special interference and the first type explained above;

c. Producing interference between the first and the second beam sets at that at least one first location, when both the beam sets are on, diverting energy from both the beam sets to at least one second location in proportion to the second beam set, whereby energy from the first beam set is absent from the at least one second location when the second beam set is off or in phase with the first beam set and is present at the at least one second location when the second beam set is on and out of phase with the first beam set, (the interference-controlling beam set is able to be amplitude- or phase-modulated. At the time when both beam sets have an equal level, the maximum amount of energy occurs at the second location(s) because complete destructive interference occurs at the first location (s). At input levels, and phases in between, the level at the second location(s) is proportional to the input beam sets, depending on the bandwidth of the implementation, explained below.) and d. Separating energy from the at least one second location to provide at least one output, thereby producing an energy beam controller of the second type.

4. Foreview of more complex embodiments.

A suitable name for this basic arrangement, using either type of special interference, is a "controller." One could even refer to it as a type one controller or a type two controller. The common name is "photonic transistor;" however, the word controller is used herein, because the invention is able to use non-photonic energy.

This basic invention is able to be reproduced and interconnected with itself and other devices to produce a great variety of useful functions. To accomplish this interconnection, the precise locations, phases, timing, and relationships to various component types are required.

To provide an understanding of these requirements, a limited number of interconnected processes are herein disclosed that use selected principles that are not obvious in the prior art. Once taught, these basic components and interconnecting methods are able to be rearranged and interconnected for producing an even greater variety of functions.

To begin with, an explanation of some very basic processes that explain the operation of the basic invention and the differences that occur depending on which type of special interference is being employed is in order. Such items as the logical AND, amplifier, gated amplifier, limiter, phase demodulator, phase comparer, active filter, cascading one into another, and the use of feedback are defined. Each of these items results from defining the input types to produce various kinds of outputs.

A further explanation of some of the more complex components that use several of these principles to accomplish more complex tasks, such as time division multiplexing and demultiplexing, and frequency division demultiplexing, along with logic devices such as a bistable flip flop and a multi-bit flip flop that is able to store frequency multiplexed bits, will then be undertaken.

The principle of input beam summing and how it affects an amplifier with and without feedback makes it possible for the present invention to act as a threshold detector. Selection of input levels within certain ranges results in a variety of useful processes, including computer logic such as a set/reset bistable flip flop, a multiple input AND, and a multiple input OR.

Special timing and phase relationships are needed to clock a set/reset flip flop. The process of energy beam differentiation is a new one. It is needed in order to satisfy the timing needs of a clocked flip flop so that it is able to be used as a binary counter.

Using special interference opens the way to an entirely new field of invention. Some of the principles taught herein have no counterpart in electronics or any other prior art. Others have a counterpart, but must be used in unique ways. Consequently, these many items have not been included just for the fun of making a big application. Each of these many requirements for using the present invention needs to be taught. And each one has been selected so as to teach a particular aspect of using the basic invention.

5. The logical AND.

The primary difference between the two types of special interference and Young's fringes is easily illustrated by the logical AND. Using the first type of special interference, a two-input AND gate is able to be made, because when either of the two inputs is on by itself the output remains off. (Note: "off" is able to be anything between full "off" and a low state in comparison to an "on" or high state, because some implementations of the present invention may leak energy. So even if such implementations are not perfect, they may still be useful.) Only when both inputs are on does energy from both beams appear at the second location(s), where the output of the AND is taken from.

Thus, in order to produce the logical AND using the present invention with the first type of special interference, the only additional step necessary is to modulate the input beams with binary information, and the invention will accomplish the AND function.

The second type of interference will not work to produce a logical AND, because energy from one of the beams does appear in the output in the absence of two-beam interference, which of course is contrary to the definition of a logical AND. Young's interference, as used in the prior art, also fails to provide the logical AND function. Young's interference provides energy to the output when either or both of the inputs are on. In the prior art, that is described as an OR.

There are other ways to produce a logical AND; one of the most interesting is with the use of a threshold detector. This will be discussed below, as there are some fundamental concepts that need to be taught first.

The following sections explain how the present invention responds to changes in input levels.

6. Basic amplifier and gated amplifier.

Amplification is able to be accomplished using either of the basic embodiments described in sections 2 and 3 above.

Even though the first beam set (power beam) remains on as a substantially constant energy level, the output will be off in the absence of the second beam set (the control beam). Either type of special interference is able to be used, because at least one of the inputs functions this way.

When the second beam set is modulated with analog or binary information, the output will be an amplified version of the modulated input because energy from both of the input beam sets is diverted into the output in proportion to the level of the second beam set and its phase relationship to the first beam set.

If the second beam set has a maximum level equal to that of the first beam set and is exactly 180 degrees out of phase with the first beam set, and provided the optics are not sloppy, destructive interference will occur at the first location(s). In this case, all of the energy will be diverted into the areas of constructive interference at the second location(s) which lie(s) outside of the area where the first beam set appears in the absence of interference. As a result, the energy level of the combined output is able to be up to twice the value of the second beam set when the levels of both beam sets are equal. If the second beam set is smaller than the first beam set, the output will contain a contribution of energy from both beams in proportion to the level (and phase relationship) of the second beam set.

The procedure used in making an amplifier is:

a. Use the basic invention in utilizing either type of special interference, and b. Maintain the first beam set at a substantially constant above-zero level, thereby providing an amplifier by producing an amplitude modulated uninverted output having more energy than the second beam set has.

If the first type of special interference is used, the amplifier is able to be gated on and off by turning the first beam set on and off, thereby providing a gated amplifier by producing an amplitude modulated output having more energy than said second beam set has, and gating the amplitude modulated output off and on by switching the first beam set off and on.

The reason the second type of interference will amplify but is unable to be gated off by shutting off the first beam set is that a residual output from the second beam set appears in the absence of the first beam set.

7. Inverter.

Energy diverted into the output by interference produces an "uninverted" output. That is, when the control beam is on, so is the uninverted output. That diverted energy is removed from the power beam and the control beam so that their contribution to the first location(s) is diminished. Directing the remaining energy from the first location(s) to a separate output produces an inverted waveform envelope. This inverted output operates differential to the uninverted output.

If the modulated input is modulated with binary information, and the inverted output used, then the logic element produced is a logical NOT using either type of special interference. When both input beam sets are modulated with binary information, and the first type of special interference is used, the result is the EXCLUSIVE OR. These functions are the same as those of the prior art; however, here they result from using special interference rather than Young's interference.

8. The limiter.

The present invention is also able to function as a limiting amplifier using either type of special interference. When the first beam set is held at a substantially constant level, it establishes a saturation level (depending on the exact optics used). When the second beam set is below that saturation level, the output will increase, as described above, producing an amplified output. However, as the level of the second beam set increases, more and more of the first beam set is diverted into the output. Eventually, a saturation level is reached wherein a further increase in the input level of the second beam set fails to divert more energy from the first beam set into the output because there is no more energy available in the first beam set to be diverted.

When all of the energy from the first beam set has been diverted into the output, amplification has reached its maximum value. Depending on the optical arrangement used, increasing the second beam set even more may or may not increase the output level. Amplification is curtailed, however, because the first beam set simply has no more power to contribute.

The procedure used in making the limiter is:

Modulate the second beam set to a sufficiently high level so as to divert all energy available from the first beam set into the amplitude modulated output, thereby providing a limiter by producing an amplified output when the second beam set is below saturation level, and limiting amplification of the amplitude modulated output when the second beam set exceeds the saturation level.

More information about limiters using the two different types of special interference is covered in item 38 below, "Basic theory of operation."

9. Time division multiplexer.

Among the many processes and devices that are able to be made with gated amplifiers is a time division multiplexer. The procedure used in building a time division multiplexer is:

a. Provide a plurality of gated amplifiers;

b. Direct the outputs of the gated amplifiers to at least one third location;

c. Direct energy from that third location to provide at least one common output;

d. Modulate each of the second beam sets of the gated amplifiers with information to be time division multiplexed, and e. Sequentially gate the amplifiers on by sequentially pulsing on the power beam sets of the individual amplifiers during each sequential time division, thereby providing a time division multiplexer by sequentially gating digital information from each of the second beam sets of the plurality of gated amplifiers into a common output.

There are several ways of providing sequential pulsed beam sets. One simple way is to provide an initial pulse, direct a portion of the pulse beam into several delay paths, each having a different length, then direct each delay path to a separate gated amplifier.

10. Time division demultiplexer.

A time division demultiplexer is very similar to the time division multiplexer, except that the inputs are common and the outputs are separate. The procedure used in building a time division demultiplexer is:

a. Provide a plurality of gated amplifiers.

b. Provide a multiplexed input beam modulated with time division multiplexed information.

c. Direct a portion of that multiplexed input beam to the second beam set of each gated amplifier, and d. Sequentially gate each amplifier by sequentially pulsing on the first beam set of each successive amplifier during each successive sequential time division, thereby providing a time division demultiplexer by sequentially gating time division multiplexed information during each time division into a separate output of each of a plurality of gated amplifiers.

Time division multiplexing is an important way of directing a variety of information sources into a common transmission system. One example is the multiplexing of telephone calls into a fiberoptic cable. The present invention has a tremendous speed and bandwidth advantage over existing technology. Using the present invention for direct photon switching of fiberoptic signals will increase the capacity of fiber trunk lines.

Until the slow electronic interfaces have been replaced with faster photonic ones of the present invention, time division multiplexing utilizing the present invention will allow a large number of slower electronic systems to be multiplexed into a high bandwidth optical link by modulating each of the separate input lines of the multiplexer with a separate electro-optical modulator, and each separate output of the demultiplexer with a photonic bistable arrangement and an electro-optical sensor.

Essentially, the multiplexer and demultiplexer are a parallel-to-serial converter and a serial-to-parallel converter.

The following sections explain how the present invention responds to changes in phase and frequency.

11. Phase demodulator.

If the control input of the above-described amplifier is phase modulated, an amplitude modulated output will result thereby providing a phase demodulator wherein the amplitude-modulated output is at a high level when the first and second beam sets are of opposite phase, at a low level when the first and second beam sets are in phase, and proportional to the phase of the second beam set in between those two phase extremes. (See the "Basic theory of operation" below, and the discusion of bandwidth.)

Depending on the optics used, the output signal provides a clean, amplitude-modulated signal that is free of any phase-modulated component because constructive interference occurs at the second location(s), which is in phase with the first beam set. However, if the output location(s) are not located directly at the position where complete constructive interference occurs, the amplitude-modulated output will contain some phase-modulated component.

12. Active filter.

The present invention is able to be used as a phase and frequency sensitive, precision active filter using the first type of special interference. If either of the input beams contains energy that is not of the same frequency and opposite phase of the other input, no uninverted output will occur. As a result, the present invention is able to be used to demultiplex frequency multiplexed signals, distinguish colors, and demodulate frequency-modulated and phase-modulated signals.

If more than one color (wavelength) is supplied to both beam sets, a single device will operate independently and simultaneously at each wavelength. As a result, the present invention is able to be used to switch, separate, and organize broad-band signals.

By supplying multiple-wavelength energy of a substantially constant (above-zero) level(s) as the first beam set of a gated amplifier, along with a multiple-wavelength second beam set, an amplified signal that matches each wavelength that occurs simultaneously in both inputs will appear at the output. By switching the individual wavelengths of the power beam set on and off, the filtering process is able to be gated for selecting and demultiplexing the matching signals.

A plurality of these active filters are able to be used either in parallel, or in a tree structure to demultiplex frequency multiplexed signals of all kinds, including those used in optical fiber transmission, microwave and even radio.

The active filter uses the present, basic invention by adding these steps to the means and method:

a. Providing the first beam set with energy at a constant above-zero-level having at least one wavelength, and often several wavelengths;

b. Switching wavelengths of the first beam set off and on to gate filtering of those individual wavelengths off and on;

c. Providing the second beam set with energy at multiple wavelengths to be filtered, and d. Producing special interference with a subset of the multiple wavelengths matching the first beam set wavelengths and rejecting all other wavelengths, thereby providing a means and method of gated active filtering by producing an output only at wavelengths that exist simultaneously in both input beam sets.

13. Removing signals using an active filter.

It should be noted that either type of special interference is able to be used for filtering, but the relationships between the input signals and output signals in the second type of interference differ somewhat from those in the first type of interference.

With the second type of interference, the filtered, uninverted output will contain a contribution from the second beam set unless the second beam set is equal to and in phase with the first beam set's wavelengths, in which case constructive interference will occur at the first location(s) at those wavelengths removing that energy from the second location(s) and the uninverted output.

Adding an inverted output, as with the inverter above, produces an output which is differential to the uninverted output at every wavelength present in the power beam, but is not differential at other wavelengths.

The procedure for producing a differential active filter, using either type of interference, begins with an amplifier with an inverted output and continues with the following steps:

a. Providing the first beam set with its substantially constant above-zero level energy having at least one wavelength;

b. Providing the second beam set with multiple wavelengths to be filtered, and c. Producing interference with a subset of those multiple wavelengths that match the at least one wavelength in the first beam set to divert energy of matching wavelengths away from the first location(s) and into the second location(s), thereby providing an inverted active filter by producing an inverted output deficient of wavelengths which exist simultaneously in both input beam sets. This inverted output is differential to the uninverted output, just as with the inverter above, only in this instance, inputs having a variety of wavelengths are provided for the purpose of filtering, removing, and separating one wavelength from another while preserving any information present in the wavelength(s) being filtered.

14. Frequency demultiplexer.

Frequency multiplexing is easily performed by combining individually modulated signals of different frequencies into a common beam path. Demultiplexing is more complex. The procedure used in building a frequency demultiplexer is:

a. Provide a plurality of active filers;

b. Provide a frequency multiplexed beam set having a plurality of modulated wavelengths;

c. Direct a portion of the frequency multiplexed beam set into the second (control) beam set of each filter, and d. Provide the first beam set of each filter with a different frequency of energy matching each of the plurality of modulated wavelengths, thereby providing a frequency demultiplexer by producing a separate modulated output, from each filter, matching each different frequency.

The second type of special interference is not used, because frequencies not having a matching power beam will pass through into the output.

If the second beam sets of the active filters use the same input and first locations, step c. above happens simultaneously as the energy is being directed to that first location. Each frequency will produce a ci at a different location, where the separate outputs are taken.

15. Phase comparison.

When the first type of special interference is used with two inputs of the same level, the output level will be proportional to the phase difference between the two when multiple-wavelength sized locations are used, which produces an averaged, broadband device. If a narrow band device, having a small number of location sets, or even just one, is used, then the phase will have to be more precise, and the output will not be proportional through the entire range of phases from 0 to 180. Precision engineering is able to narrow the phase bandwidth to cover a smaller range.

(See the discussion in "Basic theory of operation" below.)

In either case, the process used in building a phase comparer is:

a. Provide the first and second beam sets with energy having phases to be compared, and b. Use the special interference to produce an output that is at a high level when the first and second beam sets are of opposite phase, and at a lower level at other phase differences, thereby providing a phase comparer.

If both input phases are variable with respect to that used in other components, additional stages will be needed to lock the combination phase produced from a single stage to that of the other stages.

16. Single stage and double stage bistable flip flops.

The principle of feedback has several important applications in the present invention. For purposes of building a flip flop, a portion of the uninverted output is redirected, either directly or through an intermediate process, and fed back into the second beam set. Initially the output is off, and so is the feedback signal.

When a set pulse also enters the second beam set, it is amplified in the output. A portion of that output is fed back into the second beam set, which is again amplified, making the feedback signal larger, etc. This is regenerative feedback.

The percentage of output which is fed back and the organization of the optics determines how the process operates. If the feedback signal is large, the amplifier will be driven quickly into saturation; if it is small, the amplifier will regenerate to produce a greater output, but will not saturate.

Pulsing off either the first beam set or the feedback signal will reset the bistable arrangement. Either type of special interference is able to be used because the energy needed to maintain the set state comes from the first beam set. Because the control beam is off during reset, shutting off the power causes the output to shut off, turning off the feedback beam also.

In addition to its normal binary information storage function, this type of flip flop is able to be made very sensitive by providing a large feedback signal. This sensitivity allows the flip flop to be set by even a single properly phased photon in the second beam set having a wavelength which matches the first beam set's wavelength. As a result, it is very color and level sensitive.

Moreover, by powering it with multiple-wavelength energy, multiple bits are able to be frequency multiplexed using the same components. The procedure used in building such a flip flop is:

a. Use either type of controller;

b. Maintain the first beam set at a substantially constant above-zero level with energy of multiple wavelengths;

c. Pulse the second beam set on with energy having at least one wavelength which matches at least one of those multiple wavelengths;

d. Direct a portion of the output into the second beam set as a feedback signal to hold the output on at each wavelength pulsed on, and d. Pulse either beam set off as a reset signal to terminate the output, and turn off the feedback signal to hold the output off for each wavelength pulsed off, thereby providing a multi-bit bistable function by holding the output on for each wavelength set by the set signal, and holding the output off for each wavelength reset by the reset signal.

One way of providing a flip flop that is not so sensitive to changes is to use two inverters that drive each other the way static RAM cells are made in electronics. Such a flip flop was described in U.S. Pat. No. 5,093,802. However, that invention uses Young's type interference.

Because the present invention also functions as a phase-sensitive active filter, multibit operation is also feasible, producing a clean, uninverted, frequency multiplexed output. The procedure used in building such a phase-sensitive active filter is:

a. Provide first and second inverters;

b. Maintain the first beam set of both inverters at a substantially constant above-zero level with energy of multiple wavelengths;

c. Direct the inverted output of the first inverter into the second beam set of the second inverter to hold the inverted output of the second inverter off at each of the multiple wavelengths present in the inverted output of the first inverter;

d. Direct the inverted output of the second inverter into the second beam set of the first inverter to hold the inverted output of the first inverter off at each of the multiple wavelengths present in the inverted output of the second inverter;

e. Provide a set signal by pulsing on the second beam set of the first inverter with energy having at least one wavelength which matches at least one of the multiple wavelengths, and f. Provide a reset signal by pulsing on the second beam set of the second inverter with energy having at least one wavelength which matches at least one of those multiple-wavelengths, thereby providing a multi-bit set/reset bistable function by holding the uninverted output of the first inverter on for each wavelength set by the set signal, and holding the uninverted output of the first inverter off for each said wavelength reset by the reset signal.

Because the two inverters balance against each other, the set and reset pulses have to be large enough to overcome the balance to drive the flip flop into the new state. Pulses that are too small to cause a state change will not affect the state. As a result, this arrangement is less sensitive to incoming noise.

Another way to reduce the sensitivity is by using threshold detection.

17. Threshold detector.

Threshold detection is able to be accomplished using the present invention so that a schmitt trigger, a neuro circuit detector, a fuzzy logic element, an AND, an OR, and a less sensitive set/reset flip flop are able to be produced by simply supplying the needed number of inputs and adjusting the threshold level so that the process responds as needed.

The prior optical art has no counterpart using Young's interference, and so the method of interconnecting the various signals and the needed relationships between them are herein disclosed. An analogy is able to be made with the electronic world, but the architecture of the present invention differs because of the requirements of beam phasing and setting the relative levels of multiple inputs, not to mention the critical timing needed to operate energy wave interactions.

The basic principle of multiple-beam summing provides the needed input signals for threshold detection. Beam summing is able to be accomplished by directing multiple beams into the first and second locations of an amplifier/limiter/phase filter in a controller having a substantially constant first beam set of at least one wavelength.

However, separating the summing location(s) from the amplifying location(s) allows multiple inputs to be summed prior to amplification, while providing a much clearer understanding of the basic principles involved. Therefore, a third location(s) is used where a number of input signals are summed.

After the input signals are summed at the third location(s), they are separated and directed into the second beam set of the amplifier. As a phase filter, the basic amplifier, using either type of special interference, responds by producing an uninverted output only when the modulated input has the proper phase. The uninverted output will then depend upon the total sum of the inputs relative to the first beam set.

The summing (third) location(s) operate in a special way that makes threshold detection possible. There are two types of input beam sets to the summing location(s). The first type are "trigger inputs", and the second are "threshold-controlling inputs." These two types are 180 degrees out of phase with each other. In complex arrangements, some of these input beams have special assignments, and are given special names such as "set" or "reset" inputs, yet they provide energy that is in phase with one type or the other.

Under the principle of superposition, the amplitudes of the superimposed beams add algebraically. The sum of all trigger beams balances the sum of all threshold-controlling beams. The total algebraic sum of the two sums has the interesting and useful quality of being in phase with the threshold-controlling beams whenever the sum of all threshold-controlling beams is greater than the sum of all trigger beams. That total is out of phase with the threshold-controlling beams whenever the sum of all trigger beams is the greater. If the two sums are equal, the total sum is zero.

If any of the input beams were not zero or 180 degrees, a combination phase would result (with broad band optics). However, because the inputs are of one phase or the other, the sum will be only one phase or the other (or off if they balance).

If at least one of the threshold-controlling beams is held at a substantially constant level, and the level of the sum of the trigger beam(s) is increased from zero, the amplitude of the total sum will decrease, but its phase will remain the same as that of the threshold-controlling beam.

Energy from the summing location(s) is separated and directed into the control input of the amplifier, having a phase upon arriving that holds the amplifier at cutoff (uninverted output off). Because any sum that produces this same phase produces constructive interference at the first location(s), the input level to the amplifier has no effect. The amplifier remains in cutoff regardless of fluctuations in the input levels.

When the trigger input sum equals the threshold-controlling sum, the total sum is zero; as a result, the output of the amplifier remains cut off.

As the trigger sum rises above the level of the threshold-controlling sum, the total amplitude rises. However, its phase has switched 180 degrees, and is now in phase with the trigger sum. If the trigger sum raises rapidly, the phase of the total sum will not pass through all of the phases from zero to 180; rather, the phase jumps from zero to 180. This sudden phase change principle is used for threshold detection by detecting this phase change. As soon as the control input to the amplifier sees the new phase, destructive interference takes place at the first location(s), and energy appears in the uninverted output.

As long as the threshold-controlling input is held constant, it will establish the level at which this phase cross-over takes place. Without this balancing input, the amplifier will be sensitive to the slightest input; its threshold level is zero. However, adding the summing location(s) ahead of and outside of the amplifier allows a threshold to be established at some point above zero.

By changing the threshold-controlling sum, either by changing the level of the main threshold-controlling beam or by adding beams of either phase, from various sources, with various timings, a considerable variety of functions are able to be accomplished from this basic threshold detector. Starting with the basic amplifier or limiter, the procedure for this basic means and method of threshold detection is:

a. Provide at least one trigger beam set having at least one beam of energy directed to at least one third (summing) location, modulated with information to be threshold-detected;

(When this arrangement is used as a schmitt trigger, this trigger input is analog-modulated with the information that is to be digitized by turning on the output whenever this input is above the threshold. When it is used as a neuro detector, fuzzy logic detector, AND or OR, this arrangement has a multitude of trigger inputs that are all in phase with each other.)

b. Provide a threshold-controlling beam set having at least one beam of energy at a substantially constant level directed to the third (summing) location(s);

(This input determines the threshold level that the arrangement will respond to. It is out of phase with the trigger beams.)

c. Produce destructive interference with the trigger beam set and the threshold-controlling beam set at the third location(s) when the trigger and threshold-controlling beam sets are both on, so that the combined phase of energy at the third location(s) is in phase with the threshold-controlling beam set when the trigger beam set is smaller than the threshold-controlling beam set, and is out of phase with the threshold-controlling beam set when the trigger beam set is greater than the threshold-controlling beam set, (This "third" summing location(s) is used to sum the various inputs. When the inputs have only one of two opposing phases, separating the sum of all inputs to this location(s) will produce a signal that is of either one phase or the other, but not in between;

(The threshold-controlling input is kept constant during the time when threshold detection is to take place. If the trigger input(s) are off, the output from the third location(s) is of a phase that does not pass through the limiter.)

d. Direct energy from the third location(s) into the second (control) beam set of the phase demodulator, thereby providing a threshold detector by demodulating phase changes in the combined energy at the third location(s).

The phase demodulator of the present invention produces an output only when its two input beam sets are of opposite phase. When they are in phase, constructive interference rather than the destructive interference needed to divert energy into the uninverted output occurs at the "first location (s)."

At this point, the threshold has been detected, because the amplifier will produce an output only when the sum of the trigger input(s) is greater than the threshold. When the trigger input falls below the threshold, the amplifier goes again into cutoff. Thus, if the particular use for threshold detection requires that the "turning on" threshold be the same as the "turning off" threshold, along with a binary output, then the power beam of the amplifier is adjusted so that saturation occurs at low control beam levels. The uninverted output is then able to be cascaded into another amplifier, if more power is needed.

In many binary circuits, there is a range of levels available so that the turn-on and turn-off thresholds need not be the same. By rapidly changing the threshold, the amplifier is able to be driven quickly into either saturation or cutoff upon reaching the threshold.

Two interrelated principles, feedback and schmitt trigger snap action, are explained above in the discussion of flip flops. Next a feedback signal is added to the threshold detector.

The difference here is that the feedback signal, which is taken from a portion of the uninverted output, is directed into the summing location(s) as an additional trigger input out of phase with the threshold-controlling input rather than being fed directly into the control input as before.

When the threshold is reached by a slowly rising trigger input, the uninverted output comes on, directing energy along the feedback path. If that path is short, the time delay will be negligible in comparison to the rise time of the trigger input. If the delay time is not negligible, then it must be accounted for in the design of the rest of the components in a complex system. For this discussion, however, we will assume that the feedback delay is negligible.

Upon reaching the summing location(s), the feedback signal immediately lowers the threshold level. If the trigger plus the feedback input is sufficient, the amplifier will go immediately into saturation. This is a "snap" toggle-like action. Once the turn-on threshold has been reached by the trigger input, the amplifier snaps directly into saturation. As long as the amplifier remains saturated, fluctuations in the trigger input will have little or no effect on the output because of the limiting action.

What happens when the trigger input goes down depends upon the level of the feedback signal relative to the other summed inputs. If the feedback signal is smaller than the threshold-controlling beam, both the trigger and the feedback beams will be required in order to overcome the threshold-controlling beam.

As the trigger input falls, the amplifier comes out of saturation and the output begins to drop. As the output drops, so does the feedback signal, raising the threshold. The rapidly changing, regenerative driven fall of the feedback signal causes the output to drop just as rapidly as it rose before. Because the regenerative nature of the snap action is quite rapid in comparison to the rise and fall times of the trigger pulse, it is just as easy to snap the amplifier on as it is to snap it off. As a result, the turn-on threshold will be very nearly the same as the turn-off threshold. When the trigger input is above the threshold, the output snaps on, and when it drops below the threshold, the output snaps off. It is a schmitt trigger.

The additional step needed to produce the schmitt trigger action is:

e. Direct a portion of the amplitude modulated output, as a feedback signal, smaller than the threshold-controlling beam set, into the at least one third location, out of phase with the threshold-controlling beam set, thereby providing a schmitt trigger by driving the phase demodulator to a greater output than occurs when the regenerative feedback caused by the feedback signal is absent.

18. Bistable flip flop.

Changing the maximum level of the feedback signal changes the way the threshold detector operates after it has first been turned on.

If the feedback signal is larger than the threshold-controlling input and large enough to maintain saturation, reducing the trigger input has little or no effect on the output.

The amplifier has toggled on, and will remain on. It becomes bistable. The trigger input becomes a "set" input, and there are at least two ways to reset it.

The power beam is able to be pulsed off, but that would require an additional component. A better way is to provide another threshold-controlling input which is pulsed to reset the arrangement. When the reset pulse is combined with the feedback signal and the main threshold-controlling input, the threshold is raised above the level of the feedback signal. The phase of the total sum reverts to the phase of the threshold-controlling input, and the amplifier goes into cutoff.

However, there is also a snap action that occurs here. As the reset pulse rises, the total sum falls. At the saturation point, the amplifier comes out of saturation, and the output (and as a result, the feedback signal) also begins to fall. This causes a regenerative amplification of the fall time. That is, the loss of feedback signal, in turn, causes the output to drop some more, which causes the feedback signal to fall, and on and on. The combination of rising reset pulse and falling feedback causes the amplifier to snap quickly into cutoff.

The reset pulse must be at least large enough to bring the amplifier out of saturation. As a result, there is a "turn-off" threshold, below which the reset pulse will be unable to bring the amplifier out of saturation to toggle it off.

The bistable arrangement described above produces a set/reset flip flop that has an advantage over the previously discussed flip flops, in that it is turned on and off by pulses to separate inputs, whereas the previous flip flops required that one of the beams be shut off.

Starting with the threshold detector above, the procedure for producing a complete set/reset bistable flip flop is:

a. Provide at least one reset beam set, directed to the at least one third (summing) location in the threshold detector, in phase with the threshold-controlling beam set;

b. Direct a feedback signal from a portion of the amplitude-modulated output into the at least one third location(s), the feedback signal at the at least one third location(s) being out of phase with and greater than the threshold-controlling beam set (at the summing location);

c. Pulse the trigger beam as a set pulse, and d. Pulse the reset beam set as a reset pulse, thereby providing a bistable function by turning the amplitude-modulated output on with the set pulse, holding the amplitude-modulated output on with the feedback signal, then turning the amplitude-modulated output off with the reset pulse, and holding the amplitude-modulated output off due to the absence of the feedback signal.

Multi-bit operation also works with this bistable arrangement by using a power beam having multiple wavelengths, by using broad band optics, and then setting and resetting the arrangement with the individual wavelengths.

19. Neuro detector, fuzzy detector, and logical AND.

Providing a multitude of trigger inputs to the threshold detector produces a total sum that is at its maximum when all of the trigger inputs are on. By setting the threshold level just below that sum, and above the level where all but one of the trigger inputs are on, threshold detection will occur only when all of the trigger inputs are on at the same time, producing a saturated output from the limiter.

If this arrangement is connected in a neuro circuit, then it will function as a neuro threshold detector, with the threshold-controlling input being the "weight" signal. Likewise with fuzzy logic. Analog inputs of either phase are able to be summed to provide a "crisp" output from a multitude of "fuzzy" information sources.

If this arrangement is connected in a binary digital circuit, then it functions as a multi-input logical AND. The process used in producing a multi-input logical AND is:

Provide a plurality of trigger beam sets as AND inputs modulated with binary information, the AND inputs having an energy sum, the energy sum of the AND inputs being greater than the substantially constant level of the threshold-controlling beam set when all the AND inputs are on and less than the substantially constant level of the threshold-controlling beam set when one of the AND inputs is off and the remainder of the AND inputs are on, thereby providing a multi-input AND by producing an on output only when all the AND inputs are on.

This process will work with or without the feedback circuit of the schmitt trigger. The schmitt trigger action is especially useful when the input is analog, as is the case with the neuro logic applications.

20. Multi-input logical OR.

If the threshold-controlling signal is smaller than the smallest of the trigger inputs in the threshold detection arrangement, then the limiter will turn on whenever any one of the trigger inputs is on. As a result, the function is a multi-input logical OR. The steps used in producing the multi-input logical OR are:

Provide a plurality of the trigger beam sets as OR inputs modulated with binary information, said OR inputs having an energy sum, the energy sum of the OR inputs being greater than the substantially constant level of the threshold-controlling beam set when only one of the OR inputs is on, thereby providing a multi-input OR by producing an on output when at least one of the OR inputs is on.

The multi-input logical OR is able to be used both with and without feedback. If no feedback is used, the sum signal which is larger than the threshold will be amplified.

21. Multiple input bistable arrangements.

Interesting things happen when the feedback signal is large enough to make the arrangement bistable. Setting the threshold low is the same as placing a multi-input OR on multiple set and reset signals. Setting the threshold high is the same as placing a multi-input AND on multiple input set and reset signals.

Setting the threshold in between causes the threshold to be reached when two out of three, or three out of five, or some similar proportion of inputs has been reached, a function that is very useful in fuzzy logic environments.

22. One shot

The one-shot function is able to be provided using any of the bistable arrangements by adding a delayed feedback beam, the easiest being those that have direct set and reset inputs such as the set/reset bistable device above that uses the threshold detector. The procedure used in providing the one-shot function is to:

a. Direct a portion of the amplitude-modulated output along a delay path to provide a delay period and a delayed-feedback beam set, and b. Direct the delayed-feedback beam set to provide the reset pulse, thereby providing a one-shot function wherein the amplitude-modulated output is pulsed on by the set pulse, held on during the delay period by the feedback signal (already a part of the set/reset flip flop), and then turned off after the delay period by the delayed-feedback beam set.

The delayed-feedback signal is in addition to any feedback that is used to make the original arrangement bistable. Essentially, the one-shot trigger turns the bistable arrangement on, and the delayed-feedback signal turns it off. The length of the delay also affects the duty cycle, because the arrangement is unable to be set again until all energy has exited the delay path. In order to allow a second one shot to begin immediately upon the ending of another, the delayed-feedback signal is able to be differentiated and made into a shorter pulse. Differentiation is discussed below in greater detail.

23. Cascaded amplifiers

To accomplish many of the tasks set out above, many embodiments will require more energy for the many outputs. As a result, a number of amplifiers will be needed in place of the single amplifiers described. Cascaded amplifiers have the qualities of the individual amplifiers plus some important new features.

Cascading one amplifier into another increases the amount of energy in the modulated envelope at each stage. When all of the stages are on, the last output in the cascade series has the accumulated energy of the entire series in the modulated envelope. Since the output of each stage provides more energy to the next stage, each stage is able to be powered by larger and larger beams. The control input to the first amplifier in the series then becomes the controlling input to the whole cascade. As a result, a low level input to the cascade will control the much larger (uninverted) output of the series, thus making the small beam the controller of a larger beam.

The amount of energy in the output of the series has a maximum level of $E_o = E_s 2^n$ where n=the number of stages in the series, and $E_s$ is the level of the small input beam. However, $E_o$ is also limited by the input level to the individual amplifiers in the series. As a result, the maximum level of the output will be limited by the level of the energy-supplying beams. When the cascaded amplifier reaches this limit, it will go into saturation. The addition of more energy into the small input will not cause any more energy from the energy-supplying beams to be diverted into the output because all that is able to be diverted into the output has been.

The procedure used in providing this means and method of cascading amplifiers of the present invention is:

a. Provide a plurality of amplifiers connected in a cascade series;

b. Cascade the output of each amplifier into the second (control) beam set of the next amplifier in the series, and c. Provide at least one large beam, greater than the second (control) beam set of the first amplifier in the series, wherein the large beam is the first (power) beam set of another amplifier in the series, thereby providing control of the large beam by a smaller beam by diverting energy from the large beam through the cascade series and into the amplitude modulated output of the last amplifier of the cascade series in response to the smaller beam.

Since the level of the modulated signal is substantially doubled at each stage, a considerable amount of amplification is able to be accomplished. Such amplifiers have the advantage of not introducing noise into the signal as long as there is no noise in the power beams and no vibrations in the optics.

24. Gated amplifiers used to produce a multi-input AND.

Cascaded amplifiers are able to be used in all of the energy beam circuits described in the present invention. If the first type of special interference is used, the amplifiers are able to be gated. In fact, turning off any one of the power beams turns off the entire series. As a result, cascading is an excellent way of providing a multi-input AND function.

The steps are:

1. Provide a plurality of logical ANDs in a cascade series, and
2. Cascade the output of each logical AND into the second beam set of the next logical AND in the cascade series, thereby providing a multi-input AND wherein all of the first beam sets of the plurality of logical ANDs and the second beam set of the first logical AND in the cascade series must be on in order to turn on the at least one output of the last logical AND in the cascade series.

If the power beams are modulated with analog information, the cascaded series of amplifiers are able to be used as an amplifying mixer.

25. An Oscillator.

The four main items needed to sustain oscillation are: an amplifier, a power source, a frequency determining device, and a feedback path. The present invention provides the amplification. The constant input beam set provides the power source. By directing the output into a delay path, an output pulse from the amplifier will be delayed for a certain period as it travels along the delay path. This provides the frequency determining device. By directing the output of the delay path back into the input of the amplifier a feedback path is established.

One or two other things, though, are also needed. Because the amplified output of a simple amplifier is not inverted, an initiation pulse must be provided. Once oscillation is started, the above arrangement is able to be designed so as to continue oscillating, or it is able to be designed so that the oscillations die out, as in a ring oscillator.

To make a self-starting oscillator, an inverter must be added to the feedback circuit. Together the feedback path then provides an inverted, delayed signal to drive the amplifier. Initially the amplifier is off. The inverter provides a signal to turn the amplifier on. A portion of the output is delayed and inverted before it reaches the amplifier's input. As a result, the amplifier turns off, waits for the delay period, turns on, waits for the delay period, and turns off again in response to the delayed, inverted signal.

Because the feedback signal is the sole source of energy for the control input, and the arrangement is self-starting, shutting the power beam off and on gates the oscillator off and on when using either type of special interference.

As a result, a means and method of energy beam oscillation begins with the basic amplifier and is produced by the following procedure:

a. Provide an inverted delayed signal to the amplifier by directing a first portion of energy from the amplitude-modulated output along a delay path and through an inverter means. The inverter means is able to be the inverter described above, or the Young's interference inverter described in the prior art;

b. Direct the inverted delayed signal to the second beam set to turn the amplitude-modulated output on and off, with the second beam set remaining on during the period when the inverted delayed signal is on, and off when the inverted delayed signal is off to produce oscillation, and c. Switch the (power) first beam set off during the time when oscillation is to be gated off, thereby producing energy beam oscillation by successively turning the uninverted output on or off during each delay period, and gating off energy beam oscillation by turning off the first (power) beam set.

Energy beam oscillation is able to be accomplished using any of the amplifying components, including the bistable and threshold processes. Components are connected in circuits just as their electronic counterparts are; however, each interconnection must have the correct phase and timing relationships in order to work.

26. Phase locking and demultiplexing.

A phase-fluctuating beam, such as is the case when beams from two different lasers or other sources need to be phase matched, is directed in parallel into a group of phase filters/demodulators of the present invention. The quality of the optics used will have a great bearing on the actual bandwidth passed by each phase filter/demodulator. Sufficient filter/demodulators are provided in order to cover the entire spectrum used by the phase-fluctuating input. Each demodulator is provided with a different, but constant, phase signal. The outputs will be a demultiplexed set of signals that produce their individual outputs as the phase-fluctuating signal fluctuates into the bandpass region of each individual filter/demodulator.

The phase filter/demodulators produce a maximum output only during the time when the phase-fluctuating signal and the individual power beams are 180 degrees out of phase. As a result, the outputs have a substantially constant phase output during the time that they are at maximum. Phase adjusting each of the filter/demodulator outputs and then recombining them into a single beam again results in an output beam that has a substantially constant phase, relative to the power source of the controllers, having energy from both the power and phase-fluctuating beams. As a result, the two sources have been phase-locked together.

If the phase-fluctuating beam is at a substantially constant level, then the phase-locked output will also have a substantially constant level, even though the individual controllers will be on individually in accordance with the phase at any given moment. Because at least one will be on at any given instant, however, the output will remain on, and if the input is amplitude-modulated, the output will likewise be amplitude-modulated.

If narrow band controllers are used, the first location(s) are able to be used for all of the controllers. The output locations are able to be close enough together to form a continuous band. An optical phase changing element is able to be positioned so that energy at each point along the band will receive a different phase change. Then, directing all of the phase changed outputs to the phase-locked output location brings them to one location with the same phase.

The procedure used in producing the means and method of phase locking is:

a. Use the phase demodulators of the present invention;

b. Provide a phase-fluctuating beam set;

c. Direct a portion of the phase-fluctuating beam set into each second (control) beam set of each of a plurality of the demodulators;

d. Provide the first (power) beam set of each demodulator with a different phase of energy;

e. Direct the amplitude modulated outputs of each demodulator to at least one third location, such that energy from all demodulator outputs arrives at that third location mutually in phase, and f. Direct energy from that third location to provide a phase-locked output, thereby phase-locking energy from the phase-fluctuating beam set to a substantially constant phase output having a substantially constant amplitude.

An important use of the phase-locked output is phase-locking one wave train with another wave train in order to produce a substantially constant phase output from multiple wave trains so as not to lose information being stored and processed in an optical computer because of phase shifting in the power source.

The principle of operation is to provide enough phase demodulators so the sum of their band widths covers the range of fluctuation. The fluctuating phase signal is viewed as a phase multiplexed signal wherein only one phase is present at any one given moment. Because the phase demodulators produce constructive interference at their output location(s), the phase of that signal will be of a known phase, namely the phase of the power beam. When the control input is not of the correct phase, the output will be off (within the bandwidth range determined by the precision of the optics).

The output from the demodulator having the matching (and known) phase is directed into the phase-locked output after the phase is first adjusted to match the phase of all the other demodulator outputs. The demodulators take turns firing, depending on the phase of the fluctuating phase input. However, the combined output has a substantially stable phase made up of energy from both beams.

The stability of the output phase depends on the bandwidth of the individual demodulators, and the number of them being used, for that determines the resolution of the process.

Why would anyone want to combine two cw signals to produce a constant phase signal? One application is to lock wave trains together. Even the best lasers produce finite wave trains. That means that abrupt phase changes sometimes occur in the laser outputs, which amounts to a form of phase modulation.

When the tail end of one wave train is locked to the start of the next wave train, the phase-locked output is able to maintain a substantially stable phase, or at least one that changes very slowly. Substantially constant phase is necessary for the operation of high-speed optical computers.

These processes are able to be incorporated right into the feedback path of the laser itself so that it will output wave trains that are phase-locked together.

Multiple sources, even some non-laser sources, are able to be phase-locked together using this means. The phase locking and filtering qualities of the present invention allow a seed signal, such as a low-power laser, or even a high-quality color filter, to be used as a locking standard for extracting and phase-locking energy from a thermal source, sunlight, or white light. Certainly, the present invention will be very useful in spectroscopy.

Information extraction:

If the phase-fluctuating beam has been amplitude-modulated, the phase-locked output will also be amplitude-modulated by the phase-fluctuating beam. As a result, information is able to be extracted from one source, such as light from an optical fiber, and prepared for processing in a phase-locked system such as an optical computer.

When that beam is frequency-modulated, all of the phase demodulators turn off together when the wavelength changes so that it is out of the combined bandwidth of the group of demodulators. As a result, information transmitted using one energy source is able to be transferred over to devices driven from another energy source by using either frequency or amplitude modulation.

Phase locking is essential for producing high-speed communications links between optical computers, including fiberoptic telephone transmission systems.

The additional step needed to extract modulated information from a phase fluctuating signal is:

g. Amplitude- or frequency-modulate the phase-fluctuating beam with information to be extracted, thereby providing an amplitude-modulated output containing that information and having a substantially constant phase at the phase-locked output.

27. Phase encoder/modulator.

Phase encoding and phase modulating from an amplitude-modulated signal are able to be accomplished by producing a differential amplitude-modulated signal pair and recombining the two signals having opposite phases. When one of the differential pairs is on, the combined output has one phase; when the other one is on, the combined signal has the opposite phase. In between it has a combined phase. The procedure for this means and method of phase modulating or encoding is:

a. Use either type of controller;

b. Maintain the first (power) beam set at a substantially constant above-zero level;

c. Amplitude-modulate the second (control) beam set;

d. Direct a portion of the at least one output, having a first phase, to at least one third location;

e. Separate a portion of energy from the first location to produce an inverted signal having a phase opposite the first phase;

f. Direct the inverted signal to that third location, and g. Direct energy from that third location to produce a phase-modulated output, thereby producing a phase modulator by causing energy of the first phase to output when the second input beam set is on, causing energy of the second phase to output when the second input beam set is off, and causing the phase of energy at the phase-modulated output to change proportional to the amplitude of the second (control) beam set.

28. NAND.

Boolean algebra provides for the production of various logic gates by combining logic functions. When combining functions that use special interference, certain things (such as the carrier wave phase) need attention, as they have no counterpart in electronics. As a result, this disclosure also contains some examples, so that process interconnection is substantially and clearly taught.

In Boolean logic, an inverted AND output produces a NAND. This is the procedure:

a. Use any of the previously described AND functions, and b. Direct the at least one output of the logical AND into a logical NOT means, thereby providing a logical NAND.

The NOT is able to be either of the present invention or of the prior art.

29. NOR.

The logical NOR is produced by inverting the two inputs to an AND. The procedure used in producing a logical NOR is:

a. Use the AND of the present invention;

b. Provide a first logical NOT means having an energy beam output directed into the first beam set of the logical AND, and c. Provide a second logical NOT means having an energy beam output directed into the second beam set of the logical AND, thereby producing a logical NOR.

As common as these interconnections are in the electronic world, they have not been done before using energy beam ANDs that use special interference. Again, the energy beams must interface while meeting all of the phasing and directing requirements for the individual parts disclosed herein.

30. EXCLUSIVE OR.

The Exclusive OR function of the prior art produces an output having a phase-modulated component. When one input beam is on by itself, the output is of one phase. When the other beam is on by itself, the output is of the other phase. The present invention corrects that problem by separating the phase-modulated output, correcting the phase and recombining them back together. The process used in building an Exclusive OR is:

a. Use the phase demodulators of the present invention;

b. Produce a first Exclusive OR input beam set having at least one beam of energy modulated with binary information directed toward at least one third location;

c. Produce a second Exclusive OR input beam set having at least one beam of energy modulated with binary information directed toward that third location;

d. Produce destructive interference at that third location when the first and second Exclusive OR input beam sets are on;

e. Direct energy from that third location into first and second said phase demodulators, the first beam sets of the first and second phase demodulators being of opposite phase so that the amplitude-modulated output of the first phase demodulator is on when the first Exclusive OR input beam set is on by itself, and the second phase demodulator is on when the second Exclusive OR input beam set is on by itself;

f. Direct energy from said first phase demodulator to provide at least one Exclusive OR output, and g. Direct energy from the second phase demodulator to the Exclusive OR output while providing a 180-degree phase shift so that the energy from the first and second phase demodulators have matching phases at the Exclusive OR output, thereby providing an Exclusive OR having a substantially constant phase output.

31. A Binary half adder.

The Binary half adder function is produced by providing an AND output as a carry signal, and an Exclusive OR as a sum signal, from a common input. The procedure used in making a binary half adder is:

a. Use the Exclusive OR of the present invention;

b. Direct a portion of energy from the first Exclusive OR input beam set to a first input of a logical AND means, and c. Direct a portion of energy from the second Exclusive OR input beam set to a second input of the logical AND means, thereby providing a binary half adder by providing the Exclusive OR output as a sum output and an output of the logical AND as a carry output.

32. A clock signal for the bistable flip flop.

Adding a clock signal to a bistable flip flop of the present invention involves more than what is needed in electronics. The high-speed nature of the carrier waves used in the present invention will cause false signals to appear at times, and in places where they would not in slower media, such as conventional electronics.

A bistable flip flop of the present invention is used that has separate set and reset inputs. An amplitude-modulated clock pulse stream must be directed first to the set input and then to the reset input. If the clock signal is directed to both inputs simultaneously, unpredictable results will occur. As a result, two AND gates are used to direct the clock signals to the appropriate inputs by enabling the gates individually for a short time slightly longer than the length of the clock pulses. This insures good solid set and reset pulses. The procedure is:

a. Use either of the set/reset binary flip flops of the present invention that have an on-pulse reset input as well as an on-pulse set input;

b. Provide first and second logical AND means;

c. Provide a clock beam set having at least one pulsed energy beam of alternating first and second pulses;

d. Direct a first portion of the clock beam set into a first input of the first logical AND means;

e. Direct an output of the first logical AND means to provide the set pulse;

f. Direct a second portion of the clock beam set into a first input of the second logical AND means;

g. Direct an output of the second logical AND means to provide the reset pulse;

h. Direct a portion of the amplitude-modulated output of the bistable function along a first delay path, providing a delay time, and a delayed bistable beam set;

i. Direct a first portion of the delayed bistable beam set into a logical NOT means;

j. Direct an output of the logical NOT means to a second input of the first logical AND means, and k. Direct a second portion of the delayed bistable beam set into a second input of the second logical AND means, thereby providing a clocked bistable function by setting the bistable function using the first pulses that pass through the first logical AND means when the second input of the first logical AND means is held on by the logical NOT means in the absence of the delayed bistable beam set and the first pulses are prevented from passing through the second logical AND means by the absence of the delayed bistable beam set, then resetting the bistable function by using the second pulses that pass through the second logical AND means when the second input of the second logical AND means is held on by the delayed bistable beam set and the second pulses are prevented from passing through the first logical AND means by the presence of the delayed bistable beam set, which is inverted by the logical NOT means to hold the first logical AND means off.

Delaying the bistable beam before it is able to turn on the NOT, and turn off the first AND, allows the first clock pulse to pass through to set the flip flop solidly on before that opportunity expires after the delay period. Delaying the bistable beam before it is able to turn off the second AND allows the second clock pulse to solidly reset the flip flop before the time period expires. In each case, the clock pulse must be shorter than the delay period; otherwise, unpredictable things happen.

33. Binary digit counter, energy beam differentiation, and integration.

Because the clock pulses of the clocked bistable arrangement set forth above must be shorter than the delay period, additional carrier wave circuitry must be added so that one bistable device is able to be directed into another bistable device. To accomplish that task, a clock signal having a long pulse width must be differentiated.

Differentiating a carrier wave pulse is a little different from differentiating an electronic pulse. Differentiating a positive electronic pulse results in a short positive pulse, followed by a delay period equal to the length of the input pulse minus the positive pulse, followed by a negative pulse. The analogous differentiation of a long carrier wave pulse results in a short carrier wave pulse, followed by a long off period that equals the length of the input pulse minus the short pulse, followed by a short pulse having phase opposite that of the first short pulse.

Energy beam pulse differentiation is accomplished by dividing the pulsed beam into two portions. One portion is directed along a delay path having a delay equal to the differentiated pulse width. The delayed portion is then recombined with an undelayed portion at a location(s) for performing the differentiation. An output is provided from that differentiation location(s). During that short delay period, energy is output as the leading short pulse. When the delayed energy arrives from the delay path, destructive interference is produced at the differentiation location(s) which shuts off the output. As long as the input continues, the differentiated output remains off.

When the input shuts off, destructive interference stops. However, energy is still coming from the delay path. This energy is output as the trailing short pulse. However, this pulse is 180 degrees out of phase with the leading pulse.

The result is a differentiated pulse pair having opposite phases, which is produced from a single input pulse. The advantage of such an arrangement is that the off period between the two pulses is able to be any length without affecting down stream components, while the delay period that establishes the differentiated pulse widths is able to be standardized to match the requirements of other components. An excellent example is in the production of binary counters.

In order to produce a counting stage, the bistable device must be clocked on or off on every other binary pulse output from a bistable component that is able to have pulse widths of various lengths. Therefore, the input clock is first differentiated so that standard-length short pulses will be presented to the following binary stage. Because the energy beam AND means of the present invention respond only to input signals of the proper phase, either of the differentiated pulses are able to be used by simply adjusting the phase of the differentiated signal to match that needed by the ANDs. The ANDs will respond to only one of the pulses. The steps used in producing this means and method of producing a binary counting stage are:

a. Providing a binary input beam set having pulses longer than the delay time;
   b. Directing a portion of the binary input beam set to at least one fourth location;
   c. Directing another portion of the binary input beam set along a second delay path and then to the at least one fourth location as a delayed beam set;
   d. Producing destructive interference using the binary input beam set and the delayed beam set at the at least one fourth location when both the beam sets are on;
   e. Separating energy from the at least one fourth location to provide differentiated pulses, and
   f. Directing the differentiated pulses to provide the clock beam set of the clocked bistable function, thereby providing a binary digit counter which allows use of binary input beam pulses longer than the delay time to clock the clocked bistable function by differentiating the binary input beam set to produce a leading pulse having a constant pulse length, and a trailing pulse having a constant pulse length, the leading pulse being out of phase with the trailing pulse and the clocked bistable function responding to at least one of the pulses.

Differentiation is a very effective way to build a sequencer. A long pulse is differentiated. If only one of the pulses is needed, then an amplifier is used to remove one of them. The output is apportioned out into a group of delay lines having different lengths. This approach is able to be used to produce quadrature pulses or sequence pulses for an optical processor.

Integration

The energy beam equivalent of an electronic capacitor is the delay line. Energy is directed into a delay path. At some later time the energy exits the delay path. This process is used to differentiate a pulse by turning it off after a delay period, and then retrieving the energy stored in the delay path at the end of the pulse.

Integration is the accumulation of energy over time. To accomplish integration with energy beams, the beam to be integrated is portioned out into one or more delay lines of different lengths. The output of the delay lines is accumulated at a summing location. To differentiate using this arrangement, the delayed pulse is brought back out of phase. To integrate, the delayed energy is brought back in phase.

The length of the input pulse relative to the delay periods determines what kind of waveform will result. If the pulse is longer than the delay lines, then an amplitude increase will occur as energy from the various paths arrives simultaneously at the summing location.

If the several delay lines have delay times that increase by one pulse time each, the integrated output will be a series of pulses that are able to be close enough together so that they will function as a single long pulse. In practice that may be difficult, because even the slightest break in energy flow may disrupt the process. The present invention cures these problems by using a threshold detector, a schmitt trigger, a limiter or a bistable arrangement to provide a constant-level output from the varying-level integrated signal.

Interestingly, a frequency multiplier is able to be made by first differentiating a long pulse and delaying portions of it for successively longer times, so that the final waveform turns on and off at a frequency greater than the main input pulse.

34. Binary counter.

The next step is to produce a binary counter by interconnecting a number of variable-length clockable flip flops in a cascade series. The procedure used in making such a binary counter is:

a. Use the means and method of variable pulse length clocking;
   b. Provide a plurality of the binary digit counters in a cascade series;
   c. Direct the amplitude-modulated output of each binary digit counter to provide the binary input beam set of the next binary digit counter in the cascade series, and
   d. Provide the binary input beam set of the first of the binary digit counters in the cascade series with pulses to be counted, thereby providing a binary counter by connecting a plurality of the binary digit counters in a cascade series that produces binary outputs representing pulse count.

35. Square wave oscillator.

The oscillator described above is capable of producing a variety of wave forms including a sine wave, modulated waveform envelope. A square wave results from connecting a bistable arrangement to produce oscillation. The procedure used in making the square wave oscillator is:

a. Use any of the above bistable arrangements which has a reset input;

b. Hold the set pulse on during the time when square wave oscillation is to take place and off when the square wave oscillation is to be gated off;

c. Direct a portion of the amplitude modulated output along a delay path which has a delay period and through a logical NOT means providing a delayed bistable signal which is inverted, and d. Direct the delayed bistable signal to provide the reset pulses, each of the reset pulses being larger than the sum of the set pulse and the feedback signal, thereby providing a gated square wave energy beam oscillator by repeatedly turning the bistable function on or off at least once for each delay period, and gating oscillation off by turning off the set pulse.

36. D type flip flop.

A D type flip flop is a fundamental circuit that stores a binary bit input on one beam set upon turning on an enabling beam set. The procedure used in making a D type flip flop is:

a. Use either of the set/reset binary flip flops having pulse set, and reset inputs;

b. Provide first and second logical AND means;

c. Provide a data beam set having at least one beam of energy modulated with binary information;

d. Provide an enabling beam set having at least one beam of energy modulated with data storage enabling information;

e. Direct a first portion of the data beam set into a first input of the first logical AND means;

f. Direct a second portion of the data beam set into a logical NOT means;

g. Direct an output of the logical NOT means to a first input of the second logical AND means;

h. Direct a first portion of the enabling beam set into a second input of the first logical AND means, and a second portion of the enabling beam set into a second input of the second logical AND means;

i. Direct an output of the first logical AND means to provide the set pulse, and j. Directing an output of the second logical AND means to provide the reset pulse, thereby providing a D-type bistable function by setting or resetting the bistable function depending upon the state of the data beam set during the time when the enabling beam set is on.

37. Multiple uses, multiple energy forms.

The principles for interconnecting energy beam components, described herein, are able to be used in a countless variety of complex arrangements, just as the basic building blocks of electronics are. Energy beam differentiation, input summing, threshold detection, frequency and phase filtering, energy beam phasing for component interconnections, and using multiple rays to form interacting images are just some of the important features that allow the present invention to be interconnected and used in complex arrangements.

All of these things have been disclosed so as to provide a broad foundation for using special interference. In view of the many transistor-like functions described herein, and its ability to use electromagnetic energy, the present invention is able to be rightfully referred to as a "photonic transistor."

The endless variety of complex devices built from standard electronic building blocks are able to be duplicated using the present invention. If electromagnetic energy is used, the speed of such devices is phenomenal in comparison to their electronic counterparts.

When electromagnetic energy is used in digital photonic circuits, both the power amplifying and power limiting ability of the present invention provide a wide range of uses that are directly analogous to the use of amplifiers and limiters in electronic circuits, and are able to perform the same types of tasks at a higher speed than conventional electronics.

When the wave properties of electron beams are used in the present invention, free space electronic structures that perform the functions outlined herein are able to be produced. There are many advantages to the use of free space electrons, or electrons confined to spaces wherein their wave properties are able to be exploited.

Very sensitive instruments are able to be made using the present invention. For example, small numbers of certain subatomic particles are difficult to detect. By using a stream of such particles as the power beam set in the present invention, small numbers of input particles to the second beam set are able to be turned into proportionately larger numbers of such particles which are then more easily examined.

There are many embodiments that are able to be made using various energy forms. If the present invention is incorporated into a radar antenna or X-ray machine, phase-modulated reflected or transmitted signals are able to be detected. If an array is set up whereby each pixel is an amplifier of the present invention, the output will be a composite, amplitude-modulated image of the reflected or transmitted radar or X-ray phase-modulated image. From such information, full three-dimensional radar images are able to be constructed by providing a matching array of frequency converters of the prior art that convert the non-visible pixel amplitudes to visible pixels. The same is true for sonar when using acoustical energy in the present invention and converting each pixel to visible energy.

The present invention is also able to operate using multiple differing energy forms in the same locations. For example, one embodiment is able to include both acoustical waves and light by orienting the input components for each one so that they have a common point for output separation, and given the proper media at these locations, the various energy forms are able to be made to interact with each other. Likewise, information carried by different frequencies of the same energy form are able to be transferred from one frequency to another.

Reflected ultrasonic sonar waves are essentially modulated beam sets, capable of producing constructive and destructive interference at the "first" location of this combination embodiment. Constructive and destructive interference of the acoustical wave will cause the medium in the embodiment to compress and decompress. Changing the density of a medium changes its index of refraction and, as a result, will phase-modulate the light beam going through it. This phase modulation is able to be used directly or in cooperation with a second beam so that the effect is able to be amplified right at the point of energy form conversion.

The result is a super-sensitive microphone which is able to detect phase changes in the acoustical wave and direct the gathered information into a photonic computer made of many interconnected components of the present invention.

Certain types of materials react to light to produce beat frequencies. Using such materials in an embodiment of the present invention allows light to be heterodyned, frequency multiplied, and divided, even while the signals are being amplified.

Other types of materials are photosensitive to light of one frequency, while being able to cause a reaction with light of another frequency. When such materials are placed in an embodiment of the present invention, information contained on a beam of one frequency is able to be transferred to a beam of another frequency.

Any two energy types or frequencies of the same wave-type energy is able to be used simultaneously to interact with the present invention by providing the proper medium for promoting the interaction. The present invention is then used to transfer information from the one energy type to the other by providing a sensitive, amplifying environment in which to make the transfer.

38. Basic theory of operation.

Applicant theorizes that the amplitude and intensity of energy at the purely constructive interference locations, using the first type of special interference, are able to be calculated using an adaptation of the standard vector sum of amplitudes method used with other interference phenomena.

The basic formula for intensity has been derived from the law of cosines and considers just two incoming rays.

That formula is:

A=amplitude of the first beam.

B=amplitude of the second beam.

Theta: phase difference between the two beams.

$$\text{Intensity} = I = A^2 + B^2 + 2AB \cos(\text{Theta})$$

The Total amplitude $T_{ci}$=square root of I, just as $A^2$=the intensity of amplitude A.

At the center of the constructive interference (ci) area, Theta=0, and the Cos(Theta)=+1. At the center of the destructive interference (di) area, Theta=180 degrees, and the Cos(Theta)=−1. As a result, the vector sum of two amplitudes at these two locations is also the algebraic sum of the amplitudes.

The two rays are in phase in the ci area, so the sum has that same phase. As a result, the ci intensity formula is, $I=A^2+B^2+2AB=(A+B)^2$ In the di area:

The two rays are out of phase in the di area, so that the vector sum is the difference of the two amplitudes, which takes on the phase of the largest of the two. If they are equal, the algebraic sum is zero. The di formula for intensity becomes:

$$I_{di} = A^2 + B^2 - 2AB = (A-B)^2$$

These two conditions are also able to be viewed as the vector sums of three different rays, which will be labeled $B_1$, $B_2$, and U. In the di area, $B=-B_1=B_2$, so that U is the difference between A and B, and A=B+U When A is on by itself, the amplitude at location 1 is the vector sum of $B_1$ and U. The intensity is $(B_1+U)^2$.

When beam $B_2$ comes on it combines with the first two. Since it is 180 degrees out of phase with $B_1$ and U, the totals of amplitude and intensity are as shown in formulae 1.

Formulae 1, di location for all of the interference types:

$$T_1 = T_{di} = B_1 + U - B_2 = U$$

$$I_1 = I_{di} = (B_1 + U - B_2)^2 = U^2$$

also, by substitution we get:

$$\begin{aligned} I_1 = I_{di} = A^2 + B^2 - 2AB &= (B+U)^2 + B^2 - 2B(B+U) \\ &= B^2 + 2BU + U^2 + B^2 - 2B^2 - 2BU \\ &= U^2 \end{aligned}$$

This is exactly what is expected because the amplitudes add algebraically, and the intensity is the square of the amplitude.

This indicates that the addition of an out-of-phase beam smaller than the first beam leaves energy having an amplitude equal to the difference of the two. If it is viewed as the sum of three beams, two of which are equal in amplitude but of opposite sign, the third beam is equal to the amplitude of the energy remaining at this location after all three have been summed.

The process of interference relocates energy within a fringe image. The equivalent amount of energy that is missing from the di areas appears in the ci areas. As shown above, when two unequal beams interfere destructively, not all of the energy in the di areas is relocated into the ci areas. The remainder is exactly equal to the difference between the two unequal beams. This remainder has not been relocated; it continues to arrive at the di location. As a result, this remaining energy is able to be called "undiverted" energy, because it has not been diverted into the ci areas by the interference.

As a result, one is able to describe the energy which is apparently missing from the di area as "diverted" energy.

In Young's ci area:

In the case of Young's type interference, the amplitude of energy arriving at a second location, namely the ci area, when only one beam is on is A. A is able to be considered as the sum of two amplitudes $B_1$ and U.

Again, when beam $B_2$ comes on, it combines with the first two. Since it is in phase with $B_1$ and U, $B=B_1=B_2$ and the totals of amplitude and intensity are as shown in formulae 2.

Formulae 2, Young's interference type in either amplification or saturation:

$$T_2 T_{ci} = B_1 + U + B_2 = 2B + U$$

$$I_2 = I_{ci} = (B_1 + U + B_2)^2 = (2B+U)^2$$

also, by substitution we get:

$$\begin{aligned} I_2 = I_{ci} = A^2 + B^2 + 2AB &= (B+U)^2 + B^2 + 2B(B+U) \\ &= B^2 + 2BU + U^2 + B^2 + 2B^2 + 2BU \\ &= 4B^2 + 4BU + U^2 \\ &= (2B+U)^2 \end{aligned}$$

This is also exactly what is expected because the amplitudes add algebraically, and the intensity is the square of the amplitude.

In this case, Young's type interference has energy directed to this ci location when only one beam is on. It is able to be viewed as having two components. When the second beam comes on, energy from the di area is diverted into the ci area. As shown above, the amount added to the ci area by interference exactly equals the amount removed from the di area.

As a result, two equal parts exist, $B_1$ and $B_2$. One came from beam A and the other from beam B. The difference between the two is U.

In both the ci case and the di case, U remains unchanged. It has been called "undiverted" energy. Apparently, it remains unaffected by the interference that is taking place between $B_1$ and $B_2$, even in the ci area.

If B rises to become equal with A, U drops to zero at both places. The resulting interference image goes completely dark at the di location, and the intensity at the ci location goes to $4A^2=4B^2$. All of the energy contributes to the interference image.

When A and B are not equal, the image formed is able to be viewed as being the sum of two images. One image is the interference image formed by portions $B_1$ and $B_2$ in the familiar interference fringe pattern. The other image is a consistent spot, having no contrast change from one part to another; its amplitude equals U, and its intensity is $U^2$.

As a result, U, the difference between two unequal beams, can rightly be called "undiverted," for it arrives at the same locations and in the same pattern as when $B_1$ and $B_2$ are off.

$B_1$ and $B_2$ are rightly called "diverted" energy, because this energy has been rearranged, or "diverted," in order to form the interference image. In that image, the energy from the di location is diverted into the ci location to combine with an equal contribution from the other beam that will arrive there anyway in the absence of interference.

In special interference:

Next, we examine special interference. Special interference has no contribution to location 2, the ci location, when only one beam is on. This occurs because the beams are small in comparison to the di location, and are directed only toward the di location, and are not spread out to cover the location where ci will eventually take place.

The di area functions exactly as described above, as having two in phase beams from A, with the out-of-phase B.

The ci area has no energy in the absence of interference. Most importantly, it has no "undiverted" energy (that is, U=0).

When the second beam ($B_2$) comes on, interference occurs producing an interference image that removes energy from the di location, ($B_1-B_2$), leaving U as residual energy.

The energy removed from the di location is diverted into the ci location as $B_1+B_2$. It has an intensity of $(B_1+B_2)^2$.

Again by substitution we get:

$$I_2 = I_{ci} = A^2 + B^2 + 2AB = (B+U)^2 + B^2 + 2B(B+U)$$
$$= B^2 + 2BU + U^2 + B^2 + 2B^2 + 2BU$$
$$= 4B^2 + 4BU + U^2$$
$$= (2B+U)^2$$

However, U=0 at this location, producing the important relation as shown in formulae 3.

Formulae 3, first interference type in either amplification or saturation:

$T_2=2B$ $I_2=(2B+0)^2=4B^2$

As a result, a formula for the first type of special interference has been derived for both the amplitude and the intensity.

The total amount of energy in any one application depends upon the area of ci and the area of di, because they are able to be made up of many rays, even thousands or billions of rays. The total energy is able to be expanded to cover large areas, or focused to small areas. The output characteristics will be a function of the size, locations, and the ratio of output area to image area of the image component separator relative to the image. Contributions of energy from the other parts of the image that are not pure ci or di also contribute to the overall operation of the invention.

The importance of these formulae to the process of amplification and limiting cannot be overstated. As an example, a substantially constant power beam A that is directed to location 1 and a control beam B (which is smaller than A) produce an interference image at locations 1 and 2, with di at 1, and ci at 2.

The output intensity is $4B^2$, and the amplitude is 2B. It does not matter how much larger A is than B, within the limits of the breakdown of the optics or other factors that would physically change the arrangement. Energy diverted into the output is directly proportional to the control beam B.

When the control beam is amplitude modulated, the output is also amplitude-modulated, having twice the amplitude of the control beam. The energy in the information carrying portion of the output waveform has been doubled. Unlike the amplifier of the prior art that uses Young's interference, the present invention does not produce the residual output U, the undiverted leftover energy that does not contribute to the interference image.

As long as the modulated beam is smaller than the constant beam, the output will be amplified. The output amplitude is always double the smaller of the two.

Next consider what happens when the modulated control beam rises above the level of the constant power beam. With B>A, for any given instant the output will be twice the smaller of the two. It is the same as switching the beam names in the formulae above. Because the smaller one is also the constant one, the output will be a constant 2A no matter how highly B is modulated, again within the realm of not destroying or modifying the optical arrangement. This condition is called "saturation." All of the energy from beam A that is able to be has been diverted into the output.

As a result, the amplification curve of the present invention is NON-LINEAR. Non-linear optics that operate at the speed of light is able to accomplish many tasks that are otherwise impossible. A modulated waveform will be limited and clipped at the point where the two input beams are equal.

Second type of special interference:

The second type of special interference is also able to be viewed as having three component amplitudes. The power beam (A) is directed to the di location; none of it is directed to the ci location, just as with the first type of special interference.

The control beam (B) is directed to both locations. For that reason, this type of interference will not produce a logical AND in a single stage; however, it makes an excellent amplifier.

When the control beam is off, $I_2=0$, and $I_1=B_1+U$.

When the control beam is less than the substantially constant power beam, $A=B_1+U$, and $B=B_2$. The amplitude at location 1 will be $B_1+U$.

Formulae 4, 2nd interference type in amplification:

Amplitude=$T_2=B_1+B_2=2B$

Intensity=$I_2=(B_1+B_2)^2=4B^2$

This is the same as with the first type of special interference. The difference appears when the arrangement goes into saturation. When that occurs, the undiverted energy (U), which equals B−A (because B is larger) does not come from the power beam. In this case the residual energy comes from the control beam which is directed straight into the output. As a result, the output during saturation is as shown in formulae 5.

Formulae 5, 2nd interference type in saturation:

Amplitude=$T_2=B_1+B_2+U=2B+U=2A+U$ $$\text{Intensity} = I_2 = (B_1 + B_2 + U)^2 = 4A^2 + 4AU + U^2$$

Amplification is reduced because A is constant. All of the available energy of the power beam has been diverted into the output. Further increases in B only increase the size of U, which is not doubled. When squaring to produce the intensity, the 4AU factor indicates that there exists some interaction with energy from other parts of the interference image, but U remains the same.

As a result, this second type of special interference behaves like the first type of special interference when B<A. However, it behaves like Young's interference when B>A. Amplification is still limited somewhat, but it is not clipped.

Broad band and narrow band arrangements.

The above-described process is phase-dependent. The energy removed from the di location is relocated in the ci position. But what if the signals arrive at the first location at some other phase? In this case, the ci position is at some other location, resulting in near binary operation of a phase-modulated signal. The inputs would have to be exactly out of phase in order for the ci location to be the same as the output location.

In practice, the optics used will have to be engineered in wavelength units and wavelength sizes. Most optical arrangements rely on an averaging of energy from multiple points of the cross-section of an input beam. Averaging of energy from these multiple points produces the familiar sinusoidal interference fringe.

If the amplifier is engineered to include a large number of such points so as to use the averaging principle, then it will have a wide bandwidth and will be able to function using a number of input frequencies. The output locations function as if a group of controllers were placed side by side, each one using an individual ray set.

In this case, the output hole includes a large number of wavelength size locations. For slightly different phases and slightly different frequencies, the ci location from each pair of input locations will be at slightly different output locations. If those output locations happen to be within the area of the hole, the energy will output. If they are not, it will not.

Modern optics is capable of operations at wavelength sizes. Wavelength size input beams and wavelength size output holes will produce processes that operate considerably differently from the multiple-location averaging style of optics. The more precise the optics are, the more precisely phases and frequencies must be in order for the ci area to hit the output hole.

Wavelength size precision will cause a phase-modulated signal to output only when the phase is close enough to 180, at the first location, in order for the ci area to hit the wavelength size output hole. The output from an analog phase-modulated signal would be a binary output that occurs only when the two inputs are exactly out of phase.

If multiple frequencies are used, the only ones that will be able to hit the output hole will be those that match the wavelength geometry so that the ci location is where the tiny hole is.

As a result, each method and each device must be engineered to produce the type of amplifier needed. If a phase demodulator is to operate with an analog input, it will have to be of the averaged, multiple location (broad band) type. If it is to be used in a binary circuit, then the single wavelength-size location (narrow band) type will work quite well.

It is possible to produce a considerable number of composite operations by using a number of wavelength-size controllers having a common first location, but separate output locations; thus, a variety of signals are able to be handled all at once.

A frequency division demultiplexer is able to be produced by inputing the beams from different locations directed to a common location. Each different frequency will produce its ci at a different output location. If each output location has its own output hole in the image component separator, a complex group of frequencies in the input will be separated into separate outputs. Meanwhile, it will filter out any frequencies in between, because no output hole is provided for those frequencies, and no matching input frequency is provided.

If the control input is directed to a common location and a number of power inputs are used, each having a different frequency and a different location, the geometry is able to be arranged so that the ci locations all match, producing a very accurate frequency-selectable filter. All frequencies that match a power beam will have their ci at the common output hole. All other frequencies will not. The difference between this arrangement and the broad band averaging arrangement is that each of the frequencies that pass through the filter must match precisely the frequency and phase of the power beam. At wavelength sizes, filters are capable of providing the best selectivity of any known means, especially at light wave frequencies and beyond.

These basic principles of operation produce functions similar to the way electronic transistors perform similar functions. As a result, the present invention warrants the common name "photonic transistors." Even though the present invention is quite capable of using non-photonic wave-type energy, photonic embodiments are expected to become the most common in operation.

39. The objects of the present invention are to provide:
   a. A complete technological base for energy beam (especially photonic) computing using special interference.
   b. Means, method and apparatus for performing:
      i. Basic amplification, limiting, and clipping.
      ii. Basic Boolean logic.
      iii. Basic threshold detection.
      iv. Digital information storage.
      v. Frequency and phase-sensitive filtering.
   c. Interconnecting means and method for interfacing energy beam components.
   d. A clear understanding of energy beam operational principles, including:
      i. Multiple beam summing for function interfacing.
      ii. Simultaneous, multi-frequency operation.
      iii. Energy beam differentiation.
      iv. Energy beam integration.
      v. Regenerative feedback.
      vi. Phase requirements.
      vii. Effect of maintaining one beam constant.
      viii. Amplification.
      ix. Saturation.
      x. Cutoff.
      xi. Phase relationships among multiple input beams.
   e. Establish a basic mathematical theory of operation for special interference, including its non-linear amplification characteristics.
   f. Establish the technological and conceptual basis for the simultaneous operation of multiple energy forms.
   g. More firmly establish a conceptual basis for the use of energy beams to accomplish tasks heretofore reserved for electronics, and tasks far beyond the capability of conventional electronics.
   h. Establish the operational similarities and differences between electronic transistor circuits and energy beam circuits so that the common term "photonic transistors" will be rightly applied to the present invention.

i. Establish the technological and conceptual basis for producing electron-wave electronic functions.

The foregoing objects and benefits of the present invention will become clearer through an examination of the drawings, description of the drawings, description of the preferred embodiment, claims and abstract which follow.

BRIEF DESCRIPTION OF THE DRAWINGS

The invention will become more understandable upon the examination of the following drawings along with the detailed description below. Please note that the energy beam angles and sizes are exaggerated so as to provide clarity of understanding.

FIG. 2A—Controller using both types of special interference, having both input beams off.

FIG. 2B—Controller using both types of special interference, having one input beam on.

FIG. 2C—Controller using first type of special interference, having the 2nd input beam on.

FIG. 2D—Controller using both types of special interference, having both input beams on.

FIG. 2E—Controller using second type of special interference, having the 2nd input on.

FIG. 3—Inverter having one input beams on.

FIG. 3A—Inverter having both input beams on.

FIG. 18. Binary Digit Counter.

FIG. 19. Binary Counter and input, intermediate and output waveforms.

FIG. 20—Oscillator Logic.

FIG. 21—Square Wave Oscillator/Schmitt Trigger Logic.

FIG. 22. D-type Bistable Logic and input/output waveforms.

FIG. 24A—Multiplexer input waveforms.

DESCRIPTION OF THE PREFERRED EMBODIMENT

1. The basic energy beam controller

Figure 1:
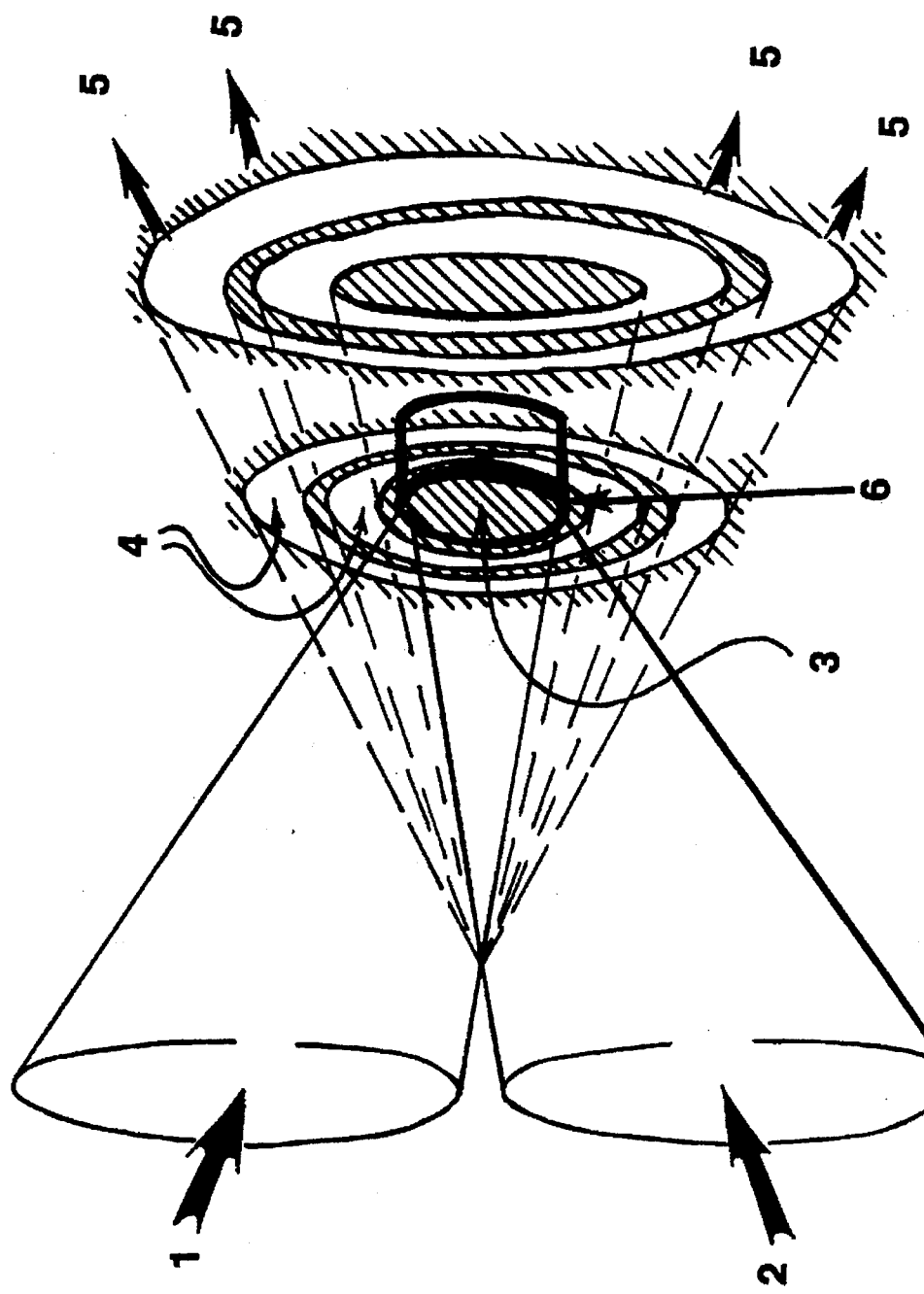
FIG. 1—Controller using special interference.

The perspective view of FIG. 1 illustrates the preferred embodiment of the basic unit of the present invention, an energy beam controller utilizing interference of either type as discussed in the Summary of the Invention above. It consists of a first beam set (1) of at least one beam of energy and a second beam set (2) of at least one other beam of energy that are superimposed at at least one location (3). In this illustration, one of each is shown, although "at least one" means that in practice there are able to be many such locations and beams that behave as those illustrated.

When both beam sets are on, they interfere to produce an interference image having a di area at location (3), and a ci area at at least one other location (4). In this illustration two ci areas (4) are shown. Energy behaves the same in all areas of locations (4). Energy from the ci areas continues on to provide an output (5). Four rays or beams of the output beam set are shown in this illustration. They behave the same and operate in unison.

An image component separator (6), in this case an opaque mask, prevents energy from location (3) from becoming a part of the output (5).

When the optics are designed to take advantage of the first type of special interference, all of the energy from either beam (1) or beam (2), when on by itself, is directed to location (3) and stopped by mask (6), and output (5) is off. The optics do not direct energy from either beam towards location (4) or into output (5).

The input beams are oriented so that destructive interference covers the entire area where the beams arrive individually, including location (3), when both beams (1) and (2) are on. If beam (1) is on first, and then beam (2) comes on, less than or equal to the level of beam (1), the total amount of energy in the di area, including location (3), is reduced by an amount equal to the level of beam (2).

More than di occurs. The energy does not just go away. The law of conservation of energy requires that the energy which disappears from the di area must appear at a ci area, so that an entire interference image is formed. The ci areas are labeled as locations (4).

The energy which is diverted away from the di areas, such as locations (3) and into the ci areas, such as locations (4), includes energy from both beams (1) and (2). If the beams are of equal amplitude, then the amplitude at the locations (3) will be zero, and all of the energy from both beams will appear at locations (4). Whenever energy appears at locations (4), it continues on into output (5).

If beam (1) is larger than beam (2), energy with an amplitude equal to the difference between (1) and (2) will appear at locations (3) and be stopped by image component separator (6). The amplitude of the energy diverted into locations (4) will be equal to twice the amplitude of the smaller of the two, in this case beam (2). All of the energy from both beams is diverted away from the di locations (3) and into the ci locations (4).

If the amplitude of beam (2) increases so that its amplitude is greater than that of beam (1), the amplitude of the energy diverted by interference into output (5) is equal to twice the amplitude of the smaller of the two, namely, beam (1). The intensity of the energy, or power per unit area, is approximately equal to the amplitude squared. As a result, the intensity is four times as great in output (5), as either of the input beams by themselves at location (3).

To calculate the total amount of energy in output (5), one must also take into account surface area and time. Since the two input beams are the only source of energy, the total amount of energy in output (5) does not exceed twice the amount of energy in the smaller of the two beams. The fact that the intensity is four times as great merely indicates that the energy has been concentrated into a smaller surface area.

If beam (1) is held at a substantially constant level, and the level of beam (2) fluctuates, or is modulated below the level of beam (1), output (5) will contain twice the amount of energy that there is in the modulated input beam (2), assuming perfect optics.

The additional energy in output (5) is removed from beam (1) by interference. Since the level of output (5) is a function of the level of the modulated input at beam (2), output (5) contains an amplified modulation envelope just like the modulation envelope of beam (2), only having up to twice the amount of energy.

Since the power for this amplifier comes from beam (1), it is called the "power beam" when the present invention is used as an amplifier. The modulated input beam (2) is called the "control beam" because it controls how much energy will be diverted from the power beam by interference.

If the level of control beam (2) rises above the level of the power beam (1), output (5) will hold steady at twice the level of the power beam. Amplification stops, and the modulated waveform is clipped off. This occurs because the output is equal to double the level of the smaller of the two beams, and in this case the level of the smaller power beam is constant, producing a constant output.

How these component locations and beams interact to produce a variety of functions are able to be understood more fully by examining the critical locations more closely. FIGS. 2A-2D are an energy beam controller of the first type; that is, using the first type of special interference.

Four states of the most basic operation are shown in FIGS. 2A-2E. Angles in the figures are exaggerated for clarity. In this discussion, "beams" are sets of beams or rays that operate in unison as if they were single beams. Such beam sets are able to have multiple locations that behave in unison as described herein, but they all function as depicted in this close-up view.

Figure 2:
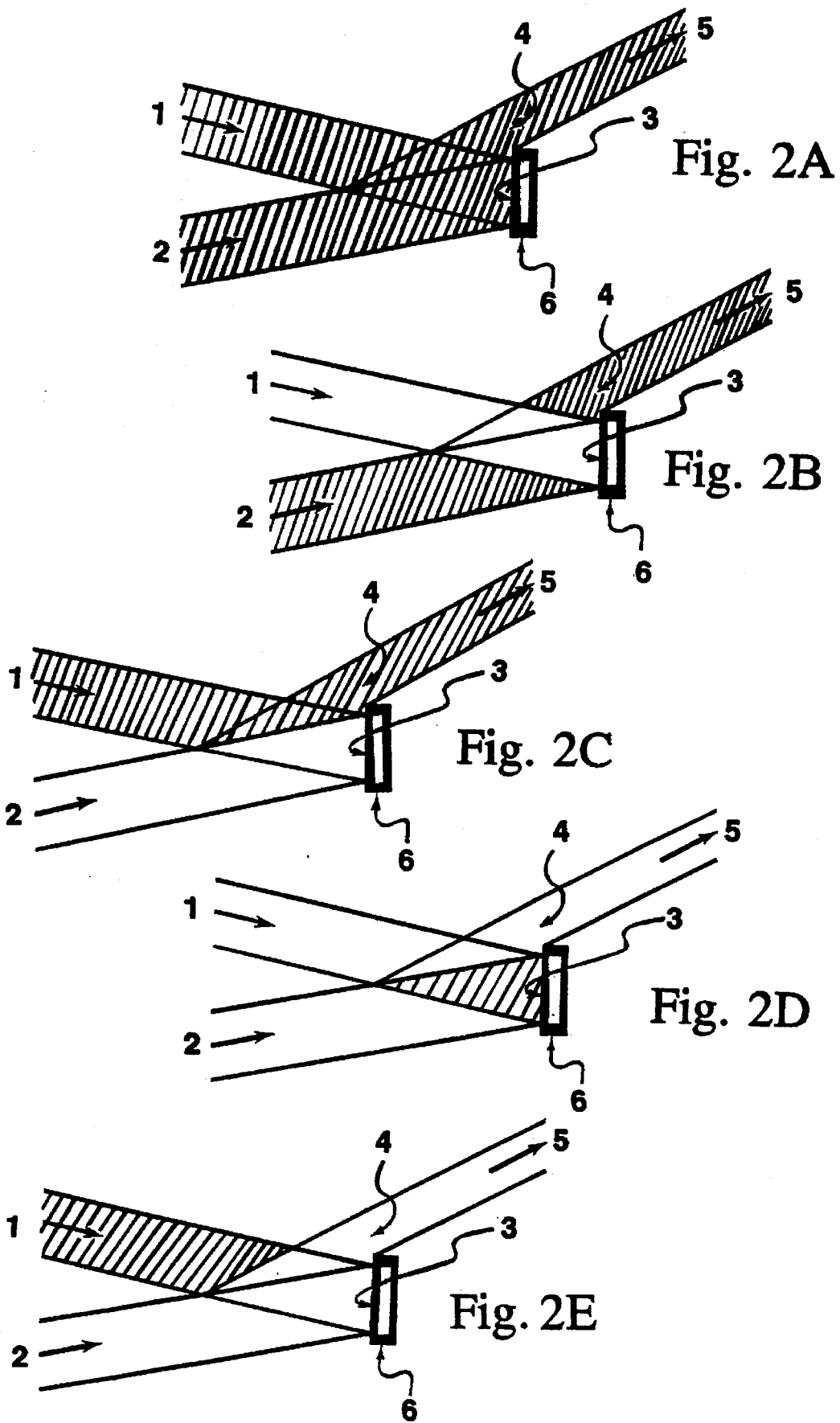

Two input beams (1) and (2), directed to a common location (3), along with location (4), output (5) and mask (6), are depicted for four states. FIG. 2A state shows the state when both input beams (1) and (2) are off, (as indicated by the cross-hatch). Energy does not appear at any of the locations. This null state is important and occurs in many applications of the present invention, especially digital applications. Output (5) is off.

FIG. 2B state depicts the state when beam (1) is on and beam (2) is off. Energy does not appear at location (4), because the energy is purposely not directed there. Mask (6) prevents energy from reaching output (5), so it is off.

FIG. 2C state depicts the state when beam (2) is on and beam (1) is off. In this state, energy does not appear at location (4) because it is not directed there by the optics, so output (5) is off.

FIG. 2D state depicts the state when both beams (1) and (2) are on. The beams are superimposed so as to produce destructive interference at their common location (3). Mathematically the two beams cancel; however, the energy in those beams is not destroyed. Rather, the energy from both beams is diverted away from location (3) and into location (4), where constructive interference takes place. As a result, the interference image in state FIG. 2D covers an area that is different from the area covered in states FIGS. 2A through 2C. Energy diverted to location (4) continues on, past mask (6), to produce an on output at (5).

Beams (1) and (2) are able to be very small, even single rays as those that come from single pixels of a hologram. Beams (1) and (2) are also able to be projected images produced by sets of beams or rays at location (3) during states FIGS. 2B and 2C, including those produced by holograms. During state FIG. 2D the images interfere to produce a new image which is able to have multiple component parts separated so as to provide multiple outputs such as location (4).

Beams (1) and (2) are also able to be component parts of complex, multi-input dynamic images (images that change continuously as computation proceeds, as within a photonic computer.) As components of more complex images, then FIGS. 2A-2E represent the operation of one set of locations among many multiple sets of locations that operate simultaneously as different component parts of multiple complex images functioning in parallel.

The image component separator at location (6) is able to be any optical element positioned so as to separate energy in one area of the image from energy in another area of the image. For simplicity, a mask is illustrated. It blocks energy that appears at location (3), but passes energy at location (4) to become the output (5) in state FIG. 2D when both inputs (1) and (2) are on.

To produce a maximum output at output (5), beams (1) and (2) must be 180 degrees out of phase at location (3) (which is, of course, a requirement for producing di) and of equal strength. When these conditions are met, all of the energy from both beams will be diverted into the constructive interference areas at locations (4), in phase, and on into output (5). When these energy beam controllers are interconnected with other components, the carrier wave phases are compared to these two locations (3) and (4).

The phase of an input beam is defined as being its phase at location (3) when on by itself (unless otherwise stated.) As a result, beams (1) and (2) are considered to be 180 degrees out of phase with each other in order to produce an output at output (5).

The phase of an output beam is defined as being the same as the combined phase of energy at location (4). When two or more controllers, or other phase-dependent components, are interconnected, their positions and optics are engineered so that the needed phase relationships will occur. For example, if the output of one controller is directed into the input of another controller, the two are located so that the output measured from location (4) will provide the proper phase of energy at location (3) of the succeeding controller in order to accomplish its design task.

The precision of operation of FIGS. 2A-2E depends on the tolerances used in producing the optics used to produce it. If the tolerance is larger than wavelength sizes, then operation will generally be broad band. If the tolerance is in wavelength sizes, narrow band operation is facilitated. Broad band applications function the same as when many narrow band controllers, with slightly different band passes, are operated in parallel, that is, when multiple precise locations (4) exit energy into output (5). This is because the precise (4) locations will be slightly different for different frequencies and phase differences. The more a design is able to single out precise (4) locations, the narrower will be its bandwidth.

2. Using the second type of special interference.

The second type of interference allows energy from one of the beams to appear in the output when it is on by itself, but not otherwise. In this case, also shown in FIGS. 2A, 2B and 2D, state FIG. 2C does not occur; instead, state FIG. 2E occurs. This type of interference is able to be used to provide an amplifier by using beam (1) as the energy-supplying power beam. However, such interference cannot be used to produce the Boolean AND function or the gated amplifier.

This is an energy beam controller of the second type. Both broad band and narrow band arrangements are able to be produced.

3. Logical AND.

A controller of the first type will function as a Boolean AND. When beams (1) and (2) are modulated with binary information, energy will appear at location (4) and move on into output (5) only when both beams (1) and (2) are on. When either of beams (1) or (2) is off, output (5) is off.

In terms of amplitudes, when the smaller of the two input beams is zero, the output that equals twice the smaller one is zero.

3. Amplification.

If one of the input beams such as beam (1) is kept on at a substantially constant level and the second beam (2) is analog-modulated, the energy diverted into the output will be greater than and proportional to beam (2). Because energy from both beams appears in the output (5), output (5) represents an amplified version of the modulated input at beam (2). As a result, the maximum amount of energy, when both beams are equal is the combination of both beams; namely, twice the level of beam (2).

Energy for accomplishing amplification comes from the constant power beam (1), and is determined by the modulated control beam (2). If the control beam (2) is binary, the output (5) will also be binary, at up to double the level of beam (2).

More is occurring here than the simple changing of amplitude such as occurs when a beam of a certain cross-section is focused onto a small spot. Beam (2) has a modulated envelope with a certain maximum amount of energy. This is able to be represented by the actual amplitude of the beam.

The power beam (1) also contains energy, and has an amplitude greater than or equal to that of the control input beam (2), but carries no information. Interference causes energy from both beams (1) and (2) to be diverted into the output (5) only when beam (2) is on, and in proportion to beam (2). Since all of the modulation changes in beams (1) and (2) appear in the output (5), the output (5) will contain information only from beam (2) simply because only the control input at beam (2) has any information.

The modulated envelope in the output (5) has up to twice the amount of energy—not just amplitude—as the control input (beam (2)). As a result, the action of the present invention truly is amplification and does not have a residual output level when the control beam is off, as do the energy beam amplifiers of the prior art.

Either type of special interference is able to be used to amplify. If the second type is used, beam (1) must be the power beam, as its energy does not contribute to output (5) when the control input (beam (2)) is off.

4. Gating.

If the first type of special interference is used, then either input is able to provide power because they both work the same. Additionally, turning off the power beam (1) prevents any feed-through of energy from beam (2). This permits the amplifier to be gated off by simply turning off beam (1).

5. Limiting.

The level of the constant power at beam (1) establishes a certain saturation level. Generally that level is equal to the level of beam (1) (depending on the optics used).

When the control beam (beam (2)) is below the saturation level, the modulated input of beam (2) is amplified in the output (5). Above that level, all of the energy available for diversion into output (5) has been diverted. With no more energy from beam (1) available, increasing the level of the control input (beam (2)) is unable to cause more energy from beam (1) to appear in the output (5). As a result, the present invention functions as a limiting amplifier.

As with its electronic counterpart, noise or other irregularities are able to be clipped off of the modulated envelope. How cleanly it does this depends on the optics used. Heavily over-driving a device is able to cause leakage in some cases. Certainly, if the second type of special interference is used, there will be leakage by design. Increases in input level above the saturation level that do leak through will not be amplified, but will be attenuated by the mask (6), which prevents some of the excess energy from reaching output (5).

Imperfect optics may direct some of the input energy from beam (1) to some location whereby the interference is unable to divert that portion of the energy into the output (5). Such energy has simply been made unavailable for diversion by the optical arrangement.

6. Inverter and NOT.

Figure 3:
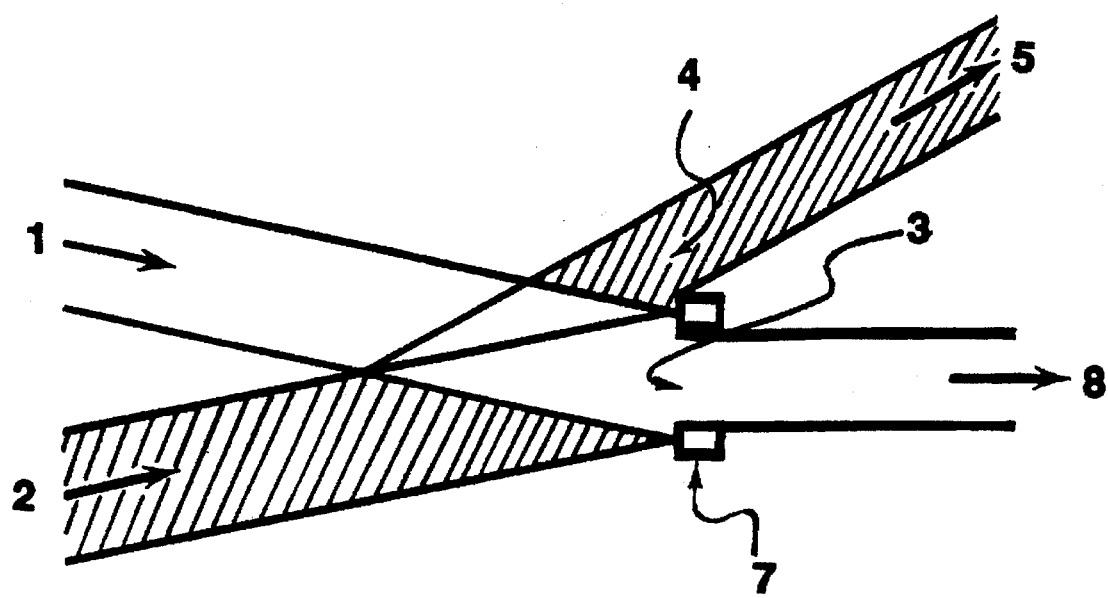
Figure 3A:
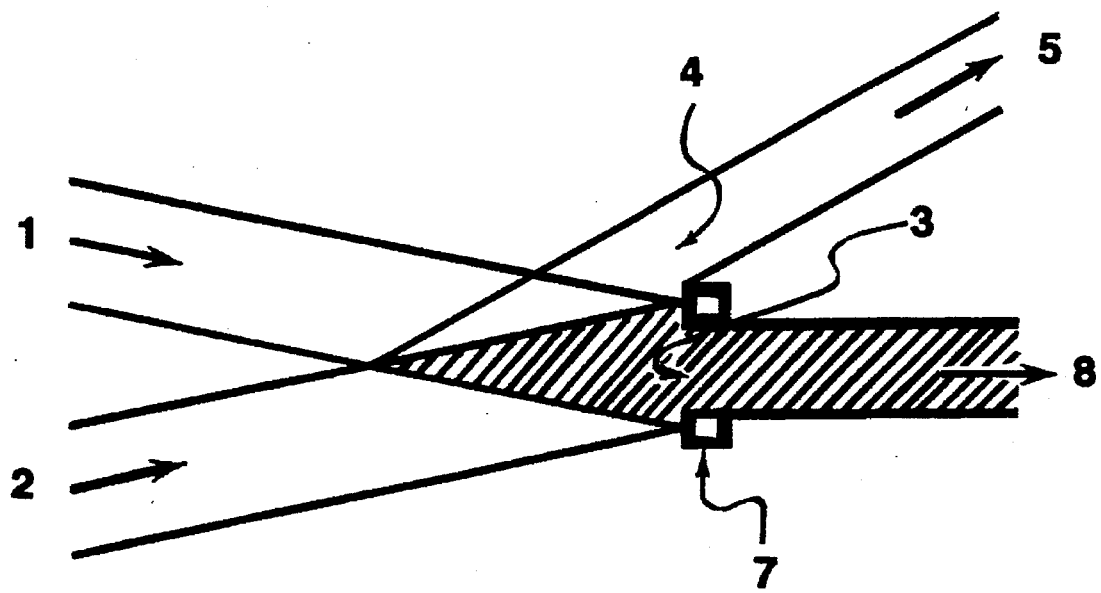

When destructive interference takes place at location (3) of an amplifier, the energy from both beams is diverted to the areas of constructive interference such as location (4), which removes energy from location (3). FIGS. 3 and 3A show a modified arrangement whereby mask (6) has been replaced with mask (7) (shown in cross section,) that has a hole in it at location (3).

Energy diverted into output (5) is directly proportional to the control input beam (2). As a result, output (5) is called an "uninverted" output. Energy that passes through location (3) into output (8) is inversely proportional to the control input (2). As a result, output (8) is called an "inverted" output.

The maximum uninverted output (when the control input is smaller than the power input) is equal to the power beam that simply passes through into output (8). As a result, the uninverted output is not amplified.

If the amplifier is driven into saturation, the excess energy that is not diverted into the uninverted output (5), exits via output (8). The output phase changes depending on the input levels and phases. This aspect will be covered below in greater detail in the discussion on threshold detection.

If the control input (2) of this inverter is modulated with binary information, then this arrangement performs the logical NOT function.

7. Phase demodulator and comparer.

Next is an examination of how the present invention operates given changes in phase and frequency, reference to either FIGS. 2A–2E or 3–3A.

The present invention is very phase-sensitive. The operational phase is established by the constant power beam of an amplifier simply because it is unmodulated and serves as a reference beam to compare other beams to.

To produce a maximum output at output (5), the input beams (1) and (2)) must be exactly 180 degrees out of phase at location (3). Any other phase difference, greater than zero, will reduce the energy level at location (3), and increase it at location (4) in proportion to the phase difference between beams (1) and (2) in a broad band arrangement. As the optics are made more precise, and especially as construction accuracy nears wavelength dimensions, devices are able to be built so that energy that arrives between locations (3) and (4) will be blocked by the image component separator, resulting in narrower bandwidth and sharpening of the phase selectivity of the device.

If the control input beam (2) is in-phase with power beam (1) at location (3), constructive rather than destructive interference will occur at location (3). In that case, no energy will be diverted to location (4), and output (5) will be off. Amplitude changes in the control input beam (2) will not feed through to output (5).

Phase modulating the control (beam (2)) produces an amplitude modulated output at output (5). If the optics are very broadband, allowing energy from the space between locations (3) and (4) to enter output (5), a slight phase-modulated component will slip through into output (5). However, narrow band optics will allow energy to exit into output (5) only from locations such as location (4) where complete constructive interference occurs, and the energy from both input beams is in-phase.

If the control beam (2) has both phase and amplitude components, output (5) will contain an amplitude-modulated combination of both the amplitude-modulated part and the phase-modulated part. As a result, the highest-level output resulting from demodulating the phase changes is also affected by the amplitude of the input.

As a result, the present invention is able to be used as a phase demodulator by phase modulating the control beam (2) of an amplifier.

The phase demodulator actually compares the phase of beams (1) and (2). If one is a constant standard, and the other is phase-modulated, the output is demodulated into an AM signal. If both inputs are phase-modulated, the output will be of a high level when the two signals are out of phase, at location (3), and at a lower level when they are in phase. Since constructive interference occurs at location (4), the phase of the output at output (5) will be the common phase between them.

Output amplitude of broad band designs will vary proportionately over the full range of phase differences. Narrow band designs will vary proportionately, only over the band-pass range.

8. Multi-frequency operation and active filtering.

Each control signal inputted to beam (2) that is to be amplified must have a matching power beam (1). In order for interference to take place and amplification to occur, the power beam (1) must contain energy at the same frequency as the information to be amplified in the control (beam (2)).

Ci is produced at slightly different locations for each frequency (like the colors of a rainbow). If the output openings are large enough at location (4) to accommodate a large number of precise frequency locations, then the device will function in a broadband manner. If it is designed to only allow through energy at a small number of frequency locations, then the device will be narrow-band.

If the control input beam (2) is provided with energy having multiple wavelengths, interference will occur only with those frequencies that appear simultaneously in both inputs. (Not considered are harmonics, heterodyning and the use of special materials, which are also able to be used with the present invention.)

As a result, the present invention operates as a very sharp filter. If a frequency-multiplexed beam is provided, it is able to be used to pick out information that matches each power beam frequency and amplify it, ignoring all other frequencies if the first type of interference is used. If the second type of interference is used, the matching frequencies will be amplified and the others will be attenuated.

In the case of light, a single color is able to be extracted, so that any information carried by it is able to be examined. Given the phase and frequency sensitivity of the present invention, microwave and even visible portions of the spectrum are able to be divided into channels as narrow as the audio channels in the radio bands. Naturally, the degree of separation possible also depends on the ability of the optics to produce standard power beams that are extremely pure.

If the power beam (1) is supplied with energy having two or more frequencies, the output (5) will contain amplified signals extracted from a wide-band input that match the combination of frequencies in the power beam (1), while rejecting all others. If the power source, such as a laser, happens to have lines at several nearby wavelengths, they will often be modulated in unison. If that is the case, the present invention will also amplify them in unison, if they are within the design bandwidth of the active filter used.

Figure 4:
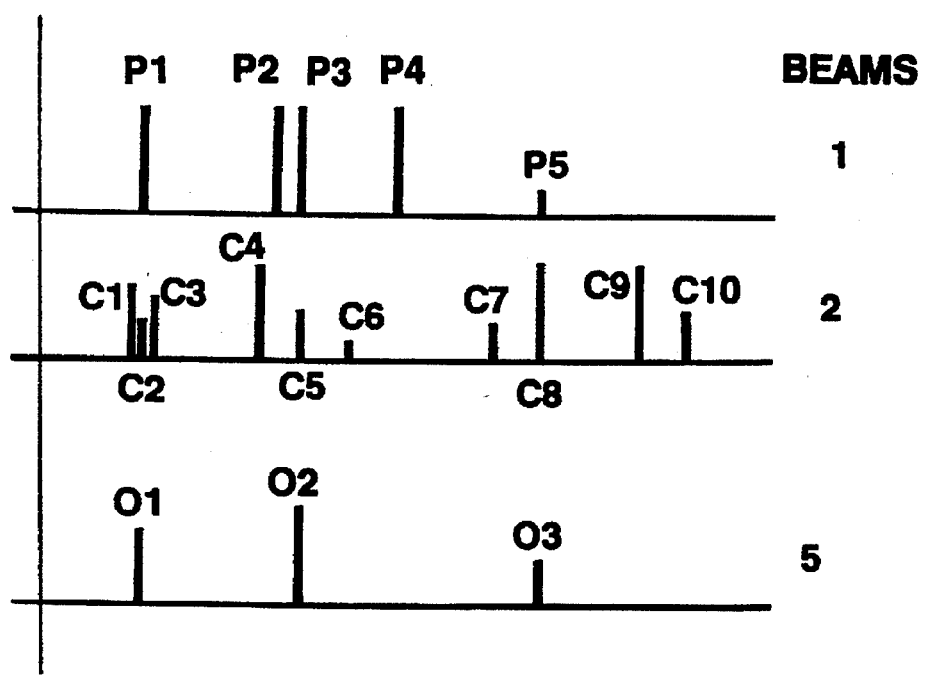
FIG. 4—Frequency Spectrum Filtering.

FIG. 4 shows three example spectrums of a broad band energy beam amplifier. The power input labeled with its beam number (1) has five frequencies. (P1) through (P4) have the same level; (P5) is smaller. The control input labeled with its beam number (2) has 10 input frequencies at various levels.

Using formulae 3, above, the output amplitude during amplification is:

if (1)>(2)

then $a_{(combined\ output)} = 2 a_{(power\ input)}$

And, during saturation the output amplitude is:

if (2)>(1)

then $a_{(combined\ output)} = 2 a_{(power\ input)}$

If the power input=0 at the frequency in question, the combined output (5)=0

The combined output shown in FIG. 4 has only three signals. This is how they are derived using the formulae above.

1. C1, C3, C4, C6, C7, C9, and C10 have no matching power beam and, consequently, no matching output. These frequencies are filtered out from output (5); however, they will appear in the inverted output (8) if it is available.

2. C2 matches P1, producing output O1 twice as large as C2.

3. C5 matches P3, producing output O2 twice as large as C5.

4. C8 matches P5, producing output O3 twice as large as P2. Because C8 is larger than P2, the amplifier is in saturation at this frequency. If the second type of special interference is used, limiting action occurs, as with formulae 5, and will not clipped at the P2 level.

5. P4 finds no match in the control input, so that no output is produced at this frequency. However, because it is a part of the constant power beam, it is ready and waiting for a matching signal to show up in the control input.

Note that the amplifier is able to be in saturation at one frequency and at cutoff at another frequency simultaneously.

Each of the frequencies produces interference, the resulting interaction within the present invention, in all its forms, completely independently of the other frequencies. The exception is when two frequencies are so close together that interference does occur between the two. In that case, a cascade series of amplifiers, each having a slightly different frequency in succession, will allow information phase-modulated into the first of the cascaded amplifiers to successively transfer information to higher and higher (or lower and lower) frequencies until the information has been successfully transferred from one frequency band to another.

Another exception is the interference of one frequency with its harmonics. This effect is also able to be used in the present invention for transferring information from one base frequency to another.

As a result of independent operation at each frequency, every one of the means, methods and apparatus of the present invention are able to be operated in a multi-frequency mode, whether they are binary flip flops, cascaded amplifiers, limiters, or other devices.

Certain physical materials are able to react to various frequencies so that their characteristics change in such a way that the change affects other frequencies. Such materials are usable to divide and multiply carrier wave frequencies. By including such materials as the energy transmission medium within the present inventions, the characteristics of the medium affect interference. For example, if P4 is twice the frequency of C1, a frequency doubling medium will cause interference to take place so as to produce a modulated output at P4 and possibly twice P4 and C1, depending on the material.

Negative or inverted filtering is also able to be accomplished with the present invention. The inverter of FIGS. 3 and 3A directs energy away from output (8) when a frequency match occurs. As a result, output (8) will be similar to the control input beam (2), but lacking the frequencies that find an equal match with the power input beam (1). If they are unequal, the difference amplitude will output.

The following section relates to the interfacing of energy beam amplifiers and the various power levels and phase relationships needed to accomplish large-scale amplification.

9. Cascaded amplifiers.

Figure 5:
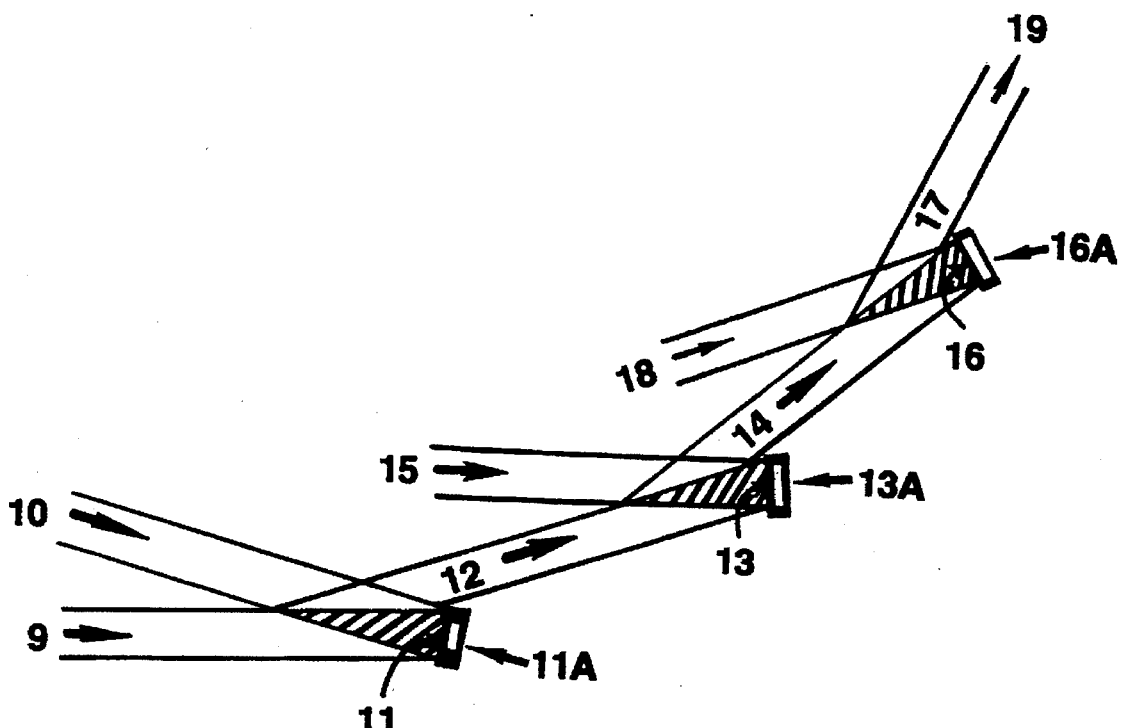
FIG. 5—Cascaded Amplifiers.

FIG. 5 shows three amplifiers connected in a cascade series. Beam (9) is the control beam of the first amplifier, and beam (10) is its power beam. Location (11) is the equivalent of location (3) in FIGS. 2A–2E, where destructive interference takes place when both beams are on. Energy is diverted by interference to beam (12). An image component separator (11A) blocks energy at location (11) and allows it to pass into beam (12) and on to location (13). The maximum amount of amplification from this first amplifier is double the level of power beam (10) when all of the energy from beams (9) and (10) are diverted to beam (12).

The second amplifier is at locations (13) and (14). Power is supplied by beam (15). Again, when beam (12) is on, di occurs at location (13), and ci occurs at location (14) by the diversion of energy from beams (15) and (12). The image component separator (13A) at location (13) prevents energy at location (13) from reaching location (16), while permitting energy from location (14) to pass. The maximum amplification at this stage is twice the maximum of beam (12) when the level of beam (15) is sufficiently high. As a result, when beam (9) is at maximum, location (14) contains energy from beams (9), (10), and (15) for a maximum level of 4 times beam (9). When beam (9) is off, no interference occurs at location (11), so beam (12) is off, causing beam (14) to be off. As a result, beam (14) is controlled by beam (9).

The third amplifier is at locations (16) and (17). The maximum amount of amplification here is twice the maximum of beam (14), so beam (18) is set at 4 times beam (9). When beam (9) is at maximum, di at location (16) causes the energy from beams (18) and (14) to be diverted to the ci location (17), which passes directly to the output (beam (19)) of the cascade series. An image component separator (16A) prevents energy from location (16) from passing into output (beam (19)), while allowing energy diverted into location (17) to pass into the output (beam (19)). As a result, output beam (19) contains energy from beams (9), (10), (15) and (18), for a total energy 8 times that of beam (9). When beam (9) is off, beam (14) is also off, which causes beam (19) to be off.

The output at beam (19) is completely controlled by beam (9). Since beams (15) and (18) are larger than beam (9) and are either diverted or not diverted into output (19) by interference being controlled by beam (9), beam (9) is controlling the large beams. Naturally, one is able to add as many amplifiers as needed so that a small beam is able to control very large beams. The process is analog in nature, but is also able to operate with binary signals by using either high or low input signals input to beam (9).

Using the first type of special interference, shutting off any of the power beams (beams (10), (15) or (18)) shuts off output beam (19). As a result, this embodiment of the present invention is a gated cascade amplifier, also called a gated avalanche amplifier since a small input causes energy to avalanche through the arrangement and into the output.

Using the second type of interference, shutting off any of the power beams reduces the total output at beam (19), but does not terminate the output because of feed-through of the control beams at each stage. Only beam (9) has complete control of the series.

All of the features of the individual amplifiers apply also to the cascaded amplifiers. All of the amplifiers within other arrangements disclosed in this application are able to be replaced with a cascade series.

Using the first type of interference, if any of the amplifiers is driven into saturation, the series is effectively in saturation. If multiple frequencies are used, all of them will be amplified, but if one is missing in either the control beam or the power beam, the missing one will not be amplified. Any of the amplifiers, other than the first one, are able to be fitted with an inverted output, or output beam (19) is able to be directed into an inverter. In this way, an amplified inverter is able to be produced.

Many interesting and useful arrangements are able to be made when the power beams have differing characteristics. For example, if each power input has multiple frequencies with different amplitude distributions for the different power inputs, then the subset of those frequencies that have common characteristics will be selected out, as each stage acts as an active filter, allowing to pass only energy which it has been designed to pass as shown in FIG. 4 and described in section 8 above.

Similarly, when one of the arrangements is narrow-band and the others are broadband, the total bandwidth will be that of the narrow-band arrangement.

10. Multi input AND.

In the cascade amplifier above, the power beams, as well as the controlling input beam (9), are able to be provided with equal energy levels. Using the first type of special interference, shutting off any one of the inputs shuts off output beam (19), resulting in a multi-input AND.

The means and method of connecting controllers to other energy beam devices, including other controllers, is also illustrated in FIG. 5. In order to operate, each output, such as beam (12), must have a frequency, a phase, an amplitude, a cross-section, an energy level, beam direction(s) and consistency and, if modulated, a timed modulation envelope. Each succeeding device, such as the next amplifier, location (13) and beam (14), has the same requirements.

In order to interconnect multiple devices, the interconnection optics must take into account all of the requirements. If necessary, additional optical elements are able to be added between the various locations and/or beams, such as between beam (12) and location (13), to correct any problems and to match the output of one amplifier to the input of another. The same is true when very complex images are used that essentially integrate a large number of these basic devices operating in parallel and in series with other parallel devices.

11. Feedback, Bistable arrangements.

Figure 6:
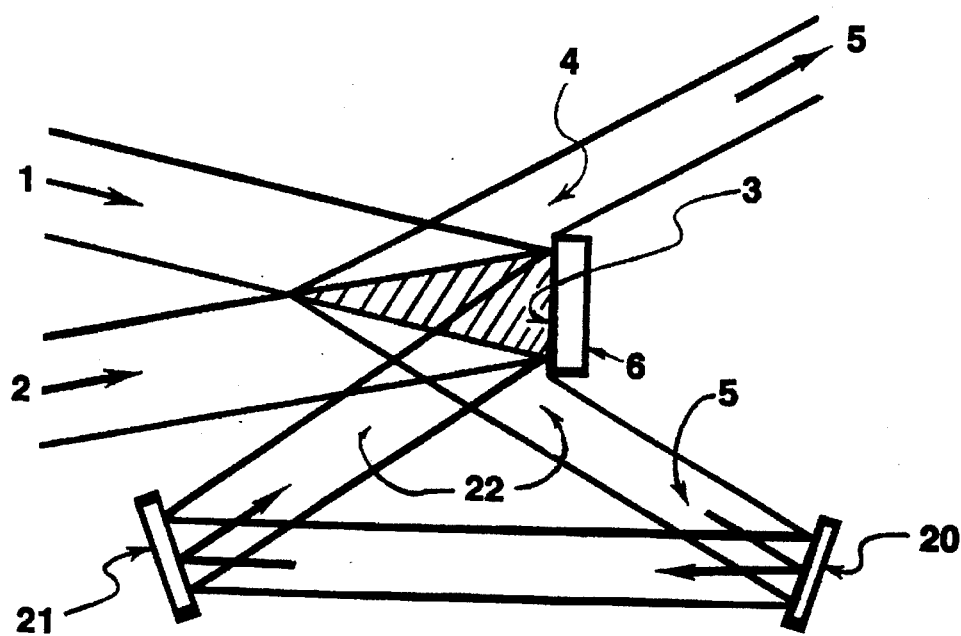
FIG. 6—Bistable Configuration with Feedback.

FIG. 6 shows how to include a feedback circuit in the present invention. Beam (1) supplies energy for the amplifier. Image component separator (6) prevents energy that has not been diverted by interference from entering the output (5). When the control beam (beam (2)) is on along with the power beam (beam (1)), di occurs at location (3), and ci occurs at location (4), resulting in output (5).

As output (5) is able to be picked up at multiple locations, a portion of output (5) is redirected by optical elements (20) and (21) such as mirrors. This beam reenters the amplifier as another control beam, the "feedback beam" (22). It is oriented so that the feedback energy is in phase with the control beam (beam (2)) and out of phase with the power beam (beam (1)).

Initially, output (5) is off. An input pulse of the control beam (beam (2)) is amplified. A portion of the output feeds back into the input in phase with this control beam (beam (2)). Regenerative feedback causes the output (5) and the feedback beam (22) to increase suddenly. How much it increases depends on how strong the feedback beam (22) is.

If the feedback beam (22) is a small portion of output (5), amplification will be enhanced, just as with its electronic counterpart. If a large portion of output (5) is used for feedback, the output (5) will increase suddenly to the point of saturation.

At this point output (5) is on; what happens when that input pulse turns off? If feedback beam (22) is only enough to enhance amplification, the output (5) will be reduced to its lowest output level. If feedback beam (22) has driven output (5) to the point of saturation, then output (5) will remain on, making the arrangement bistable. Control beam (beam (2)) is, as a result, a "set" input. Pulsing either the feedback beam (22) or the power beam (beam (1)) off momentarily will reset the arrangement.

This arrangement is very sensitive. It is able to be built to respond to a single photon. As a result, it is able to be used as a very sensitive frequency- and phase-sensitive energy sensor.

For most digital applications this energy beam circuit may be too sensitive. In order to be able to control its sensitivity, the process of level detection needs to be disclosed.

12. Threshold detector.

Figure 7:
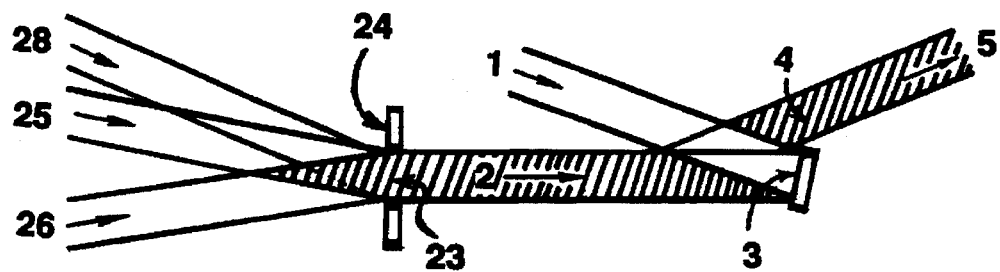
FIG. 7—Threshold Detector.

FIG. 7 is a threshold detector using an input summing stage and a phase detector using an amplifier. The threshold detector takes advantage of two important processes: energy beam summing and the phase filtering and sensitivity of energy beam amplifiers.

The cross-hatch in this drawing helps to identify the beams, but whether it is on or off depends on the relationships described below.

Energy beam summing is a very important concept of interfacing energy beam signals that have various switching times and amplitudes. Summing occurs at location (23). The multiple input sum image is separated, just as other images are separated. In this case mask (24), shown in cross-section, permits only energy from the summing location to be transmitted into beam (2) of the amplifier.

For most applications, inputs (25) and (26) are 180 degrees out of phase with each other. When more inputs are added, they will have one of these two phases, and not some phase in the middle. The reason for this is shown in FIG. 8

Figure 8:
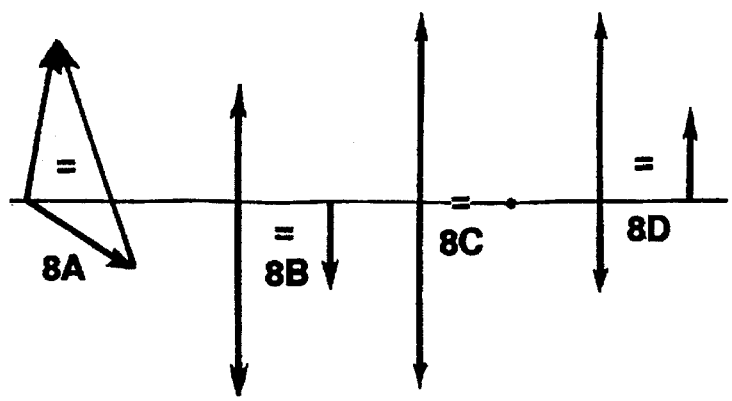
FIG 8—Summation Vectors.

FIG. 8 shows four vector graphs, illustrating four possibilities of the sums of two energy vectors. The general formula uses the standard vector triangle (8A), Combinations of any two vectors (sides of the triangle) produce the third. The length of the arrow is its amplitude, and its angle from 12 o'clock vertical is the phase angle, with straight up representing 0 phase, and straight down representing a phase of 180 degrees.

By maintaining the phase relationships of the input beams (25) and (26) of FIG. 7, so their phase relationship is either 0 or 180, the sum at summing location (23) will be represented by graphs (8B), (8C) and (8D) of FIG. 8. Because the input phase angles are either in or completely out of phase, the vector triangle degenerates into a straight line. The sum will have the phase of the larger of the two and an amplitude equal to the difference between them.

If one beam is kept at a constant amplitude and the other rises slowly from zero, the constant beam will initially determine the phase of the sum (8B). When the beams are equal, the output amplitude drops to zero (8C). When it becomes larger than the constant beam, the output will suddenly shift phase (8D) so as to match the greater of the two. This sudden phase change that occurs even with a slowly changing input is the basis for level or threshold detection in the present invention.

In FIG. 7, beam (26) is called the "threshold-controlling beam". It is held at a substantially constant level. That level determines the threshold which will be detected. Beam (25) is called the "trigger beam" because it will trigger the output (5) when its level rises above the threshold.

When beam (25) is off, the sum at summing location (23) has its phase determined by threshold-controlling beam (26). The separated energy is directed into beam (2) of an amplifier having a power beam (1) held at a substantially constant level, as described above in the discussion of amplification.

By setting the path length properly, the phase of beam (2) at this time will drive the phase detecting amplifier into cutoff by producing constructive interference at location (3), resulting in no energy at location (4). Output (5) is off.

It doesn't matter what the sum at summing location (23) is. As long as it produces a sum having a phase equal to the threshold-controlling beam 26, output (5) will remain off. Compare 8(B) of FIGS. 8 and 8A. This means that, as input (25) rises, it is able to fluctuate in any manner below the threshold without changing output (5).

Figure 8A:
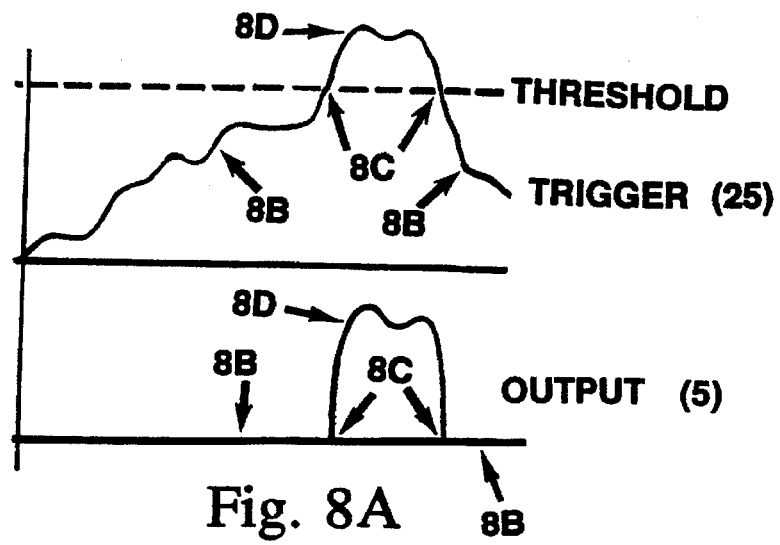
FIG. 8A—Threshold Detector input/output waveforms.

The graph at FIG. 8A, shows how the trigger input is able to fluctuate below the THRESHOLD without causing output (5) to change. When the trigger beam (25) equals the threshold-controlling beam (26) as shown at 8(C) of (OUTPUT 5)) remains off because the amplitude of beam (2) is zero.

When trigger beam (25) rises above the threshold (8C), beam (2) is of the proper phase to produce an amplified at (8D) of (OUTPUT (5)).

The result is a very sensitive threshold detector with an adjustable threshold. The threshold is able to be adjusted statically or dynamically by changing the level of beam (26) or by providing additional inputs to summing location (23) that are either in phase with the threshold-controlling beam (26) or in phase with the trigger beam (25).

13. Schmitt trigger and Set/reset Bistable arrangement.

Figure 9:
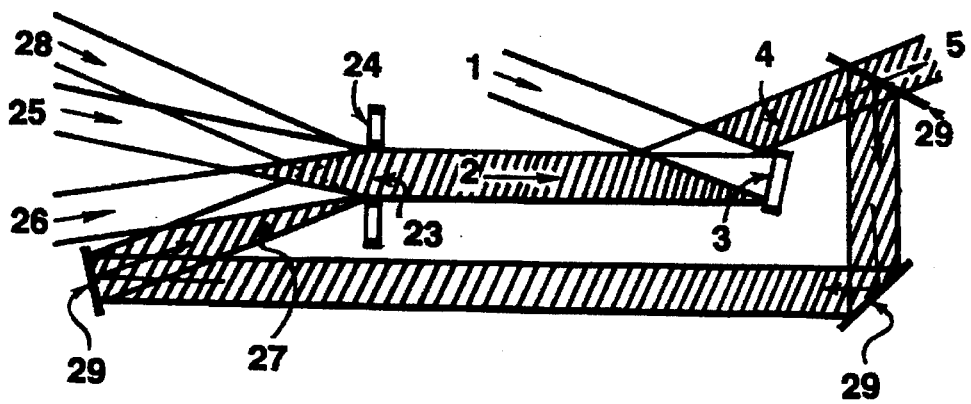
FIG. 9—Feedback in Threshold Detector.

The threshold detector is able to be made bistable or into a schmitt trigger, by the addition Of feedback. FIG. 9 is a threshold detector like FIG. 7, with the addition of two more inputs to the summing location (23).

The cross-hatch in this drawing helps to identify the beams, but whether a particular beam is on or off depends on the relationships described below.

A portion of output (5) is directed using any convenient optical system such as mirrors (29) to provide the feedback input beam (27). Beam (27) arrives at summing location (23) out of phase with the threshold-controlling beam (26).

Figure 10:
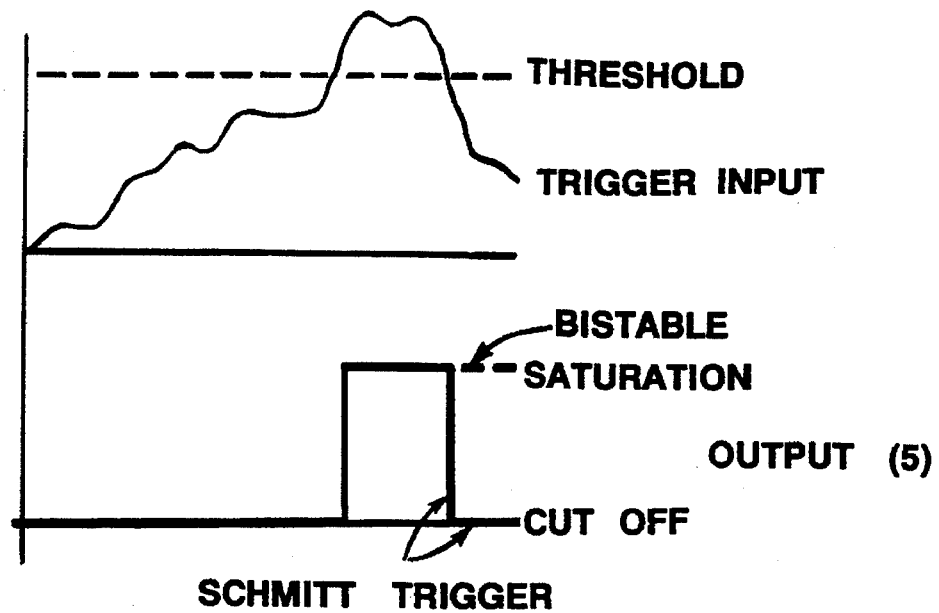
FIG. 10—Schmitt Trigger input/output waveforms.

The progress of its operation is illustrated in the graphs of FIG. 10.

Initially, output (5) is off, and power beam (1) and the threshold-controlling beam (26) are on. Trigger beam (25) comes on at a level which is less than the level of beam (26), and adds algebraically with beam (26). The threshold has not been reached (as described above for the threshold detector,) so the phase detector at locations (3) and (4) remains cut off.

The rising level of trigger beam (25) reaches the threshold, and output (5) begins to turn on. A portion of output (5) is directed to beam (27). Because it is in phase with the trigger beam (25), it produces regenerative feedback, which forces the phase detector into, or closer to saturation. As a result, output (5) is fully on.

Whether the arrangement is bistable or schmitt trigger depends on the level of the beam (27). If it is smaller than the threshold-controlling beam (26), the arrangement will be a schmitt trigger. When the trigger input goes below the threshold, the threshold will be reached, the phase at summing location (23) will reverse, and the phase detector will go again into cutoff.

If the feedback beam (27) is larger than the threshold-controlling beam (26) the arrangement is bistable. When the trigger beam (25) goes off, beam (27) will still have enough energy to maintain the energy at summing location (23) above the threshold. Trigger beam (25) is then able to be called a "set" input.

To reset the arrangement beam (28) is added as a reset input. An energy pulse in beam (28) arrives at summing location (23) in phase with the threshold-controlling beam (26), raising the threshold above the level of the feedback beam (27), reversing the phase at summing location (23) and forcing the threshold detector off.

14. Multi-input AND and OR, and fuzzy logic element.

Figure 11:
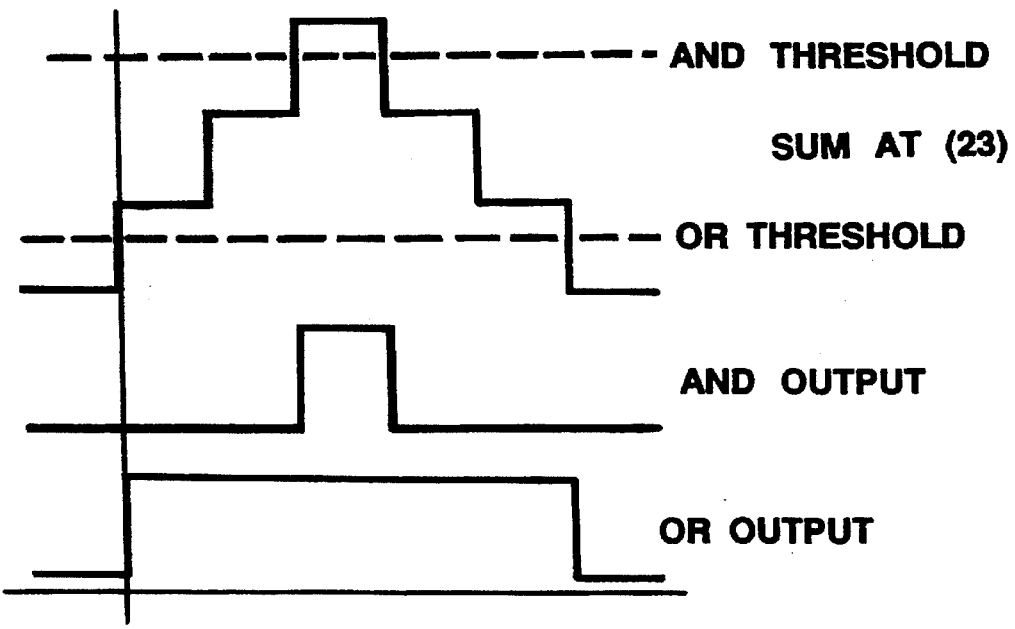
FIG. 11—AND and OR Threshold Detection input/output waveforms.

FIG. 11 shows how, by using either FIG. 7 or FIG. 9, a multi-input AND is able to be made by setting the threshold level as needed. The threshold-controlling beam (26) is set so that the threshold matches the type of operation desired. In FIG. 11, the AND THRESHOLD shows how the threshold is set just below the maximum sum that occurs when all of the trigger inputs are on, in this case beams (25) and (28), beam (28) being in phase with beam (25). Since all of the trigger inputs have to be on to reach the threshold, and as many trigger inputs as one wants are able to be added to the arrangement, it functions as a multi-input AND.

If the threshold-controlling beam (26) is set low, so that the threshold is reached when any one of the trigger beams comes on, the OR THRESHOLD has been reached and output (5) turns on. This is a multi-input OR.

If the arrangement of FIG. 7 is used, the levels of all of the input beams are able to be set so that saturation occurs with the addition of any beam that puts summing location (23) above the threshold. If the arrangement of FIG. 9 is used, then its inputs are set so that it functions as a schmitt trigger.

Since the threshold is able to be set anywhere between the AND THRESHOLD and the OR THRESHOLD, the arrangement is able to be used in fuzzy logic and neuro circuitry. The threshold-controlling beam (26) is able to function as an adjustable "weight" input.

15. NAND.

Figure 12:
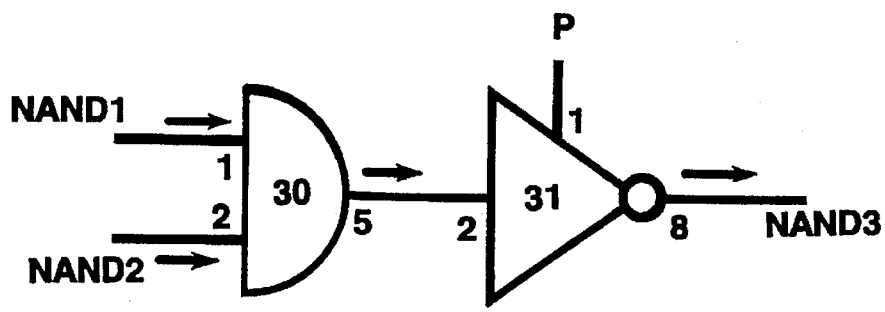
FIG. 12—NAND Logic.

Having the basic controller operation shown in previous figures, logic interconnections are able to be depicted using conventional logic symbols having labels to match the beam positions used. Where duplicate numbers are used in all of the logic diagrams of this specification, they refer to the beam types as described in FIGS 2A–2D, 3 and 3A as they apply to the individual logic element. For example, FIG. 12 shows an AND symbol with a (5) output directed into an inverter symbol at beam (2). The AND symbol refers to the arrangement of FIGS. 2A–2D, and the inverter symbol refers to the arrangement of FIGS. 3 and 3A. Of course, cascade arrangements are able to be used as described in section 9 above.

FIG. 12 shows the logic diagram of a NAND. (30) is an AND as in FIGS. 2A–2D. (31) is an inverter as in FIGS. 3 and 3A; however, the inverter shown in U.S. Pat. No. 5,092,802 will also work as this inverter. Input (1) of inverter (31) is provided with a power beam (P). (30) provides the AND function on the input signals (NAND1) and (NAND2), and (31) performs the NOT function to produce the NAND function output at (NAND3).

15. NOR.

Figure 13:
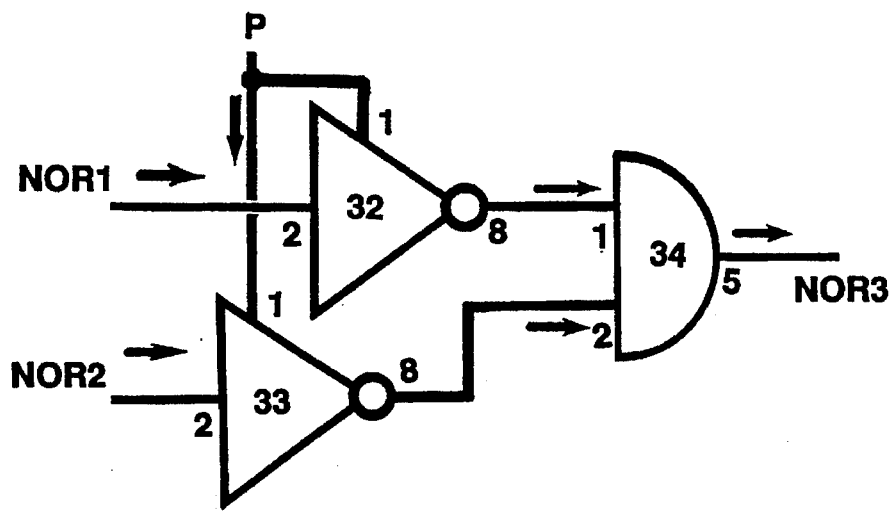
FIG. 13—NOR Logic.

FIG. 13 shows the logic diagram of a NOR. Two inverters (32) and (33) are provided with power beams from (P). Inputs (NOR1) and (NOR2) are inverted before entering AND (34). This produces a NOR output, (NOR3).

16. XOR.

Figure 14:
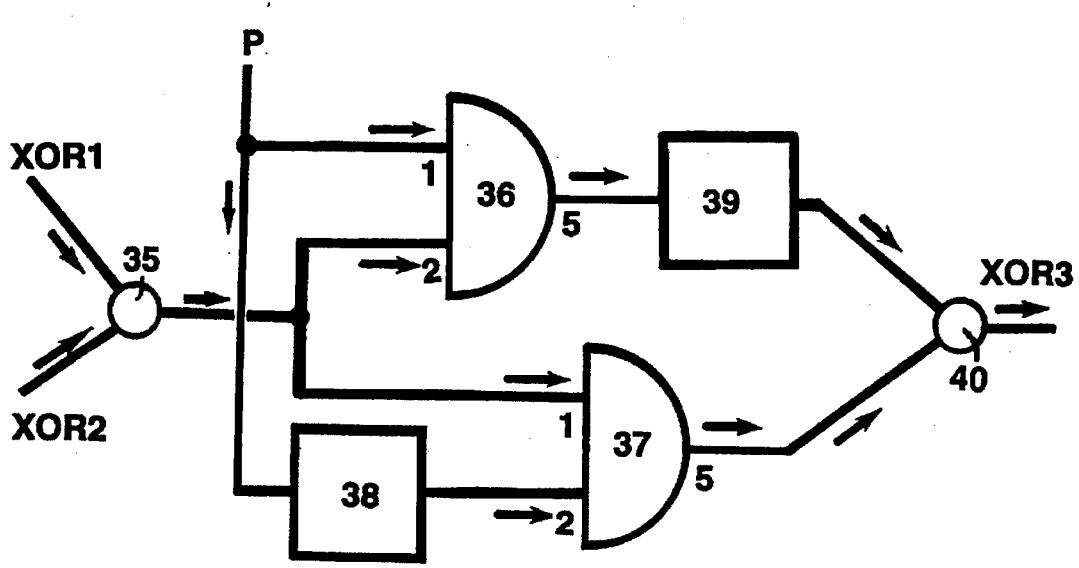
FIG. 14—Exclusive OR Logic.

FIG. 14 shows the logic diagram for an XOR that does not change phase in its output as does the prior art Exclusive OR. (XOR1) and (XOR2) are inputs to a summing location (35). This summing location operates just like the summing location depicted in (8B), (8C), and (8D) of FIGS. 8 and 8A and location (23) of FIG. 7 and FIG. 9.

The summing location (35) produces a biphase output whenever XOR1 or XOR2 are on by themselves. The output of summing location (35) is directed to two ANDs (36) and (37), which function as phase detectors. Although the AND symbol is used, the second type of special interference is able to be used in this instance.

A constant power beam is supplied to AND (36) from P. Power is also supplied to AND (37); however, it is first phase-shifted by 180 degrees by phase shifter (38). This phase shift is able to be accomplished by an optical element, or by simply positioning the components properly. As a result, when XOR1 is on by itself, AND (36), acting as a phase detector provides an output, and AND (37) does not. When XOR2 is on by itself it is 180 degrees out of phase with XOR1, and so is the output of summing location (35). Now AND (36) is cut off, and AND (37) provides the output.

Having separated the two phases, they are now able to be brought back together. The output of AND(36) is phase-shifted by 180 degrees by phase shifter (39), or positional process. The outputs of AND (37) and the phase-shifted AND (36) are brought together at another summing location (40). This provides an XOR output at XOR3 that produces the same output phase regardless of whether XOR1 or XOR2 is the XOR that is on by itself. XOR3 is off if XOR1 and XOR2 are on or off together.

17. Binary Half Adder.

Figure 15:
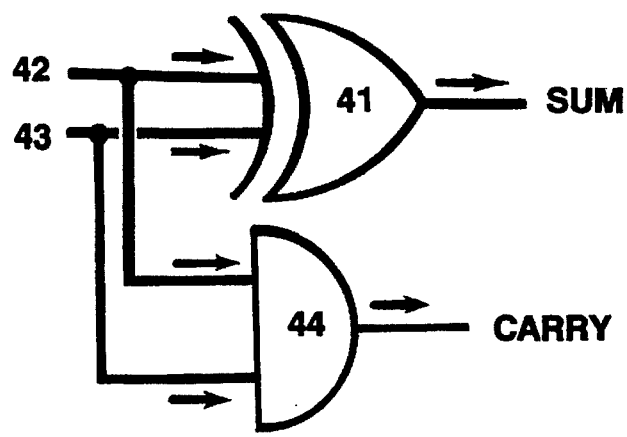
FIG. 15—Binary Half Adder Logic.

The binary half adder is shown in FIG. 15. The Exclusive OR of FIG. 14 is shown using conventional XOR symbol (41). The two inputs (42) and (43) are apportioned into both XOR (41) and AND (44). The Exclusive OR provides the SUM output, while AND (44) provides the CARRY output.

18. Clocked Bistable.

Figure 16:
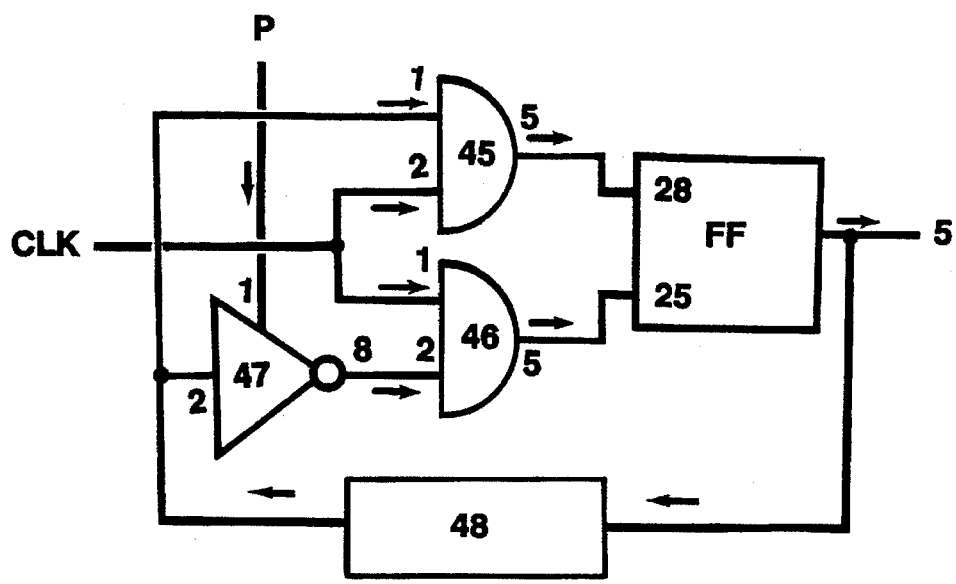
FIG. 16—Clocked Bistable Logic.

FIG. 16 shows the logic diagram for clocking an energy wave bistable device (FF). (FF) is a bistable arrangement such as the one shown in FIG. 9. Beam (25) provides a set pulse, and beam (28) provides the reset pulse.

In order to produce set and reset pulses of the proper timing, the CLK clock input pulses have to be directed first to the set input beam (25) and then to the reset input beam (28) of (FF).

Power is provided to flip flop (FF) as shown in FIG. 9. Initially, (FF) is reset, and output (5) is off. Inverter (47) is powered by a beam from (P). Its output is on, enabling AND (46).

The pulses into CLK are directed to ANDs (45) and (46). There is as yet no energy coming out of delay line (48), so AND (45) is disabled. The first pulse from (CLK) passes through the enabled AND (46) and sets the flip flop (FF) through beam (25), turning on output (5).

A portion of output (5) goes through delay path (48). Before energy exits delay path (48), this first clock pulse from (CLK) terminates to insure that the set function is successful.

The delayed energy from delay path (48) enables AND (45) and is directed into inverter (47). This causes inverter (47) to turn off, disabling AND (46).

The second pulse from CLK arrives when AND (46) is disabled and AND (45) is enabled. This causes energy to pulse through to beam (28), resetting (FF).

Energy continues to output from delay path (48) to insure that the reset operation is successful. The second pulse from CLK terminates before the end of the delay time of (48). Then energy from delay path (48) terminates, enabling AND (46) and disabling AND (45); and the clocking cycle is complete.

19. Differentiation, and the binary digit counter.

Figure 17:
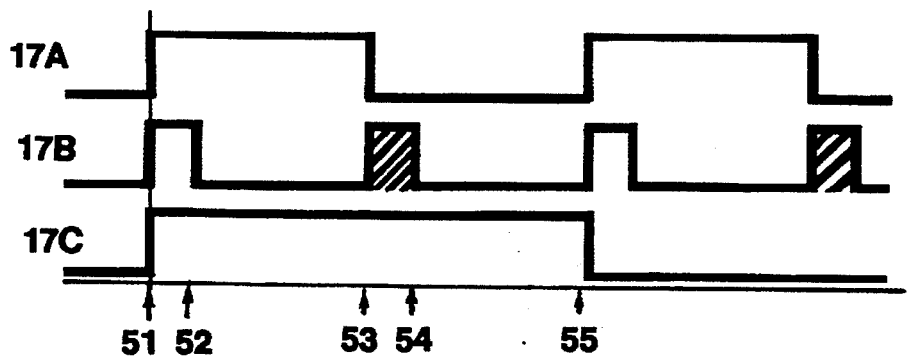
FIG. 17—Binary Digit Counter Input/output Waveforms

FIG. 17 (17A) is a graph of a typical bistable signal, found at the output of a clocked bistable arrangement such as FIG. 16, which is to be used as an input to a binary digit counter. A binary digit counter is essentially a bistable device that is able to be clocked by a binary pulsed beam having variable-length pulses. FIG. 18 shows the logic diagram of a binary digit counter.

(CFF) in FIG. 18 is the clocked flip flop of FIG. 16. It requires clock pulses at (CLK) to be shorter than the time of delay path (48) of FIG. 16. Variable-length pulses are shown in graph (17A) of FIG. 17 and as the input to the binary digit counter, FIG. 18, (BI).

The first binary pulse starts at time (51), FIG. 17. To produce standard-length pulses, a portion of (BI) is directed into a summing location (49), and another portion into a delay path (50) in FIG. 18. Summing location (49), as yet, has no other input. Its output is on, which starts the first clock pulse for CLK.

The delay path (50) outputs no energy until time (52) shown in FIG. 17, at which time energy exits delay path (50) which causes di at summing location (49), terminating the first clock pulse into CLK. The delay time of delay path (50) is shorter than the enabling delay time of delay path(48) in FIG. 16.

CLK remains off as long as both inputs to summing location (49) remain on, until time (53), when the BI input shuts off, and the di at summing location (49) stops. There is still energy in delay path (50), so summing location (49) begins outputting another pulse. However, because di is used at summing location (49), this pulse is 180 degrees out of phase with the first pulse shown by the cross-hatch in FIG. 17. This shows the process of differentiation of an energy pulse.

The phase detecting controllers in CFF do not respond to this phase of energy, so these pulses are ignored. When all of the energy in delay path (50) is exhausted, the reverse phase pulse at CLK terminates at time (54). At time (55) the process is repeated, and CFF clocked for a second time. This produces the CFF output BC having wave form (17C) at one-half the clocking frequency of the (BI). As a result, single binary digits are counted in binary.

In order for all but a small amount of energy to pass through the differentiation process, through (49), the pulse rise and/or fall rates must be faster than the delay period through (50). If rise or fall times are too slow, then di will be established or removed before the output from (49) is able to reach its maximum value. As a result, rapidly rising or falling pulses will pass through the differentiation process, while slowly changing pulses will be attenuated.

This differentiation process is able to be applied to a great variety of energy beam circuits, just as its electronic counterpart is a versatile tool in electronics.

20. Binary counter.

A cascade series of binary digit counters, $BDC_1$ through $BDC_N$, are shown in FIG. 19. Each BDC, binary digit counter, is as shown in FIG. 18. Each BC output of each BDC is directed into the BI input of the next BDC.

A series of pulses to be counted enters at the first input (56) and graph (56). Operation is the same as with electronics, except that when using the present invention with light, the process counts at light speed.

Graphs (57) through (59) show a the typical binary count output of matching beams (57) through (59). As many binary digit counters as are needed are able to be added, as shown by . . . $BCD_N$ with its output (60).

21. Gated Oscillator.

FIG. 20 shows a Gated Oscillator. An amplifier (61) provides amplification. Its power beam (1) is supplied by beam (G). Its control input beam (2) is supplied by the output of an inverter (63). The inverter's power comes from beam (P). Initially, inverter (63) is on, which directs energy to beam (2) of amplifier (61), which in turn is amplified to produce an output at output (5).

A portion of output (5) is directed into delay path (62) to provide a delayed feedback signal. The cumulative delay through the whole circuit is the frequency determining device, but the delay time through (62) is the primary determining factor. The output of delay path (62) turns off inverter (63). Output (8) turns off amplifier (61) and output (5), completing the cycle.

The oscillator continues to turn the energy beams on and off as long as power is supplied to amplifier (61). When constant level input (G) is gated off, oscillation stops. When (G) is gated on, oscillation starts again.

22. Square Wave Oscillator.

FIG. 21 shows a square wave oscillator. FF is the set/reset bistable arrangement of FIG. 9. Power is supplied from (G) to beam (1). A portion of output (5) is directed into delay path (64), which provides the primary time delay that functions as the primary frequency determining device. The output of delay path (64) is directed into the reset input (28) of the bistable device (FF).

Initially, output (5) is off. Input (25) is gated on and held on during the time oscillation is to take place. The threshold is reached, and output (5) turns on. After the delay through delay path (64), FF is reset because the reset input (28) is out of phase with the set signal at input (25). It brings the combined inputs down below the threshold, and output (5) turns off. (28) continues to hold the combined input below the threshold until the pulse termination at (5) is able to pass through delay (64), completing the cycle.

Gating input (25) off causes the combined input to be below the threshold, so that oscillation stops. It is self starting when input (25) comes on. Oscillation is also able to be gated off by turning off the gated power source G.

The gated oscillator shown above in FIG. 20, will operate using analog as well as digital signals, depending on how hard the delayed feedback signal drives the amplifier. As a result, it is able to produce a sine wave waveform envelope. The Square Wave Oscillator of FIG. 21, on the other hand, is binary in nature because of the flip flop FF. As a result, it produces a square waveform output SQR.

23. One Shot.

Only one modification is needed to change the square wave oscillator of FIG. 21, to perform a one shot function. If the set pulse is gated on for a shorter period of time than the time delay through the delay path (64), then the arrangement will cycle through one cycle only; and shut off.

24. D-type Bistable Function.

FIG. 22 shows a D-type bistable arrangement using a set/reset flip flop as in FIG. 9. Beam (D) is modulated with input binary data. A portion is directed into AND (65) and Inverter (66). The output (8) of inverter (66) is directed into AND (67). AND (65) sets flip flop FF through input (25) when it outputs, and AND (67) resets FF, through input (28) when it is on. Enabling beam (E) is directed to the other two inputs of AND (65) and AND (67).

FIG. 22 also has a graph to show how this D-type bistable function works. Initially at time (68), (D) is off. Any changes in the state of (D) have no affect on the state of (FF) as long as ANDs (65) and (67) are off, as shown at times (68) and (69). At time (70), enabling pulse (E) comes on, enabling ANDs (65) and (67), and causing the state of (D) to be written into FF. At time (70), (D) is off, which causes AND (65) to be off and inverter (66) to be on. This in turn, turns on AND (67), because it had also been enabled by (E). AND (67) outputs a reset pulse to input (28) that lasts as long as (E) is on. The state of (D) now appears at output (5) of FF. After enabling pulse (E) terminates, changes in (D) again have no affect on (FF).

At time (71), another enabling pulse enables ANDs (65) and (67). This time (D) is on, which turns inverter (66) off, which keeps AND (67) off. A portion of beam (D) is now able to turn on AND (65), which pulses input (25), setting flip flop FF. The new state of (D) now appears at output (5) of FF. Again the enabling pulse (E) terminates before (D) changes state.

If (D) were to change state before (E) terminates, the last state of (D) will be written into FF as long as (D) retains this final state long enough for the complete set, or reset cycle to take place.

25. Frequency Demultiplexer.

Figure 23A:
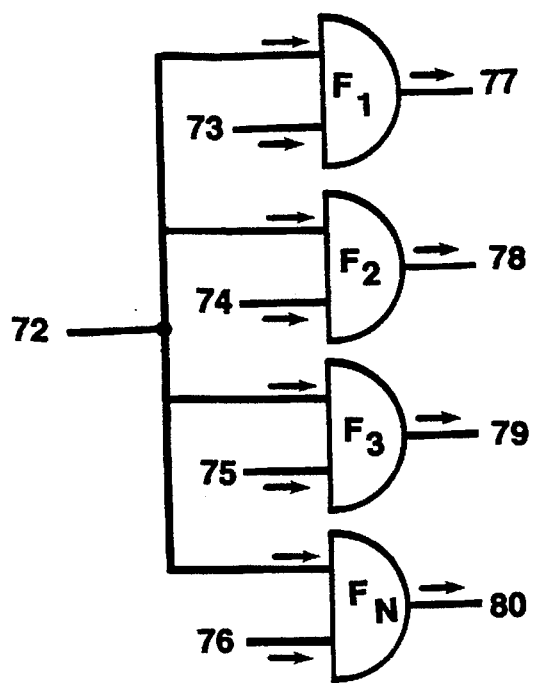
FIGS. 23A, 23B, and 23C are Demultiplexers and Logic.

FIG. 23A Shows the logic diagram for a frequency demultiplexer. A group of controllers (as in FIGS. 2A–2E) are used as filters, $F_1$ through $F_N$. A frequency multiplexed input beam (72) is apportioned out to the control input of each of the filters. Each power beam (73) through (76) is provided with a different frequency of energy. The outputs (77) through (80) contain only one frequency each that is amplitude-modulated with what-ever information that frequency was modulated with during the multiplexing process.

Figure 23B:
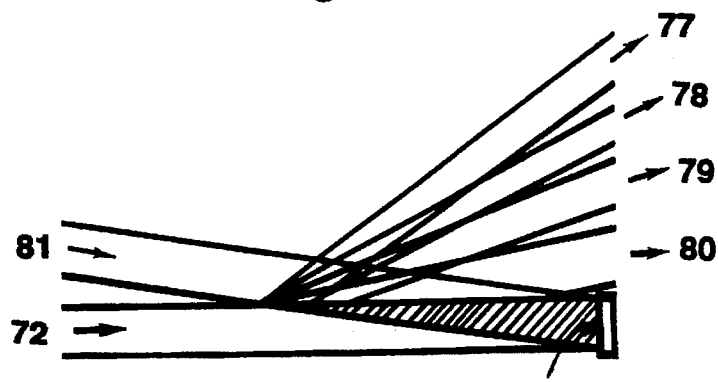

FIG. 23B shows a frequency demultiplexer where all of the controllers share common components (3), (72), and (81). However, each frequency will have a separate output location, (77) through (80), just as the different frequencies in sunlight separate to make a rainbow. The separate frequency power beams are able to be combined into a single input power beam (81) in order to make the geometry of separation easier to work with; however, that is not required.

25. Time Division Demultiplexer.

Demultiplexers have the common quality of providing multiple outputs from a common input. FIG. 23A is able to be used as a time division demultiplexer by using a different power beam arrangement.

In this case, input (72) has time division multiplexed information, that is, serial pulses. Inputs (73) through (76) have a sequenced series of pulses, The controllers function as amplifying ANDs. As each controller is pulsed sequentially in its turn, whatever information is on beam (72) will output into the separate outputs (77) through (80). From that point on, further processing, such as setting a bistable device, is able to be accomplished.

Figure 23C:
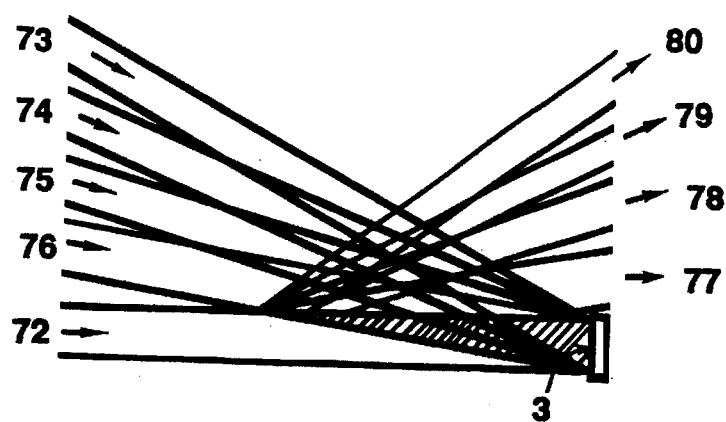

FIG. 23C shows how ANDs $F_1$ through $F_N$ are able to share a common di location. Beam (72) enters a complex controller. The orientations of each of the inputs (73) through (76) are different from each other in order to provide different positions for the outputs (77) through (80). As the power inputs are sequenced, each bit frame will be picked off from beam (72) and diverted off into a different direction to provide a separation of the outputs.

26. Time Division Multiplexer.

Figure 24:
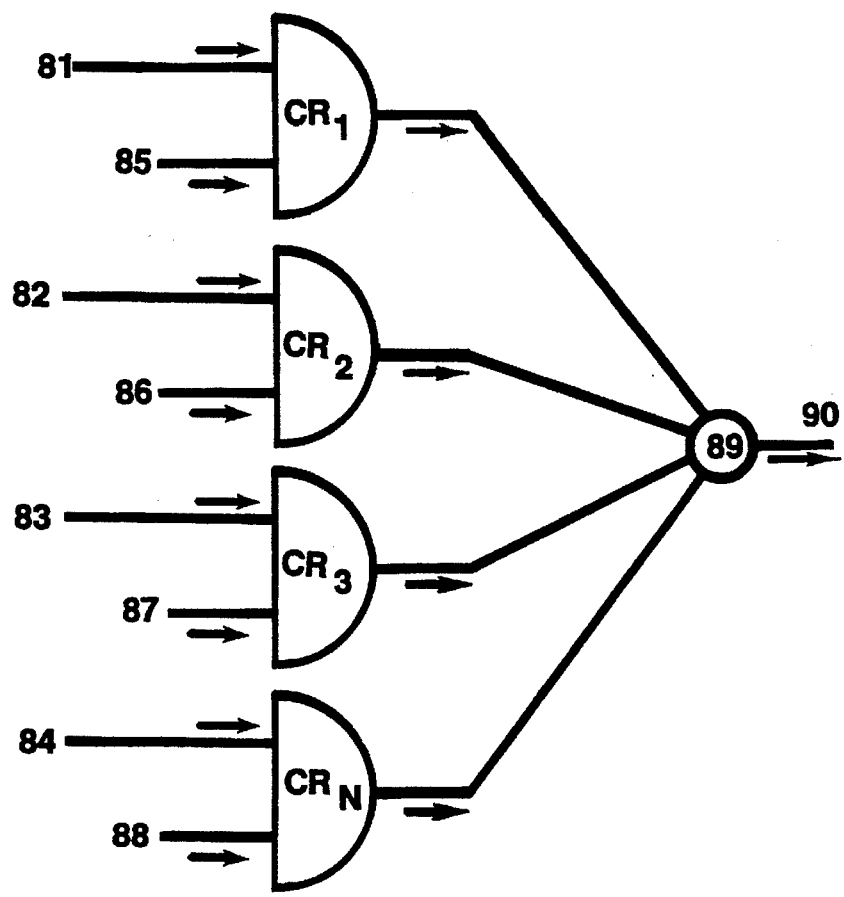
FIG. 24. Multiplexer Logic.
Figure 24:
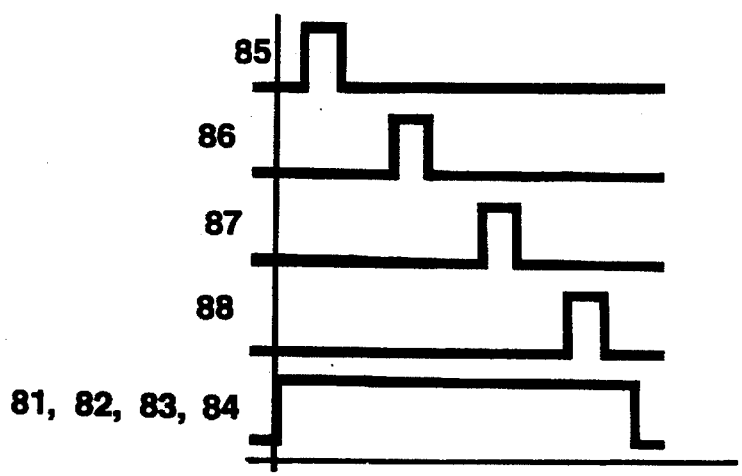

Time division multiplexers are essentially parallel to serial converters. FIG. 24 shows the logic diagram of a time division multiplexer. Input beams (81) through (84) are provided with parallel information. See graph in FIG. 24A. The power inputs (85) through (88) sequentially pulse the controllers $CR_1$ through $CR_N$ configured as ANDs. The outputs of the controllers are directed into a common output beam (90) at location (89).

Output beam (90) then contains a series of pulses taken sequentially from the data on beams (85) through (88). Summing of the signals does not ordinarily occur at location (89) because no two inputs are on at the same time.

27. Phase Locking.

Figure 25:
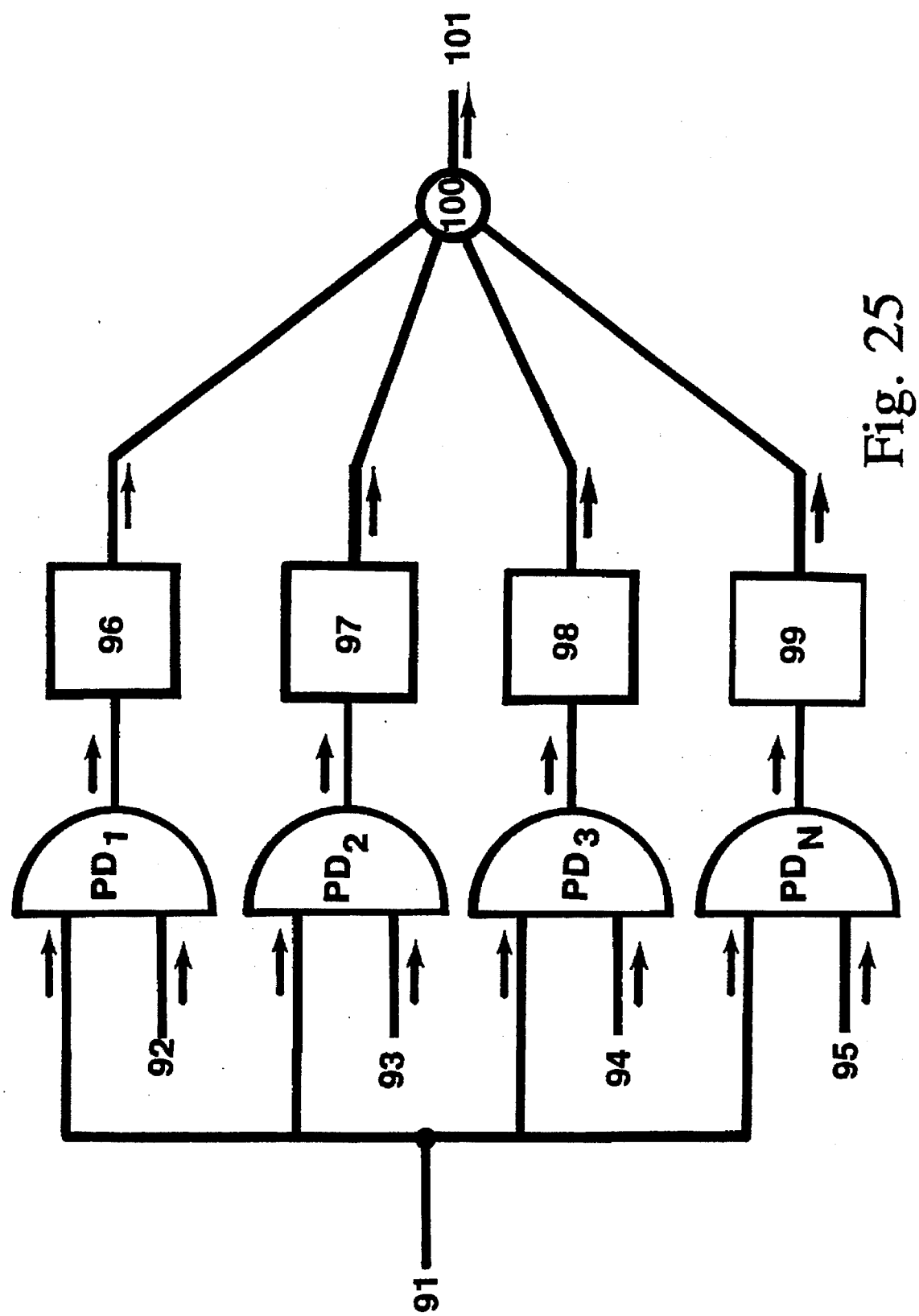
FIG. 25—Phase Locking Logic.

Phase locking is essentially time division phase demultiplexing followed by in-phase multiplexing. FIG. 25 is the logic diagram for a phase locking arrangement. A fluctuating phase beam (91) is apportioned out to the control inputs of an array of controllers configured as phase demodulators. The power inputs (92) through (95) are each provided with a different phase of constant-level energy. The phase-fluctuating beam exists at one phase, then switches to another, and then another. It may be random or in some pattern. At whatever phase it happens to be at any given moment, at least one of the phase demodulators $PD_1$ through $PD_N$ will produce an output because enough phase demodulators are provided so as to cover the entire range of phase fluctuations.

Once demultiplexed, each of the controller outputs undergoes a phase shift (96) through (99) so that, as each one turns on, its energy will arrive at location (100) and on into output (101), having the same phase as the others.

The power inputs (92) through (95) each have a constant phase, although phase-adjusted from one another. The phase at each controller output is also constant, when on, having been produced by ci within the controller. As a result, the introduction of specified phase shifts allows the remultiplexed output (101) to have any phase pattern we build it to produce. To produce phase locking, those phase shifts are simply made to output a substantially constant phase.

If the phase-fluctuating beam is, for example, an outside laser that is to be matched with another laser, energy from both lasers will exit (101) having the same phase.

If the phase fluctuating beam (91) is amplitude modulated, output (101) will likewise be amplitude modulated. If, for example, phase-fluctuating beam (91) comes from an optical fiber, its information needs to be impressed onto a beam from a local laser so that it is able to be processed photonically. This arrangement will do that.

28. Conclusion

The present invention has made it possible for these many common logic steps to be implemented using energy beams. Each of them have two interesting qualities that add to their uniqueness. First, they are able to be made quite small. As described in the Summary above, differences occur when these processes are carried out, and devices built, at wavelength dimensions. The more precise the optical arrangements, the more precise each controller is able to accomplish its design task, whether narrow band or broadband.

The second important feature is that many of these procedures are able to be accomplished by controllers that occupy common locations. A complex input beam is able to be operated on by a group of other input beams having slightly different geometries, pulse timing, frequencies, phases, and levels. Together, these operations are able to be incorporated as pixel operations which are tiny parts of dynamic images that are very much larger. By properly timing, orienting, modulating, and selecting the individual rays, or sets of rays that make up complex images, whole computers that accomplish light speed computing are able to be constructed in a very small space.

The principle of frequency multiplexing broadband devices, interspersed with specific narrow band devices, allows complex operations that have total control over the energy streams being used. Dynamic images produced this way are able to shuttle data, addresses, timing, storage, and every other kind of information from pixel to pixel, at wavelength dimensions.

Both multiplexing and demultiplexing, whether frequency division or time division, are basically separating, sorting, and combining operations. By arranging an array of many controllers, in appropriate sequences, and appropriately gating each embodiment, many different processes are able to be performed. These include time and frequency division multiplexing and demultiplexing, address decoding, sorting and channel switching.

Optical switching, such as is used in fiberoptic networks, optical computing, the control and manipulation of holographic and dynamic images are also able to be performed using the present invention. When acoustical waves are used, various imaging processes such as sonar and sonagrams are able to be implemented.

The pixel-by-pixel control of other images and the organization of application characteristics allow many things to be done that were difficult or impossible in the past. These include the manipulation of moving particle streams both large and small for industrial machining, electron microscopes, laser cutting, and other processes which require energy, or moving particles, to be controlled with precision.

Most importantly, these operations will become more widespread and valuable as optical computers, including those constructed using the present invention, are constructed for the purpose of manipulating and controlling the many input and output peripherals that are also able to be built using the present invention.

This disclosure provides more than just the basic invention using special interference. It also lays out the principles of component interconnection, and energy beam manipulation for implementing and organizing controllers with other energy beam processes. It provides the basic means and methods for accomplishing tasks that where previously confined to the realm of slow electronics. As a direct result of this extensive disclosure, practically any logical organization or architecture that is common in the electronic world is able to be implemented with this new energy beam technology, and especially in light. This is because specific examples of a variety of logic arrangements are fully explained, showing precisely how the components are to be interconnected to accomplish complex logical tasks.

Man has been studying light, sound, particle waves and other forms of energy for centuries. The principle of superposition has been well understood for over 150 years, yet the conventional methods, even the optical ones, have run into a wall of difficulty placed there by the basic physics of the fundamental processes used to create them.

The world of photonic computing was at an impasse. The present invention sweeps away that wall, by using the here-to-fore overlooked special interference. The present invention establishes an entirely new technology. As a direct result, the present invention is expected to be the foundation of 21st-century computer science.

What is claimed is:

1. An energy beam controller for controlling a plurality of energy beam sets with at least one of said plurality of energy beam sets comprising:

an image component separator having a first location and a second location and an output for outputting energy from said second location, and a plurality of input beam sets including a first beam set and a second beam set positioned and oriented so as to produce interference at said first location such that said interference diverts energy proportional to said second beam set to said second location when said first and second beam sets are on, thereby providing a controlled said output.

2. The invention of claim 1 wherein said first and second beam sets are modulated with digital information, thereby providing a logical AND.

3. The invention of claim 1 wherein said energy beam controller is a gated amplifier when said first beam set is maintained at a substantially constant above-zero high level gated when on, and a substantially constant low level when gated off.

4. The invention of claim 3 including:

a common output, and a plurality of said gated amplifiers, said outputs of said gated amplifiers being directed to said common output, so that sequentially turning on said gated amplifiers by sequentially pulsing on said first beam set of each of said gated amplifiers during each of a series of sequential time divisions produces a time division multiplexer.

5. The invention of claim 3, including:

a plurality of said gated amplifiers;

a common input for accepting a multiplexed input beam with time division-multiplexed information, and first directing means for directing a portion of said multiplexed input beam to said second beam set of each of said gated amplifiers, wherein sequentially gating on said gated amplifiers by sequentially pulsing on said first beam set of each of said gated amplifiers, during successive sequential time divisions, sequentially gates time division-multiplexed information into separate said outputs to produce a time division demultiplexer.

6. The invention of claim 3 including:

an inverted output means for providing an output from said first location, thereby providing an inverter.

7. The invention of claim 3, including:

a plurality of said gated amplifiers in a cascade series.

8. The invention of claim 3 wherein:

said second beam set is amplitude-modulated to a sufficiently high level so as to divert all energy available from said first beam set into said output, thus establishing a saturation level, thereby limiting said output when said second beam set exceeds said saturation level.

9. The invention of claim 3 wherein:

said second beam set is phase-modulated, thereby providing a phase demodulator wherein said output is at a high level when said first and second beam sets are of opposite phase and at a low level when said first and second beam sets are in phase, and which changes as the phase of said second beam set changes.

10. The invention of claim 9 including:

a trigger beam set modulated with information to be threshold-detected and a threshold-controlling beam set at a substantially constant level, said trigger beam set and said threshold-controlling beam set both being positioned and oriented so as to produce destructive interference at at least one third location when said threshold-controlling beam set and said trigger beam sets are both on, the combined energy at said at least one third location being in phase with said threshold-controlling beam set when said trigger beam set is smaller than said threshold-controlling beam set and out of phase with said threshold-controlling beam set, when said trigger beam set is greater than said threshold-controlling beam set, and first directing means for directing energy from said at least one third location into said second beam set of said phase demodulator, thereby providing a threshold detector by demodulating phase changes in said combined energy.

11. The invention of claim 10 including:

feedback means for directing a portion of said output into said at least one third location as a feedback signal, said feedback means ensuring that said feedback signal at said at least one third location is smaller than said threshold-controlling beam set and in phase with said trigger beam set, resulting in regenerative feedback, and a greater said output when said combined energy reaches threshold, thereby providing a schmitt trigger.

12. The invention of claim 10 including:

a plurality of said trigger beam sets to be used as AND inputs, modulated with binary information, threshold being reached only when all said AND inputs are on, thereby providing a multi-input AND.

13. The invention of claim 10 including:

a plurality of said trigger beam sets to be used as OR inputs, modulated with binary information, threshold being reached when at least one of said OR inputs is on, thereby providing a multi-input OR.

14. The invention of claim 3 including:

an inverter means;

a delay means directing a first portion of energy from said output along a delay path to said inverter means to produce an inverted delayed signal, and directing means for directing said inverted delayed signal to said second beam set to turn said output on and off, said second beam set remaining on when said inverted delayed signal is on, and off when said inverted delayed signal is off, to produce oscillation during the time when said first beam set is on, and disabling oscillation when said first beam set is off, thereby producing a gated energy beam oscillator.

15. The invention of claim 9 including:

first directing means for directing a portion of a phase-fluctuating beam set into each said second beam set of each of a plurality of said phase demodulators;

phasing means for providing said first beam set of each of said phase demodulators with a different phase of energy;

second directing means for directing said output of each said phase demodulator to at least one third location so that energy from all said outputs arrives at said at least one third location in phase, and third directing means for directing energy from said at least one third location to provide a phase-locked output, thereby providing a phase-locking device for phase-locking energy from said phase-fluctuating beam set to a substantially constant phase output having a substantially constant amplitude.

16. The invention of claim 15 wherein:

said phase-fluctuating beam set is amplitude- or frequency-modulated with information to be extracted, thereby providing an amplitude-modulated output containing said information and having a substantially constant phase at said phase-locked output.

17. The invention of claim 3 wherein:

said first beam set has at least one wavelength, and said second beam set has multiple wavelengths to be filtered so as to produce said interference with a subset of said multiple wavelengths matching said at least one wavelength and rejecting other wavelengths, thereby providing a gated active filter by producing an output only at wavelengths which exist simultaneously in both said beam sets.

18. The invention of claim 6 wherein:

said first beam set has at least one wavelength;

said second beam set has multiple wavelength energy to be filtered, and said interference occurs with a subset of said multiple wavelengths matching said at least one wavelength, diverting energy of matching wavelengths away from said at least one first location, thereby providing an inverted active filter by producing an inverted output deficient of wavelengths which exist simultaneously in both said beam sets.

19. The invention of claim 17 including:

a frequency-multiplexed beam set having a plurality of modulated wavelengths;

a plurality of said gated active filters, each of said gated active filters having its said first beam set of a wavelength which matches at least one of said plurality of modulated wavelengths, directing means for directing a portion of said frequency-multiplexed beam set into said second beam set of each of said gated active filters, thereby providing a frequency demultiplexer by producing a separate modulated output from each said of gated active filters, matching each of said different frequencies.

20. The invention of claim 1 wherein:

said first and second beam sets have energy of phases to be compared, and said interference produces said output that is at a high level when said first and second beam sets are of opposite phase, and at a lower level when said first and second beam sets are at other phase differences, thereby providing phase comparer.

21. The invention of claim 2 including:

a plurality of said logical ANDs in a cascade series, wherein said output of each said logical AND is fed into said second beam set of the next said logical AND in said cascade series, thereby providing a multi-input AND wherein all of said first beam sets of said plurality of said logical ANDs and said second beam set of the first said logical AND in said cascade series must be on in order to turn on said output of the last said logical AND in said cascade series.

22. The invention of claim 2 including directing means for directing said output of said logical AND into a logical NOT means, thereby providing a logical NAND.

23. The invention of claim 2 including:

a first logical NOT means having an energy beam output directed into said first beam set of said logical AND, and a second logical NOT means having an energy beam output directed into said second beam set of said logical AND, thereby producing a logical NOR.

24. The invention of claim 9 including:

a first Exclusive OR input beam set modulated with binary information directed toward at least one third location;

a second Exclusive OR input beam set modulated with binary information directed toward said at least one third location so as to produce destructive interference at said at least one third location when said first and second Exclusive OR input beam sets are both on;

first directing means for directing energy from said at least one third location into said second beam sets of first and second said phase demodulators, ensuring that said first beam sets of said first and second phase demodulators are of opposite phase, said output of said first phase demodulator being on when said first Exclusive OR input beam set is on by itself, and said output of said second phase demodulator being on when said second Exclusive OR input beam set is on by itself;

second directing means for directing energy from said first phase demodulator to provide at least one Exclusive OR output, and third directing means for directing energy from said second phase demodulator to said at least one Exclusive OR output while providing a 180-degree phase shift so that the energy from said first and second phase demodulators has matching phases at said at least one Exclusive OR output, thereby providing an Exclusive OR having a substantially constant phase output.

25. The invention of claim 24 including:

fourth directing means for directing a portion of energy from said first Exclusive OR input beam set to a first input of a logical AND, and fifth directing means for directing a portion of energy from said second Exclusive OR input beam set to a second input of said logical AND, thereby providing a binary half-adder by providing said Exclusive OR output as a sum output and an output of said logical AND as a carry output.

26. The invention of claim 10 including:

a reset beam set, directed to said at least one third location in phase with said threshold-controlling beam set, and second directing means for directing a feedback signal from a portion of said output into said at least one third location, said feedback signal at said at least one third location being out of phase with and greater than said threshold-controlling beam set, thereby providing a bistable device by turning said output on when said trigger beam set is pulsed with a set pulse, holding said output on with said feedback signal, then turning said output off when said at least one reset beam set is pulsed with a reset pulse, and holding said output off when said feedback signal is absent.

27. The invention of claim 26 including:

first and second logical ANDs;

a clock beam set having alternating first and second pulses;

third directing means for directing a first portion of said clock beam set into a first input of said first logical AND;

fourth directing means for directing an output of said first logical AND to provide said set pulse;

fifth directing means for directing a second portion of said clock beam set into a first input of said second logical AND;

sixth directing means for directing an output of said second logical AND to provide said reset pulse;

a first delay path providing a first delay time;

seventh directing means for directing a portion of said output of said bistable device along said first delay path, providing a delayed bistable beam set;

eighth directing means for directing a first portion of said delayed bistable beam set into a logical NOT means;

ninth directing means for directing an output of said logical NOT means to a second input of said first logical AND, and tenth directing means for directing a second portion of said delayed bistable beam set into a second input of said second logical AND, thereby providing a clocked bistable device by setting said bistable device using said first pulses that pass through said first logical AND when said second input of said first logical AND is held on by said logical NOT means in the absence of said delayed bistable beam set and said first pulses are prevented from passing through said second logical AND by the absence of said delayed bistable beam set, and then resetting said bistable device by using said second pulses that pass through said second logical AND when said second input of said second logical AND is held on by said delayed bistable beam set and said second pulses are prevented from passing through said first logical AND by the presence of said delayed bistable beam set which is inverted by said logical NOT means to hold said first logical AND off.

28. The invention of claim 27 including:

a binary input beam set having pulses longer than said first delay time;

eleventh directing means for directing a portion of said binary input beam set to at least one fourth location;

a second delay path providing a second delay time;

twelfth directing means for directing another portion of said binary input beam set along said second delay path and then to said at least one fourth location as a delayed beam set so as to produce destructive interference with said binary input beam set and said delayed beam set at said at least one fourth location when both said beam sets are on;

an image component separator for separating energy from said at least one fourth location to provide differentiated pulses, and thirteenth directing means for directing said differentiated pulses to provide said clock beam set of said clocked bistable device, thereby providing a binary digit counter which facilitates using binary input beam pulses longer than said first delay time to clock said clocked bistable device by differentiating said binary input beam set to produce a leading pulse having a constant pulse length, and a trailing pulse having a constant pulse length, said leading pulse being out of phase with said trailing pulse, so that said clocked bistable device is able to respond to at least one of said pulses.

29. The invention of claim 28 including:

a plurality of said binary digit counters in a cascade series, said binary input beam set of the first of said binary digit counters in said cascade series having pulses to be counted, and fourteenth directing means for directing said output of each of said binary digit counters into said binary input beam set of the next said binary digit counter in said cascade series, thereby providing a binary counter by connecting a plurality of said binary digit counters in a cascade series which produces binary outputs representing pulse count.

30. The invention of claim 26 including:

an enabling beam set which holds said set pulse on when square wave oscillation is to take place, said set pulse being off when said enabling beam set is off;

a delay path which has a delay period;

third directing means for directing a portion of said output along said delay path to provide a delayed bistable signal, and fourth directing means for directing said delayed bistable signal to said reset beam set to provide said reset pulses, said reset pulses being larger than the sum of said set pulse and said feedback signal, thereby providing a gated square wave energy beam oscillator by repeatedly turning said bistable device on or off at least once for each said delay period, and gating oscillation off by turning said set pulse off.

31. The invention of claim 26 including:

first and second logical ANDs;

a data beam set having at least one beam of energy modulated with binary information;

an enabling beam set having at least one beam of energy modulated with data storage enabling information;

third directing means for directing a first portion of said data beam set into a first input of said first logical AND;

fourth directing means for directing a second portion of said data beam set into a logical NOT means;

fifth directing means for directing an output of said logical NOT means to a first input of said second logical AND;

sixth directing means for directing a first portion of said enabling beam set into a second input of said first logical AND and a second portion of said enabling beam set into a second input of said second logical AND;

seventh directing means for directing an output of said first logical AND to said trigger beam set to provide said set pulse, and eighth directing means for directing an output of said second logical AND to said reset beam set to provide said reset pulse, thereby providing a D-type bistable device by setting or resetting said bistable device depending upon the state of said data beam set during the time when said enabling beam set is on.

32. The invention of claim 26 including:

a delay path;

third directing means for directing a portion of said output along said delay path to provide a delay period and a delayed-feedback beam set, and fourth directing means for directing said delayed-feedback beam set to said reset beam set to provide said reset pulse, thereby providing a one-shot device wherein said output is pulsed on by said set pulse, held on during said delay period by said feedback signal, and then turned off after said delay period by said delayed-feedback beam set.

33. An energy beam controller comprising:

a first beam set directed toward at least one first location, and a second beam set modulated with controlling information and directed toward said at least one first location so as to produce interference between said first and second beam sets at said at least one first location when both said beam sets are on, such that said interference diverts energy from both said beam sets to at least one second location in proportion to said second beam set, energy from said first beam set being absent from said at least one second location when said second beam set is off or in phase with said first beam set and being present at said at least one second location when said second beam set is on and out of phase with said first beam set, and an image component separator for separating energy from said at least one second location to provide at least one output, thereby controlling said at least one output using said second beam set.

* * * * *